US008599186B2

(12) United States Patent
Ogura

(10) Patent No.: US 8,599,186 B2
(45) **Date of Patent: *Dec. 3, 2013**

(54) PIXEL DRIVING DEVICE, LIGHT EMITTING DEVICE, DRIVING/CONTROLLING METHOD THEREOF, AND ELECTRONIC DEVICE

(75) Inventor: Jun Ogura, Fussa (JP)

(73) Assignee: Casio Computer Co., Ltd., Tokyo (JP)

(*) Notice: Subject to any disclaimer, the term of this patent is extended or adjusted under 35 U.S.C. 154(b) by 240 days.

This patent is subject to a terminal disclaimer.

(21) Appl. No.: 12/979,730

(22) Filed: Dec. 28, 2010

(65) Prior Publication Data

US 2011/0157134 A1 Jun. 30, 2011

(30) Foreign Application Priority Data

Dec. 28, 2009 (JP) ................................ 2009-298219
Nov. 17, 2010 (JP) ................................ 2010-256738

(51) Int. Cl.

| | |
|---|---|
| ***G06F 3/038*** | (2013.01) |
| ***G09G 5/00*** | (2006.01) |
| ***G09G 3/32*** | (2006.01) |
| ***G09G 3/36*** | (2006.01) |

(52) U.S. Cl.

USPC ........... 345/211; 345/204; 345/212; 345/213; 345/82; 345/83; 345/87; 345/94; 345/98; 345/99; 345/100

(58) Field of Classification Search

USPC ................. 345/204, 211–213, 76–86, 87, 94, 345/98–100

See application file for complete search history.

(56) References Cited

U.S. PATENT DOCUMENTS

| | | | |
|---|---|---|---|
| 6,734,636 | B2 | 5/2004 | Sanford et al. |
| 7,358,941 | B2 | 4/2008 | Ono et al. |
| 7,760,168 | B2 | 7/2010 | Ogura |

(Continued)

FOREIGN PATENT DOCUMENTS

| | | | |
|---|---|---|---|
| JP | 08-330600 | A | 12/1996 |
| JP | 2003-066865 | A | 3/2003 |

(Continued)

OTHER PUBLICATIONS

Japanese Office Action dated Jan. 31, 2012 (and English translation thereof) in counterpart Japanese Application No. 2010-256738.

*Primary Examiner* — Ilana Spar

(74) *Attorney, Agent, or Firm* — Holtz, Holtz, Goodman & Chick, PC

(57) ABSTRACT

In a pixel driving device that drives a plurality of pixels, each pixel includes a light emitting element and a pixel driving circuit comprising a driving device having one end of a current path connected to one end of the light emitting element and having another end of the current path to which a power-source voltage is applied. Provided in a controller is a correction-data obtaining function circuit which obtains a first characteristic parameter relating to a threshold voltage of the driving device of each pixel based on a voltage value of each data line after a first detection voltage is applied to each data line connected to each pixel, and a current is caused to flow through the current path of the driving device through the each data line with a voltage of another end of the light emitting element being set to be a first setting voltage.

15 Claims, 27 Drawing Sheets

(56) References Cited

U.S. PATENT DOCUMENTS

| | | | | |
|---|---|---|---|---|
| 7,969,398 | B2 | 6/2011 | Shirasaki et al. | |
| 8,130,182 | B2 * | 3/2012 | Levey et al. | 345/78 |
| 8,242,983 | B2 | 8/2012 | Yoo et al. | |
| 8,259,044 | B2 | 9/2012 | Nathan et al. | |
| 2002/0089357 | A1 | 7/2002 | Pae et al. | |
| 2002/0101172 | A1 | 8/2002 | Bu | |
| 2002/0105279 | A1 | 8/2002 | Kimura | |
| 2003/0057895 | A1 * | 3/2003 | Kimura | 315/370 |
| 2003/0063081 | A1 | 4/2003 | Kimura et al. | |
| 2004/0017161 | A1 | 1/2004 | Choi | |
| 2005/0052350 | A1 | 3/2005 | Mizukoshi et al. | |
| 2005/0088103 | A1 | 4/2005 | Kageyama et al. | |
| 2006/0139261 | A1 | 6/2006 | Choi et al. | |
| 2006/0221015 | A1 | 10/2006 | Shirasaki et al. | |
| 2006/0261864 | A1 * | 11/2006 | Miyazawa | 327/112 |
| 2007/0164959 | A1 | 7/2007 | Childs | |
| 2008/0036708 | A1 | 2/2008 | Shirasaki et al. | |
| 2008/0074413 | A1 * | 3/2008 | Ogura | 345/212 |
| 2008/0111812 | A1 | 5/2008 | Shirasaki et al. | |
| 2008/0180365 | A1 | 7/2008 | Ozaki | |
| 2008/0238953 | A1 | 10/2008 | Ogura | |
| 2008/0246785 | A1 | 10/2008 | Shirasaki et al. | |
| 2011/0157133 | A1 * | 6/2011 | Ogura | 345/211 |

FOREIGN PATENT DOCUMENTS

| | | | |
|---|---|---|---|
| JP | 2008-107774 | A | 5/2004 |
| JP | 2004-252110 | A | 9/2004 |
| JP | 2006-301250 | A | 11/2006 |
| JP | 2007-322133 | A | 12/2007 |
| JP | 2008-250006 | A | 10/2008 |
| WO | WO 2007/037269 | A1 | 4/2007 |

* cited by examiner

SP1 : $Id=\beta(V_0\text{-Vdata-}Vth_0)^2$
SP2 : $Id=\beta'(V_0\text{-Vdata-}Vth_0)^2$
SP3 : $Id=\beta(V_0\text{-Vdata-Vth})^2$

PIXEL DRIVING DEVICE, LIGHT EMITTING DEVICE, DRIVING/CONTROLLING METHOD THEREOF, AND ELECTRONIC DEVICE

CROSS-REFERENCE TO RELATED APPLICATION

This application claims the benefit of Japanese Patent Application No. 2009-298219, filed on Dec. 28, 2009 and Japanese Patent Application No. 2010-256738 filed Nov. 17, 2010, the entire disclosure of which is incorporated by reference herein.

FIELD

This application relates generally to a pixel driving device, a light emitting device including the pixel driving device, a driving/controlling method thereof and an electronic device including the light emitting device.

BACKGROUND

In recent years, light-emitting-device type display devices (light emitting devices) including a display panel (pixel arrays) having current-driven light emitting elements arranged in a matrix manner are getting attention as next-generation display devices. Examples of such current-driven light emitting element are an organic electro-luminescence device (organic EL device), a non-organic electro-luminescence device (non-organic EL device), and a light emitting diode (LED).

In particular, light-emitting-device type display devices with an active-matrix driving scheme have a faster display response speed in comparison with conventionally well-known liquid crystal display devices, have little view angle dependency, and have a good display characteristic which enable accomplishment of high brightness, high contrast, and high definition of a display quality. The light-emitting-device type display devices need no backlight and light guiding plate unlike the liquid crystal display devices, and have a superior advantage that the light-emitting-device type display devices can be further thinned and light-weighted. Therefore, it is expected that such display devices are applied to various electronic devices in future.

For example, Unexamined Japanese Patent Application KOKAI Publication No. H08-330600 discloses an organic EL display device which is an active-matrix drive scheme display device that is subjected to a current drive by a voltage signal. In such an organic EL display device, a circuit (referred to as a "pixel driving circuit" for descriptive purpose) including a current driving thin-film transistor and a switching thin-film transistor is provided for each pixel. The current driving thin-film transistor allows a predetermined current to flow through an organic EL device that is a light emitting element as a voltage signal according to image data is applied to the gate of such a transistor. Moreover, the switching thin-film transistor performs a switching operation in order to supply the voltage signal according to image data to the gate of the current driving thin-film transistor.

According to such an organic EL display device that controls the brightness and gradation of the light emitting element based on a voltage signal, however, when a threshold voltage of the current driving thin-film transistor or the like changes with time, the current value of a current flowing through the organic EL device becomes varied.

Moreover, in the pixel driving circuits for respective plural pixels arranged in a matrix manner, even if respective threshold voltages of the current driving thin-film transistors remain same, varying of the gate insulation film, the channel length, and the mobility of the thin-film transistor affect the driving characteristic, which results in varying thereof.

It is known that varying in the mobility remarkably occurs especially in the case of a low-temperature polysilicon thin-film transistor. If an amorphous silicon thin-film transistor is used, the mobility can be uniform but a negative effect by such varying originating from a manufacturing process is inevitable.

SUMMARY

The present invention has an advantage to provide a pixel driving device, a light emitting device, a driving/controlling method thereof, and an electronic device including the light emitting device which can obtain a characteristic parameter of a pixel driving circuit precisely, and which can allow a light emitting element to emit light with desired brightness and gradation by correcting image data based on the characteristic parameter.

In order to provide the above advantage, a first aspect of the present invention provides a pixel driving device that drives a plurality of pixels, wherein each of the plurality of pixels includes: a light emitting element; and a pixel driving circuit comprising a driving device having one end of a current path connected to one end of the light emitting element and having another end of the current path to which a power-source voltage is applied, the pixel driving device further comprises: a correction-data obtaining function circuit which obtains a first characteristic parameter relating to a threshold voltage of the driving device of each pixel based on a voltage value of each data line after a first detection voltage is applied to each of the plurality of data lines connected to each of the plurality of pixels, and a current is caused to flow through the current path of the driving device through each data line with a voltage of another end of the light emitting element being set to be a first setting voltage, and the first setting voltage is set to be a same voltage as the first detection voltage or a voltage having a lower electric potential than a electric potential of the first detection voltage and having an electric potential difference from the first detection voltage smaller than a light emitting threshold voltage of the light emitting element.

In order to provide the above advantage, a second aspect of the present invention provides a light emitting device comprising: a light emitting panel including a plurality of pixels and a plurality of data lines, each data line being connected to each pixel; and a correction-data obtaining function circuit, wherein each pixel comprises: a light emitting element having one end connected to a contact; and a pixel driving circuit comprising a driving device having one end of a current path connected to the contact and having another end of the current path to which a power-source voltage is applied, the correction-data obtaining function circuit obtains a first characteristic parameter relating to a threshold voltage of the driving device of each pixel based on a voltage value of each data line after a first detection voltage is applied to each data line, and a current is caused to flow through the current path of the driving device through each data line with a voltage of another end of the light emitting element being set to be a first setting voltage, and the first setting voltage is set to be a same voltage as the first detection voltage or a voltage having a lower electric potential than an electric potential of the first detection voltage and having an electric potential difference from the first detection voltage smaller than a light emitting threshold voltage of the light emitting element.

In order to provide the above advantage, a third aspect of the present invention provides an electronic device comprising: an electronic-device main body unit; a light emitting device to which image data is supplied from the electronic-device main body and which is driven based on the image data, wherein the light emitting device includes: a light emitting panel including a plurality of pixels and a plurality of data lines, each data line being connected to each pixel; and a correction-data obtaining function circuit, each pixel comprises: a light emitting element; and a pixel driving circuit comprising a driving device having one end of a current path connected to one end of the light emitting element and having another end of the current path to which a power-source voltage is applied, the correction-data obtaining function circuit obtains a first characteristic parameter relating to a threshold voltage of the driving device of each pixel based on a voltage value of each data line after a first detection voltage is applied to each data line, and a current is caused to flow through the current path of the driving device through each data line with a voltage of another end of the light emitting element being set to be a first setting voltage, and the first setting voltage is set to be a same voltage as the first detection voltage or a voltage having a lower electric potential than an electric potential of the first detection voltage and having an electric potential difference from the first detection voltage smaller than a light emitting threshold voltage of the light emitting element.

In order to provide the above advantage, a fourth aspect of the present invention provides a driving/controlling method of a light emitting device, wherein the light emitting device comprises: a light emitting panel including a plurality of pixels and a plurality of data lines, each data line being connected to each pixel; and each pixel comprises: a light emitting element; and a pixel driving circuit comprising a driving device having one end of a current path connected to one end of the light emitting element and having another end of the current path to which a power-source voltage is applied, the driving/controlling method of the light emitting device includes: a first voltage setting step of setting a voltage of another end of the light emitting element to be a first setting voltage; and a first characteristic parameter obtaining step of obtaining a first characteristic parameter relating to a threshold voltage of the driving device of each pixel based on a voltage value of each data line at a first timing at which a first elapse time has elapsed after a first detection voltage is applied to each data line, and a current is caused to flow through the current path of the driving device through each data line with a voltage of another end of the light emitting element being set to be the first setting voltage through the voltage setting step, the first setting voltage is set to be a same voltage as the first detection voltage or a voltage having a lower electric potential than an electric potential of the first detection voltage and having an electric potential difference from the first detection voltage smaller than a light emitting threshold voltage of the light emitting element.

BRIEF DESCRIPTION OF THE DRAWINGS

A more complete understanding of this application can be obtained when the following detailed description is considered in conjunction with the following drawings, in which.

DETAILED DESCRIPTION

First Embodiment

An explanation will now be given of a pixel driving device, a light emitting device, a driving/controlling method thereof, and an electronic device according to a first embodiment of the present invention. In the first embodiment, an explanation will be given of a case in which the light emitting device of the present invention is used as a display device.

<Display Device>

Figure 1:
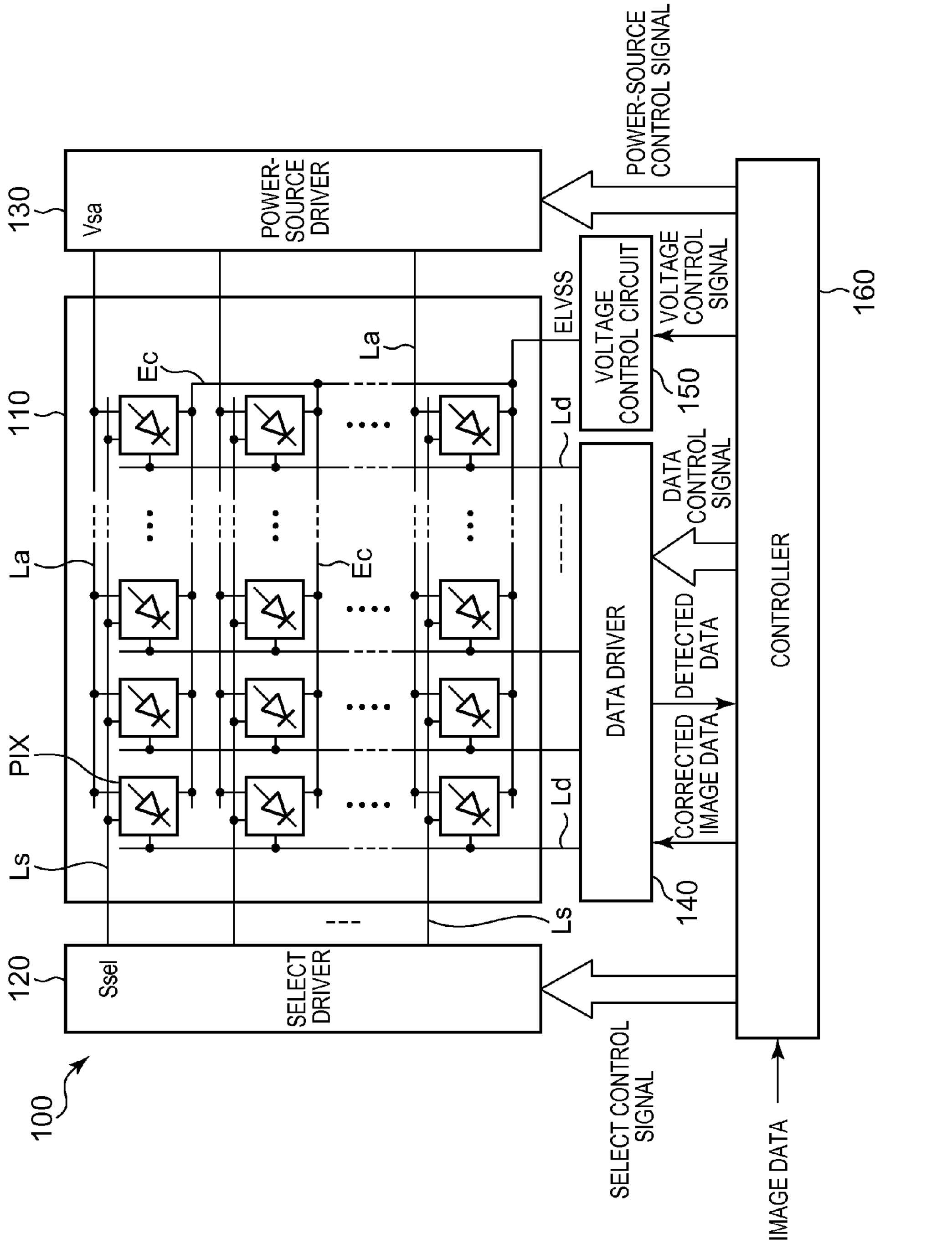
FIG. 1 is a schematic configuration diagram showing an illustrative display device using a light emitting device of the present invention.

FIG. 1 is a schematic configuration diagram showing an illustrative display device to which the light emitting device of the present invention is applied. As shown in FIG. 1, a display device (a light emitting device) 100 of the first embodiment includes, in general, a display panel (a light emitting panel) 110, a select driver 120, a power-source driver 130, a data driver 140, a voltage control circuit 150, and a controller 160. A pixel driving device of the present invention is configured by the select driver 120, the power-source driver 130, the data driver 140, the voltage control circuit 150, and the controller 160.

As shown in FIG. 1, the display panel 110 includes a plurality of pixels PIX subjected to a two-dimensional arrangement (e.g., p rows by q columns, where p and q are positive integers) in a row direction (horizontal direction of the figure) and a column direction (vertical direction of the figure), a plurality of select lines Ls each arranged so as to be connected to each pixel PIX in the row direction, a plurality of power-source lines La arranged in the same manner as that of the select line Ls, a common electrode Ec provided so as to be sheared by all pixels PIX, and a plurality of data lines Ld each arranged so as to be connected to each pixel PIX arranged in the column direction. As will be discussed later, each pixel PIX includes a pixel driving circuit and a light emitting element.

The select driver 120 is connected to individual select lines Ls arranged in the display panel 110. The select driver 120 successively applies select signals Ssel each having a predetermined voltage level (a selecting level: Vgh or a non-selecting level: Vgl) to the select lines Ls of individual rows at predetermined timings based on a select control signal (e.g., a scanning clock signal and a scanning start signal) supplied from the controller 160 to be discussed later.

A detailed illustration of the configuration of the select driver 120 is omitted but the select driver 120 includes, for example, a shift register that successively outputs shift signals corresponding to the select lines Ls of individual rows based on the select control signal supplied from the controller 160, and an output buffer which converts the shift signal to a predetermined signal level (a selecting level, e.g., a high level), and which successively outputs the select signals Ssel to the select lines Ls of individual rows.

The power-source driver 130 is connected to individual power-source lines La arranged in the display panel 110. The power-source driver 130 applies a power-source voltage Vsa with a predetermined voltage level (a light emitting level: ELVDD or a non light emitting level: DVSS) to the power-source line La of each row at a predetermined timing based on a power-source control signal (e.g., an output control signal) supplied from the controller 160 to be discussed later.

The voltage control circuit 150 is connected to the common electrode Ec commonly connected to individual pixels PIX that are subjected to a two-dimensional arrangement in the display panel 110. The voltage control circuit 150 applies a voltage (an setting voltage) ELVSS with a predetermined voltage level (e.g., a ground electric potential GND or either a voltage value with a negative voltage level (negative electric potential) and having an absolute value based on the average value or the maximum value of detected data $n_{meas}(t_c)$ to be discussed later or a voltage value corresponding to a detection voltage Vdac to be discussed later) to the common electrode Ec connected to the cathode of an organic EL device (light emitting element) OEL in each pixel PIX at a predetermined timing based on a voltage control signal supplied from the controller 160 to be discussed later.

The data driver 140 is connected to individual data lines Ld of the display panel 110, generates a gradation signal (a gradation voltage Vdata) according to image data at the time of display operation (a writing operation) based on a data control signal supplied from the controller 160 to be discussed later, and supplies the gradation signal to each pixel PIX through each data line Ld. Moreover, at the time of characteristic parameter obtaining operation to be discussed later, the data driver 140 applies a detection voltage Vdac with a voltage value set beforehand to the pixel PIX which is subjected to the characteristic parameter obtaining operation through each data line Ld. The data driver 140 takes a voltage Vd of the data line Ld (hereinafter, referred to as a data line voltage Vd) after a predetermined elapse time t has elapsed from application of the above-explained detection voltage Vdac as a detected voltage Vmeas(t), and converts such a voltage to a detected data $n_{meas}(t)$ and outputs it.

That is, the data driver 140 has both data driver function and voltage detecting function, and is configured to change a function between those two functions based on a data control signal supplied from the controller 160 to be discussed later. The data driver function executes an operation of converting image data in the form of digital data supplied through the controller 160 into an analog signal voltage, and of outputting such analog signal voltage as a gradation signal (the gradation voltage Vdata) to the data line Ld. Moreover, the voltage detecting function executes an operation of taking in the data line voltage Vd as the detected voltage Vmeas(t), of converting it into digital data, and of outputting such a detected voltage as detected data $n_{meas}$(t) to the controller 160.

Figure 2:
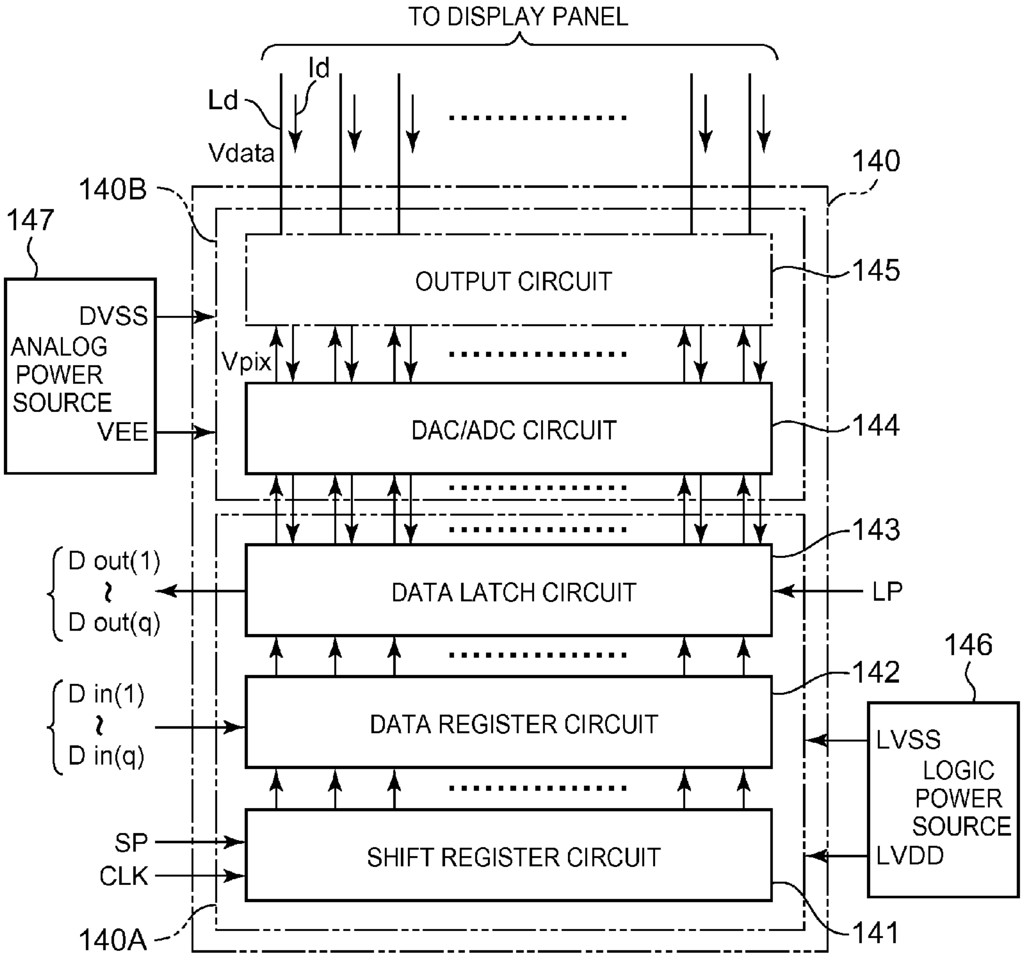
FIG. 2 is a schematic block diagram showing an illustrative data driver applied to a display device according to a first embodiment.
Figure 3:
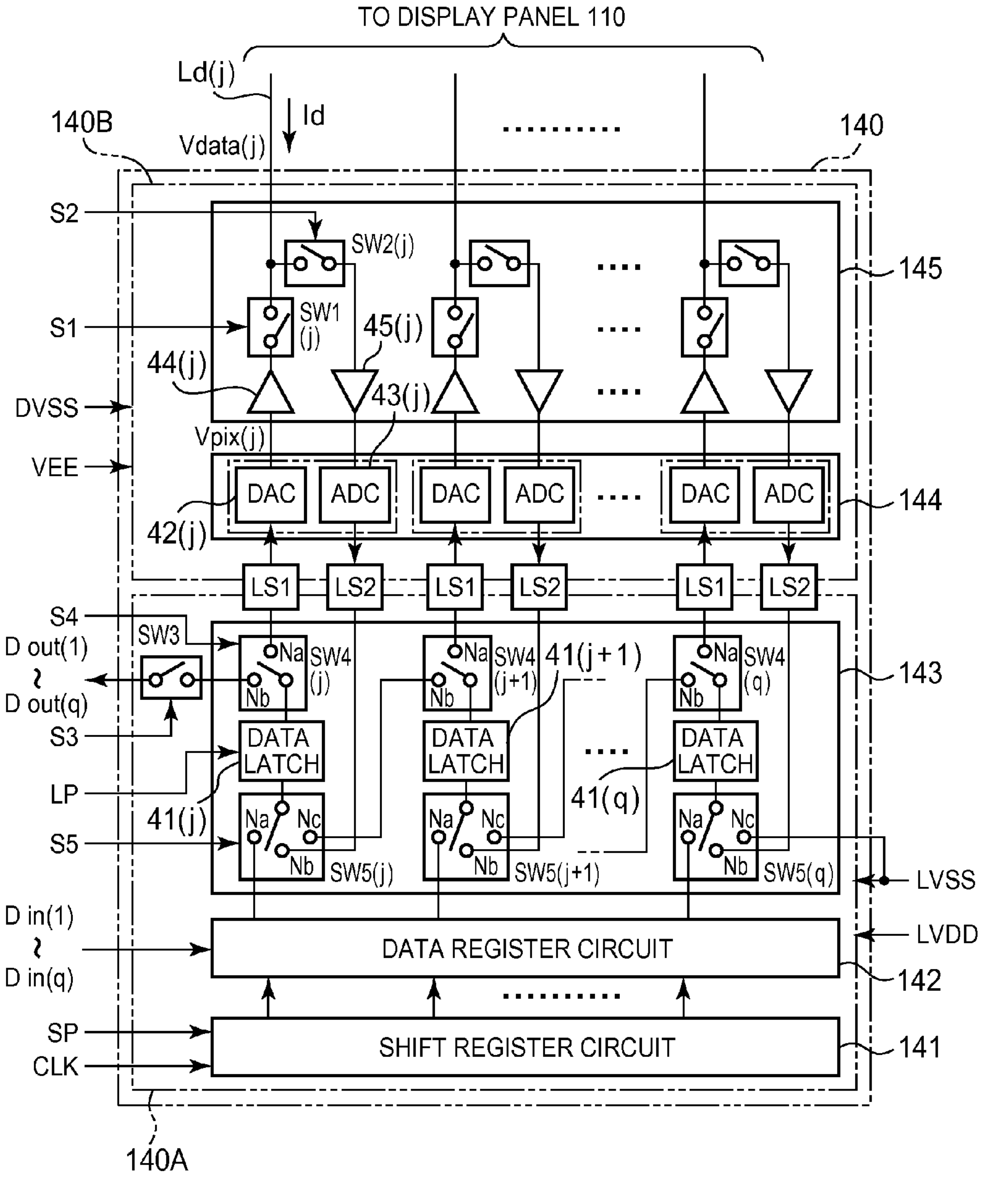
FIG. 3 is a schematic circuit configuration diagram showing an illustrative configuration of a major part of the data driver applied to the display device of the first embodiment.

FIG. 2 is a schematic block diagram showing an illustrative data driver used in the display device of the present embodiment. FIG. 3 is a schematic circuit configuration diagram showing an illustrative configuration of a major part of the data driver shown in FIG. 2. Only some of the column numbers (q) of the pixels PIX arranged in the display panel 110 are shown in order to simplify the illustration. In the following explanation, a detailed explanation will be given of the internal configuration of the data driver 140 provided at the data line Ld of a jth column (where j is a positive integer that satisfies 1≤j≤q). In FIG. 3 the shift resister circuit and the data register circuit both shown in FIG. 3 are shown in a simplified manner.

The data driver 140 includes, for example, as shown in FIG. 2, a shift register circuit 141, a data register circuit 142, a data latch circuit 143, a DAC/ADC circuit 144, and an output circuit 145. An internal circuit 140A including the shift register circuit 141, the data register circuit 142, and the data latch circuit 143 executes an taking-in operation of image data and a transmitting operation of detected data, both operations being discussed later, based on power-source voltages LVSS and LVDD supplied from a logic power source 146. An internal circuit 140B including the DAC/ADC circuit 144 and the output circuit 145 executes a gradation-signal generating/outputting operation and a data-line-voltage detecting operation both discussed later based on power-source voltages DVSS and VEE supplied from an analog power source 147.

The shift register circuit 141 generates a shift signal based on a data control signal (a start pulse signal SP, a clock signal CLK) supplied from the controller 160, and successively outputs the shift signals to the data register circuit 142. The data register circuit 142 includes registers (not shown) by what corresponds to the number of columns (q) of the pixels PIX arranged in the above-explained display panel 110, and successively takes in pieces of image data Din(1) to Din(q) by what corresponds to a row based on an input timing of the shift signal supplied from the shift register circuit 141. The pieces of image data Din(1) to Din(q) are serial data formed by digital signals.

The data latch circuit 143 holds image data Din(1) to Din (q) by what corresponds to a row taken in by the data register circuit 142 in association with each column based on a data control signal (a data latch pulse signal LP) at the time of display operation (the image data taking-in operation, and the gradation-signal generating/outputting operation). Thereafter, the data latch circuit 143 transmits the image data Din(1) to Din(q) to the DAC/ADC circuit 144 to be discussed later at a predetermined timing. Moreover, the data latch circuit 143 holds detected data $n_{meas}$(t) in accordance with each detected voltage Vmeas(t) taken in through the DAC/ADC circuit 144 to be discussed later at the time of characteristic parameter obtaining operation (the detected-data transmitting operation and the data-line-voltage detecting operation). Thereafter, the data latch circuit 143 outputs the detected data $n_{meas}$(t) as serial data to the controller 160 at a predetermined timing. The output detected data $n_{meas}$(t) is stored in a memory in the controller 160.

More specifically, as shown in FIG. 3, the data latch circuit 143 includes a switch SW3 for outputting data, data latches 41(*j*) provided for individual columns, and switches SW4(*j*), SW5(*j*) for changing over a connection. The data latch 41(*j*) holds (latches) digital data (image data Din(1) to Din(q)) supplied through the switch SW5(*j*) at, for example, a rising timing of a data latch pulse signal LP.

The switch SW5(*j*) is subjected to a switching control in order to selectively connect any one of the data register circuit 142 at a contact Na side, an ADC 43(*j*) of the DAC/ADC circuit 144 at a contact Nb side, and a data latch 41(*j*+1) of an adjoining column (j+1) at a contact Nc side to the data latch 41(*j*) based on a data control signal (a switch control signal S5) supplied from the controller 160. Accordingly, when the switch SW5(*j*) is set so as to be connected to the contact Na side, image data Din(j) supplied from the data register circuit 142 is held by the data latch 41(*j*). When the switch SW5(*j*) is set so as to be connected to the contact Nb side, detected data $n_{meas}$(t) in accordance with the data line voltage Vd (detected voltage Vmeas(t)) taken in by the ADC 43(*j*) of the DAC/ADC circuit 144 from the data line Ld(j) is held by the data latch 41(*j*). When the switch SW5(*j*) is set so as to be connected to the contact Nc side, detected data $n_{meas}$(t) held by the data latch 41(*j*+1) through a switch SW4(*j*+1) of the adjoining column (j+1) is held by the data latch 41(*j*). A switch SW5(*q*) provided at the last column (q) has the contact Nc connected to the power-source voltage LVSS of the logic power source 146.

The switch SW4(*j*) is subjected to a switching control in order to selectively connect either one of a DAC 42(*j*) of the DAC/ADC circuit 144 at the contact Na side or the switch SW3 at the contact Nb side (or a switch SW5(*j*−1) (not shown in the figure) of an adjoining column (*j*−1)) to the data latch 41(*j*) based on a data control signal (a switch control signal S4) supplied from the controller 160. Accordingly, when the switch SW4(*j*) is set so as to be connected to the contact Na side, image data Din(j) held by the data latch 41(*j*) is supplied to the DAC 42(*j*) of the DAC/ADC circuit 144. When the switch SW4(*j*) is set so as to be connected to the contact Nb side, detected data $n_{meas}$(t) in accordance with the detected voltage Vmeas(t) held by the data latch 41(*j*) is output to the controller 160 through the switch SW3. The detected data $n_{meas}$(t) output is stored in the memory in the controller 160.

The switch SW3 is controlled so as to be electrically conducted based on a data control signal (a switch control signal S3, a data latch pulse signal LP) in a condition in which the switches SW4(*j*), SW5(*j*) of the data latch circuit 143 are subjected to a switching control based on data control signals (the switch control signals S4, S5) supplied from the controller 160 and the data latches 41(1) to 41(*q*) of adjoining columns are mutually connected in series. Accordingly, detected data $n_{meas}$(t) in accordance with the detected voltage Vmeas (t) held by each data latch 41(1) to 41(*q*) of each column is successively taken out as serial data through the switch SW3, and is output to the controller 160.

Figure 4A:
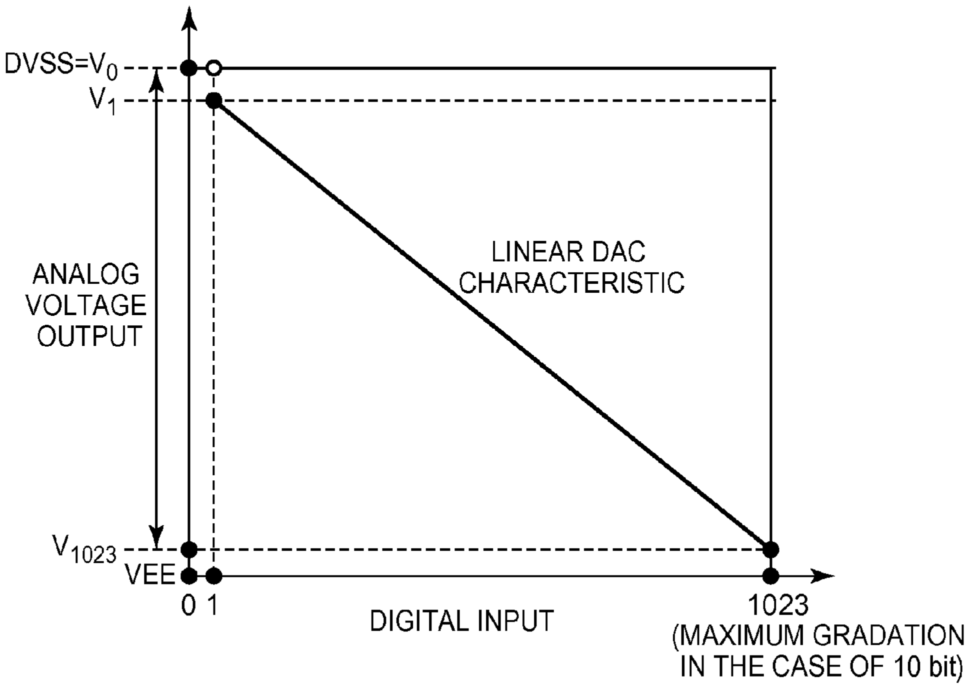
FIG. 4A is a diagram showing an input/output characteristic of a digital/analog converter circuit applied to the data driver of the first embodiment.
Figure 4B:
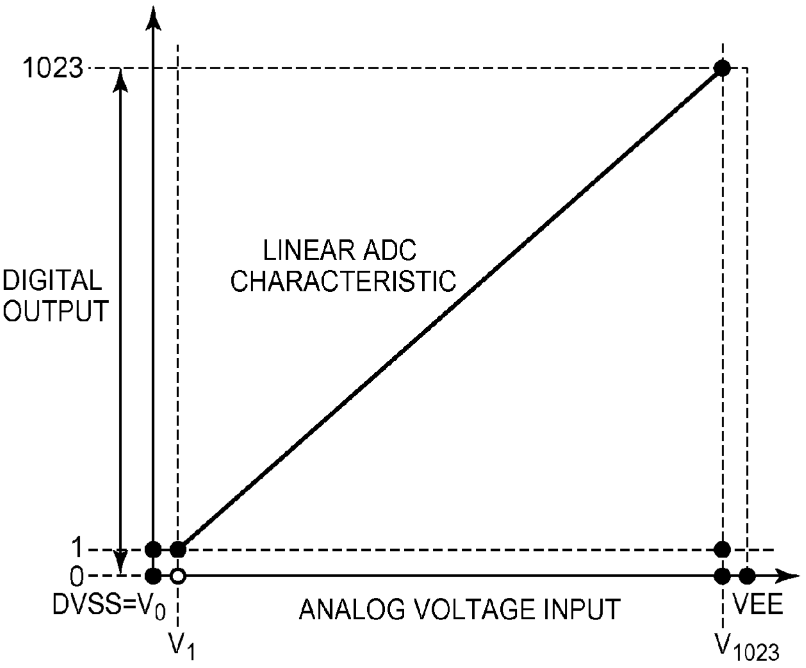
FIG. 4B is a diagram showing an input/output characteristic of an analog/digital converter circuit applied to the data driver of the first embodiment.

FIGS. 4A and 4B are diagrams showing an input/output characteristic of a digital/analog converter circuit (DAC) and that of an analog/digital converter circuit (ADC) both used in the data driver of the present embodiment. FIG. 4A shows the input/output characteristic of the DAC of the present embodiment, and FIG. 4B shows the input/output characteristic of the ADC of the present embodiment. An illustrative input/output characteristic of the digital/analog converter circuit and that of the analog/digital converter circuit when the input/output bit number of a digital signal is 10 bits are shown.

As shown in FIG. 3, the DAC/ADC circuit 144 includes a linear voltage digital/analog converter circuit (DAC: voltage applying circuit) 42(*j*) corresponding to each column, and an analog/digital converter circuit (ADC: voltage obtaining circuit) 43(*j*) corresponding to each column. The DAC 42(*j*)

converts image data Din(j) in the form of digital data held by the data latch circuit 143 into an analog signal voltage Vpix, and outputs such a voltage to the output circuit 145.

The DAC 42(*j*) provided at each column has, as shown in FIG. 4A, a linear conversion characteristic (the input/output characteristic) for an analog signal output relative to input digital data. That is, the DAC 42(*j*) converts digital data (0, 1, . . . and 1023) of 10 bits (i.e., 1024 gradations) into an analog signal voltage ($V_0$, $V_1$, . . . and $V_{1023}$) set so as to have a linear characteristic as shown in FIG. 4A. The analog signal voltage ($V_0$ to $V_{1023}$) is set within the range of power-source voltages DVSS to VEE supplied from the analog power source 147 to be discussed later where DVSS>VEE. For example, the analog signal voltage $V_0$ converted when the value of input digital data is "0" (0th gradation) is set so as to be the power-source voltage DVSS, and the analog signal voltage $V_{1023}$ converted when the value of the digital data is "1023" (1023th gradation: maximum gradation) is set so as to be a voltage value higher than the power-source voltage VEE and close to the power-source voltage VEE.

The ADC 43(*j*) converts detected voltage Vmeas(t) formed by an analog signal voltage obtained from the data line Ld(j) into detected data $n_{meas}$(t) in the form of digital data, and transmits such data to the data latch 41(*j*). The ADC 43(*j*) provided at each column has a linear conversion characteristic (the input/output characteristic) for digital data to be output relative to an input analog signal voltage as shown in FIG. 4B. The ADC 43(*j*) is set in such a way that the bit width of digital data at the time of voltage conversion becomes equal to that of the DAC 42(*j*). That is, the ADC 43(*j*) has a voltage width which corresponds to the minimum unit bit (1 LSB: analog resolution) and which is set to be equal to that of the DAC 42(*j*).

The ADC 43(*j*) converts an analog signal voltage ($V_0$, $V_1$, . . . and $V_{1023}$) set within the range of the power-source voltages DVSS to VEE as shown in FIG. 4B into digital data (0, 1, . . . and 1023) of 10 bits (1024 gradations) set so as to have a linearity. The ADC 43(*j*) is set in such a way that the value of digital data is converted into "0" (0th gradation) when the voltage value of an input analog signal is, for example, $V_0$ (=DVSS) and is converted into a digital signal value "1023" (1023rd gradation: maximum gradation) when the voltage value of the analog signal voltage is higher than the power-source voltage VEE and is an analog signal voltage $V_{1023}$ that is a voltage value close to the power-source voltage VEE.

According to the present embodiment, the internal circuit 140A including the shift register circuit 141, the data register circuit 142, and the data latch circuit 143 configures a low-voltage circuit where the withstanding voltage is low, and the internal circuit 140B including the DAC/ADC circuit 144, and the output circuit 145 to be discussed later configures a high-voltage circuit where the withstanding voltage is high. Accordingly, a level shifter LS1(*j*) that is a voltage adjusting circuit from the low-voltage internal circuit 140A to the high-voltage internal circuit 140B is provided between the data latch circuit 143 (the switch SW4(*j*)) and the DAC 42(*j*) of the DAC/ADC circuit 144. Moreover, a level shifter LS2(*j*) that is a voltage adjusting circuit from the high-voltage internal circuit 140B to the low-voltage internal circuit 140A is provided between the ADC 43(*j*) of the DAC/ADC circuit 144 and the data latch circuit 143 (the switch SW5(*j*)).

As shown in FIG. 3, the output circuit 145 includes a buffer 44(*j*) and a switch SW1(*j*) (a connection switching circuit) for outputting a gradation signal to the data line Ld(j) corresponding to each column, and a switch SW2(*j*) and a buffer 45(*j*) for taking in a data line voltage Vd (a detected voltage Vmeas(t)).

The buffer 44(*j*) amplifies an analog signal voltage Vpix(j) generated by performing analog conversion on image data Din(j) by the DAC 42(*j*) to a predetermined signal level, and generates a gradation voltage Vdata(j). The switch SW1(*j*) controls application of the gradation voltage Vdata(j) to the data line Ld(j) based on a data control signal (a switch control signal S1) supplied from the controller 160.

Moreover, the switch SW2(*j*) controls taking-in of the data line voltage Vd (the detected voltage Vmeas(t)) based on a data control signal (a switch control signal S2) supplied from the controller 160. The buffer 45(*j*) amplifies the detected voltage Vmeas(t) taken in through the switch SW2(*j*) to a predetermined signal level, and transmits such an amplified voltage to the ADC 43(*j*).

The logic power source 146 supplies a low-electric potential power-source voltage LVSS and a high-electric potential power-source voltage LVDD which are logic voltages, respectively, and which are for driving the internal circuit 140A including the shift register circuit 141 of the data driver 140, the data register circuit 142, and the data latch circuit 143. The analog power source 147 supplies a high-electric potential power-source voltage DVSS and a low-electric potential power-source voltage VEE which are analog voltages, respectively, and which are for driving the internal circuit 140B including the DAC 42(*j*) and the ADC 43(*j*) of the DAC/ADC circuit 144, and the buffers 44(*j*), 45(*j*) of the output circuit 145.

The data driver 140 shown in FIGS. 2 and 3, in order to simplify the illustration, has a configuration in which a control signal for controlling the operation of each unit is input into the data latch 41 provided correspondingly to the data line Ld(j) of the jth column (in the figure, the first column) and the switches SW1 to SW5. According to the present embodiment, however, it is needless to say that such control signals are commonly input into the configurations of individual columns.

Figure 5:
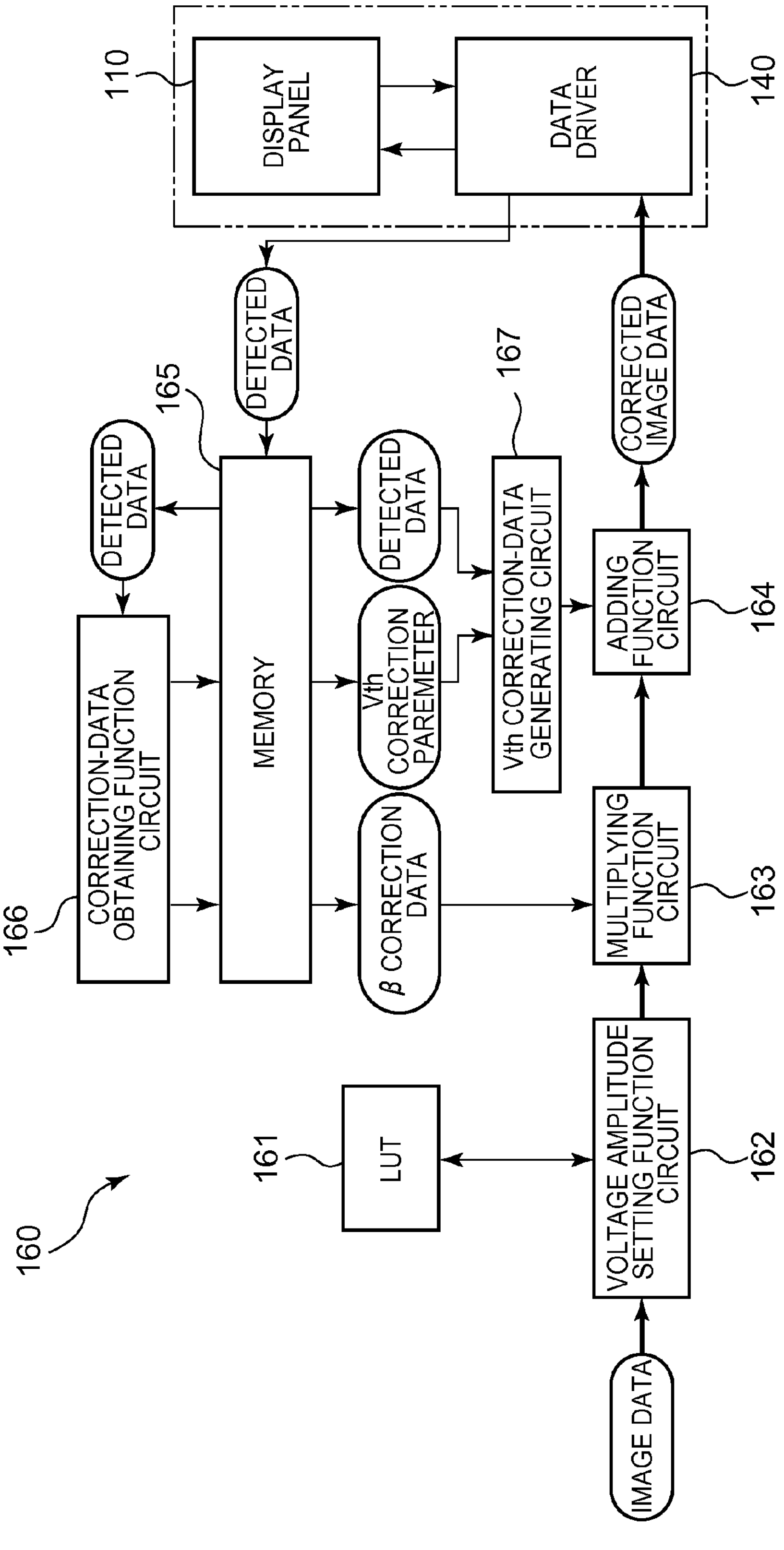
FIG. 5 is a functional block diagram showing a function of a controller used in the display device of the first embodiment.

FIG. 5 is a functional block diagram showing a function of the controller used in the display device of the present embodiment. In FIG. 5, in order to simplify the illustration, respective flows of pieces of data among individual function blocks are all indicated by respective solid line arrows. In practice, as will be discussed later, any one of the data flows is enabled in accordance with the operation state of the controller 160.

The controller 160 controls respective operation states of, at least the select driver 120, the power-source driver 130, the data driver 140, and the voltage control circuit 150. Hence, the controller 160 generates the select control signal, the power-source control signal, the data control signal, and the voltage control signal for executing predetermined driving/controlling operation in the display panel 110, and outputs such signals to individual drivers 120, 130, and 140, and the control circuit 150.

In particular, in the present embodiment, as the controller 160 supplies the select control signal, the power-source control signal, the data control signal, and the voltage control signal, the select driver 120, the power-source driver 130, the data driver 140, and the voltage control circuit 150 are allowed to operate at individual predetermined timings, thereby controlling an operation of obtaining the characteristic parameter of each pixel PIX of the display panel 110 (the characteristic parameter obtaining operation). Moreover, the controller 160 controls an operation (display operation) of displaying image information in accordance with image data corrected based on the characteristic parameter of each pixel PIX on the display panel 110.

More specifically, in the characteristic parameter obtaining operation, the controller 160 obtains various kinds of correction data based on detected data (which will be discussed in more detail later) relating to a characteristic change in each pixel PIX detected through the data driver 140. Moreover, in the display operation, the controller 160 corrects image data supplied from the exterior based on the correction data obtained through the characteristic parameter obtaining operation, and supplies the corrected image data to the data driver 140.

More specifically, an image data correcting circuit of the controller 160 of the present embodiment generally includes, as shown in FIG. 5, a voltage-amplitude setting function circuit 162 with a look-up table (LUT) 161, a multiplying function circuit (an image data correcting circuit) 163, an adding function circuit (an image data correcting circuit) 164, a memory (a memory circuit) 165, a correction-data obtaining function circuit 166, and a Vth correction data generating circuit (an image data correcting circuit) 167.

The voltage-amplitude setting function circuit 162 refers to the look-up table 161 for image data in the form of digital data supplied from the exterior, and performs conversion on respective voltage amplitudes corresponding to each color of red (R), green (G), and blue (B). The maximum value of the voltage amplitude of the converted image data is set to be equal to or smaller than a value obtained by subtracting a correction amount based on the characteristic parameter of each pixel from the maximum value of the input range of the DAC 42 of the data driver 140.

The multiplying function circuit 163 multiplies the image data by correction data on a current amplification factor β obtained based on the detected data relating to the characteristic change in each pixel PIX. The Vth correction data generating circuit 167 generates correction data $n_{th}$ for a threshold voltage Vth of the driving transistor based on the correction data on the current amplification factor β and parameters (Vth correction parameter $n_{offset}$, $<\xi>\cdot t_0$, which will be discussed later) relating to the characteristic change in each pixel PIX and detected data $n_{meas}(t_0)$. The adding function circuit 164 adds the correction data $n_{th}$ generated by the Vth correction data generating circuit 167 to image data output by the multiplying function circuit 163, and supplies such data as corrected image data to the data driver 140.

The correction-data obtaining function circuit 166 obtains parameters defining correction data on the current amplification factor β and on the threshold voltage Vth based on the detected data relating to the characteristic change in each pixel PIX.

The memory 165 stores the detected data for each pixel PIX transmitted from the data driver 140 in association with each pixel PIX. Moreover, at the time of addition process by the adding function circuit 164, and at the time of correction-data obtaining process by the correction-data obtaining function circuit 166, the detected data is read from the memory 165. Furthermore, the memory 165 stores correction data and correction parameter obtained by the correction-data obtaining function circuit 166 in association with each pixel PIX. At the time of multiplication process by the multiplying function circuit 163 and at the time of addition process by the adding function circuit 164, the correction data and the correction parameter are read from the memory 165.

In the controller 160 shown in FIG. 5, the correction-data obtaining function circuit 166 may be a computing device (e.g., a personal computer or a CPU) provided outside the controller 160. Moreover, in the controller 160 shown in FIG. 5, the memory 165 may be a distinct memory as long as it stores the detected data, the correction data and the correction parameter in association with each pixel PIX. In this case, the memory 165 may be a memory device provided outside the controller 160.

The image data supplied to the controller 160 is formed as serial data that is obtained by, for example, extracting a brightness/gradation signal component from an image signal and by converting the brightness/gradation signal component into a digital signal for each row of the display panel 110.

<Pixel>

Figure 6:
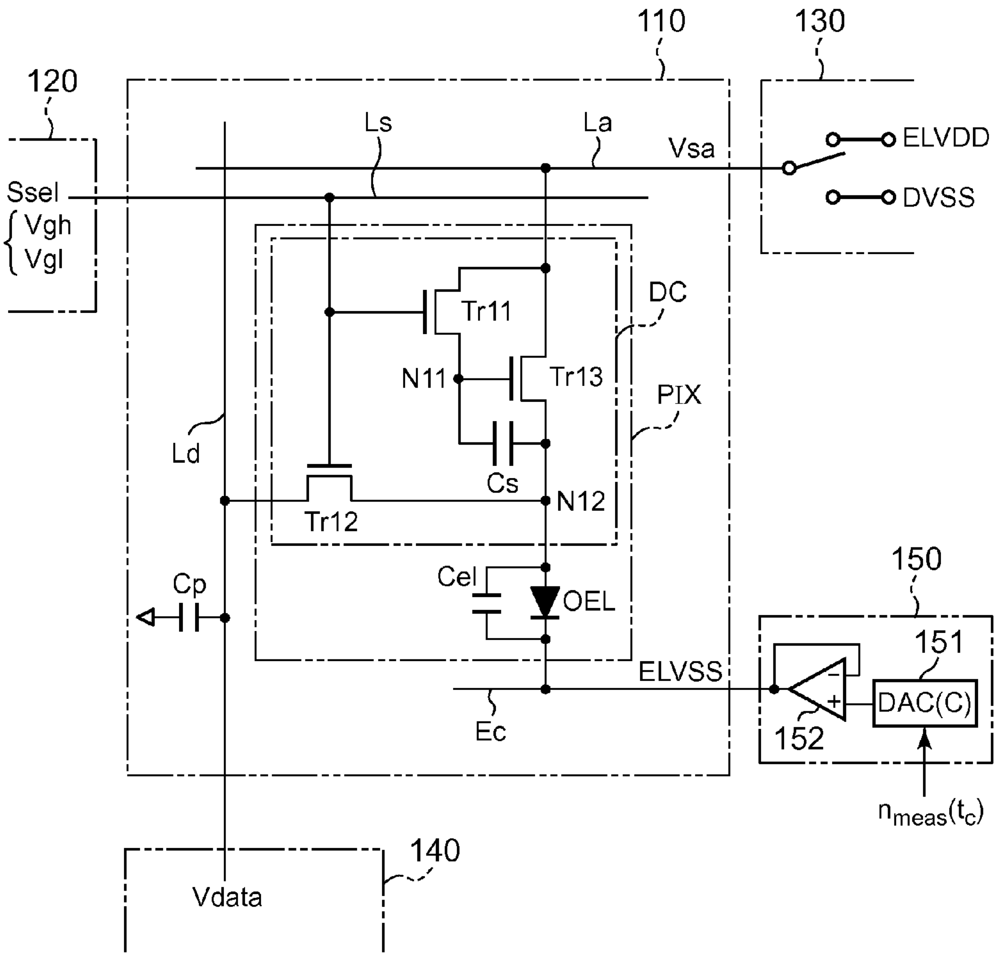
FIG. 6 is a circuit configuration diagram showing an example of a pixel (a pixel driving circuit and a light emitting element) and a voltage control circuit both used in a display panel according the first embodiment.

Next, a detailed explanation will be given of the pixels arranged in the display panel and the voltage control circuit according to the present embodiment. FIG. 6 is a circuit configuration diagram showing an example of the pixel (the pixel driving circuit and the light emitting element) in the display panel of the present embodiment and the voltage control circuit.

As shown in FIG. 6, the pixel PIX in the display panel 110 according to the present embodiment is arranged in the vicinity of the intersection between the select line Ls connected to the select driver 120 and the data line Ld connected to the data driver 140. Each pixel PIX includes an organic EL device OEL that is a current-driven light emitting element, and a pixel driving circuit DC that generates a current for driving the organic EL device OEL to emit light.

The pixel driving circuit DC shown in FIG. 6 includes transistors Tr11 to Tr13, and a capacitor (a capacitive element) Cs. The transistor (a second transistor) Tr11 has a gate connected to the select line Ls, has either one of a drain and a source connected to the power-source line La, and has another one of the drain and the source connected to a contact N11. The transistor Tr12 has a gate connected to the select line Ls, has either one of a drain and a source connected to the data line Ld, and has another one of the drain and the source connected to a contact N12. The transistor (a driving device, a first transistor) Tr13 has a gate connected to the contact N11, has either one of a drain and a source connected to the power-source line La, and has another one of the drain and the source connected to the contact N12. The capacitor (the capacitive element) Cs is connected between the gate (the contact N11) of the transistor Tr13 and another one of the drain and the source (the contact N12). The capacitor Cs may be a parasitic capacitance formed between the gate of the transistor Tr13 and the source thereof, or a distinct capacitive element may be connected in parallel between the contact N11 and the contact N12 in addition to the parasitic capacitance.

The organic EL device OEL has an anode (an anode electrode) connected to the contact N12 of the pixel driving circuit DC, and has a cathode (a cathode electrode) connected to the common electrode Ec. As shown in FIG. 6, the common electrode Ec is connected to the voltage control circuit 150, and the voltage ELVSS set to be a predetermined voltage value in accordance with the operation state of the pixel PIX is applied to the common electrode Ec. In the pixel PIX shown in FIG. 6, a pixel capacitance Cel is present in the organic EL device OEL in addition to the capacitor Cs, and a line parasitic capacitance Cp is present in the data line Ld.

The voltage control circuit 150 includes, for example, a D/A converter (“DAC(C)” in the FIG. 151 for generating a voltage, and a follower amplifier 152 connected to the output terminal of the D/A converter 151. The D/A converter 151 converts a predetermined digital value supplied from the controller 160 as a voltage control signal into an analog signal voltage. The digital value supplied from the controller 160 to the voltage control circuit 150 (the D/A converter 151) is, when correction data $\Delta\beta$ for correcting the current amplification factor $\beta$ of each pixel is obtained through the characteristic parameter obtaining operation to be discussed later, detected data $n_{meas}(t_c)$ extracted based on the characteristic parameter of each pixel PIX. Moreover, the digital value is, when correction data $n_{th}$ for correcting the varying in the threshold voltage Vth of the transistor Tr13 of each pixel PIX is obtained through the characteristic parameter obtaining operation to be discussed later, a digital value in accordance with the detection voltage Vdac applied to the data line Ld. The follower amplifier 152 operates as a polarity inverting circuit and a buffer circuit against the output by the D/A converter 151. Accordingly, the analog signal voltage output by the D/A converter 151 is converted by the follower amplifier 152 into the voltage ELVSS having an absolute value corresponding to the analog signal voltage output by the D/A converter 151 and having a negative voltage level, and is applied to the common electrode Ec connected to each pixel PIX of the display panel 110. Moreover, at the time of display operation (the writing operation and the light emitting operation) by the display panel 110, the voltage ELVSS that is a ground electric potential GND for example is applied to the common electrode Ec directly from a non-illustrated constant voltage source or through the voltage control circuit 150.

At the time of display operation (the writing operation and the light emitting operation) by the pixel PIX according to the present embodiment, a relationship among a power-source voltage Vsa (ELVDD, DVSS) applied from the power-source driver 130 to the power-source line La, the voltage ELVSS applied to the common electrode Ec, and the power-source voltage VEE supplied from the analog power source 147 to the data driver 140 is set so as to satisfy a condition represented by a following formula (1). In this case, the voltage ELVSS applied to the common electrode Ec is set to be, for example, the ground electric potential GND.

$$\left.\begin{aligned} &DVSS < ELVDD \\ &DVSS = ELVSS\ (=GND) \\ &VEE < ELVSS \end{aligned}\right\} \quad (1)$$

It is presumed in the formula (I) that the voltage ELVSS applied to the common electrode Ec has the same electric potential as that of the power-source voltage DVSS, and is set to be, for example, the ground electric potential GND, but the voltage setting is not limited to this case. For example, the voltage ELVSS may have a lower electric potential than that of the power-source voltage DVSS, and an electric potential difference between the power-source voltage DVSS and the voltage ELVSS may be set to be a voltage value smaller than a light emitting threshold voltage at which the organic EL device OEL starts emitting light.

Moreover, in the pixel PIX shown in FIG. 6, regarding the transistors Tr11 to Tr13, thin-film transistors (TFT) with the same channel type for example may be respectively used. The transistors Tr11 to Tr13 may be each an amorphous silicon thin-film transistor, or a polysilicon thin-film transistor.

In particular, as shown in FIG. 6, when an n-channel thin-film transistor is used as each of the transistors Tr11 to Tr13, while at the same time, an amorphous silicon thin-film transistor is used as each of the transistors Tr11 to Tr13, it is possible to realize a transistor with a relatively uniform operation characteristic (an electron mobility or the like) and which is stable through a simple manufacturing process in comparison with poly-crystal and single-crystal silicon thin-film transistor if the amorphous silicon manufacturing technology already established is applied.

In the foregoing pixel PIX, an illustrative circuit configuration in which three transistors Tr11 to Tr13 are used as the pixel driving circuit DC and the organic EL device OEL is used as the light emitting element is employed. The present invention is, however, not limited to this circuit configuration, and the other circuit configurations with equal to or greater than three transistors may be employed. Moreover, the light emitting element driven by the pixel driving circuit DC may be the other light emitting elements like a light emitting diode as long as it is the current-driven light emitting element.

<Display Device Driving/Controlling Method>

Next, an explanation will be given of a driving/controlling method of the display device 100 of the present embodiment. The driving/controlling operation of the display device 100 of the present embodiment includes the characteristic parameter obtaining operation and the display operation.

In the characteristic parameter obtaining operation, the display device 100 obtains parameters for compensating the varying in the electrical characteristic of each pixel PIX arranged in the display panel 110. More specifically, the display device 100 obtains a parameter for correcting the varying in the threshold voltage Vth of the transistor (the driving transistor) Tr13 provided in the pixel driving circuit DC of each pixel PIX, and a parameter for correcting the varying in the current amplification factor $\beta$ in each pixel PIX.

In the display operation, the display device 100 generates corrected image data by correcting image data in the form of digital data based on the correction parameters obtained for each pixel PIX through the characteristic parameter obtaining operation, generates the gradation voltage Vdata corresponding to that corrected image data, and writes such a voltage in each pixel PIX (the writing operation). Accordingly, each pixel PIX (the organic EL device OEL) can emit light at original brightness and gradation corresponding to the image data with a change and a varying in the electrical characteristics (the threshold voltage Vth of the transistor Tr13 and the current amplification factor ($\beta$) of each pixel PIX being compensated (the light emitting operation).

Individual operations will be explained in more detail below.

<Characteristic Parameter Obtaining Operation>

First, a specific scheme applied to the characteristic parameter obtaining operation of the present embodiment will be explained. Next, an operation of obtaining characteristic parameters for compensating the threshold voltage Vth and the current amplification factor $\beta$ of each pixel PIX through that scheme will be explained.

First, an explanation will be given of a voltage/current (V/I) characteristic of the pixel driving circuit DC when image data is written in the pixel PIX with the pixel driving circuit DC shown in FIG. 6 from the data driver 140 through the data line Ld (i.e., when a gradation voltage Vdata corresponding to image data is applied).

Figure 7:
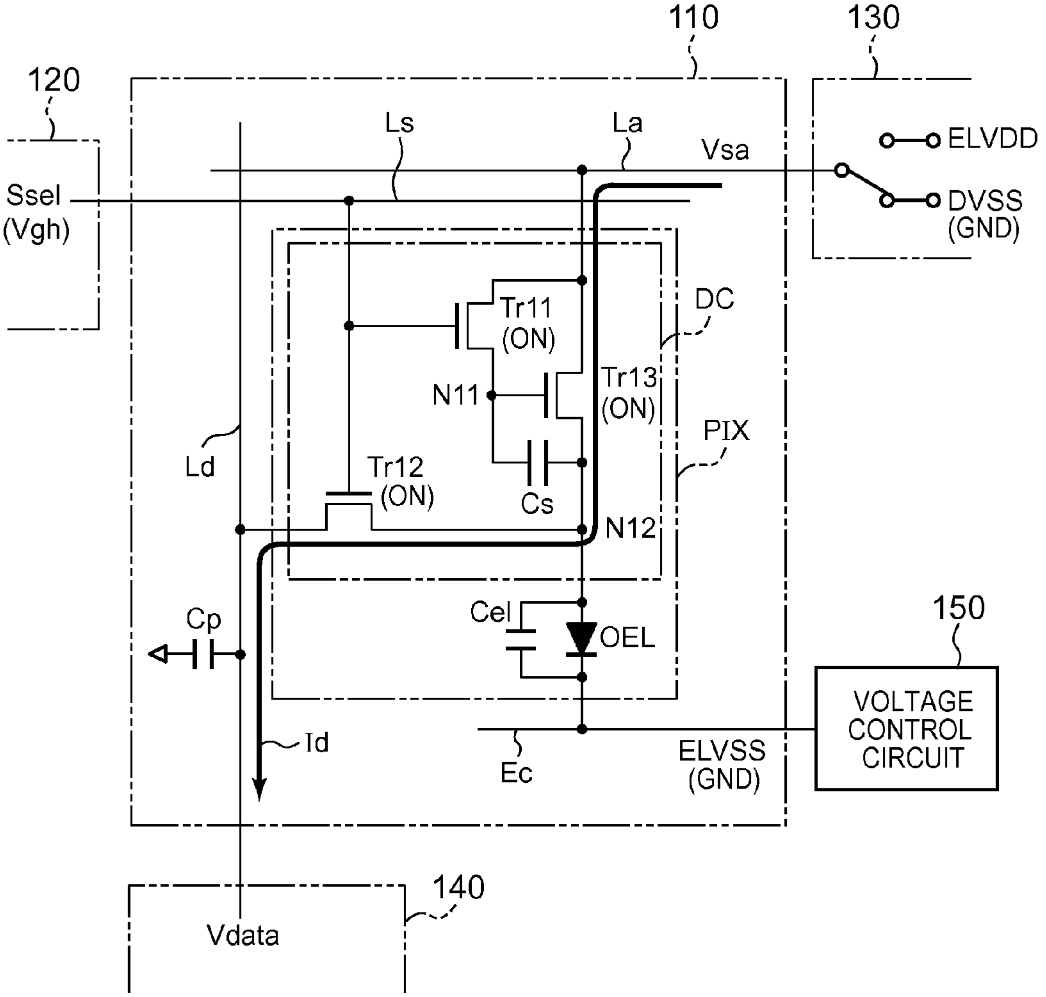
FIG. 7 is a diagram showing an operation state at the time of image data writing of a pixel to which the pixel driving circuit of the first embodiment is applied.
Figure 8:
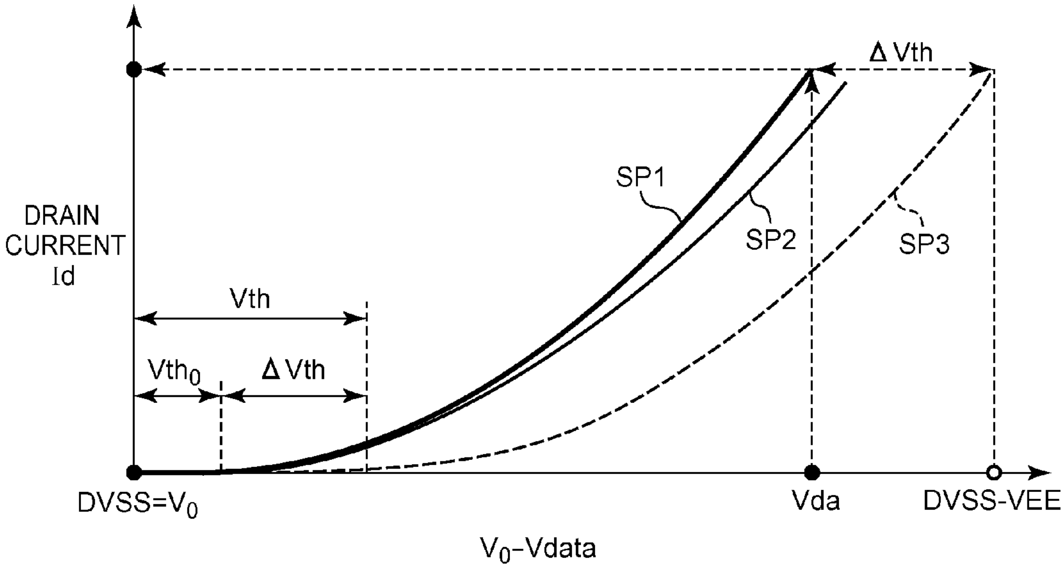
FIG. 8 is a diagram showing a voltage/current characteristic of a pixel to which the pixel driving circuit of the first embodiment is applied at the time of a writing operation.

FIG. 7 is a diagram showing an operation state of the pixel using the pixel driving circuit of the present embodiment when image data is written. Moreover, FIG. 8 is a diagram showing a voltage/current characteristic of the pixel using the pixel driving circuit of the present embodiment at the time of writing operation.

In the writing operation of image data in the pixel PIX according to the present embodiment, as shown in FIG. 7, as the select driver 120 applies a select signal Ssel of a selecting level (a high level: Vgh) through the select line Ls, the pixel PIX is set to be in a selected state. At this time, as the transistors Tr11, Tr12 of the pixel driving circuit DC turn on, the transistor Tr13 is caused to be short-circuited between the gate and the drain, and is set to be in a diode-connection state. In the selected state, the power-source driver 130 applies a power-source voltage Vsa (=DVSS, e.g., a ground electric potential GND) of a non light emitting level to the power-source line La. Moreover, a voltage ELVSS set to be, for example, a ground electric potential GND that is the same electric potential as that of the power-source voltage DVSS is applied to the common electrode Ec connected to the cathode of the organic EL device OEL from the voltage control circuit 150 or a non-illustrated constant voltage source. It is not limited that the voltage ELVSS has the same electric potential as that of the power-source voltage DVSS, but the voltage ELVSS may have a lower electric potential than that of the power-source voltage DVSS, and an electric potential difference between the power-source voltage DVSS and the voltage ELVSS may be set to be a voltage value smaller than a light emitting threshold voltage which causes the organic EL device OEL to start emitting light.

In this state, the data driver 140 applies a gradation voltage Vdata with a voltage value in accordance with image data to the data line Ld. The gradation voltage Vdata is set to be a lower voltage value than the power-source voltage DVSS applied to the power-source line La from the power-source driver 130. That is, at the time of writing operation, in the case of an example represented by the formula (1), because the power-source voltage DVSS is set to have the same electric potential (the ground electric potential GND) as that of the voltage ELVSS applied to the common electrode Ec, the gradation voltage Vdata is set to be a negative voltage level.

As a result, as shown in FIG. 7, a drain current Id in accordance with the gradation voltage Vdata starts flowing in the data-line-Ld direction through the power-source line La and the transistors Tr13, Tr12 of the pixel PIX (the pixel driving circuit DC) from the power-source driver 130. At this time, because a voltage lower than the light emitting threshold voltage or a reverse bias voltage is applied to the organic EL device OEL, no light emitting operation is performed.

The circuit characteristic of the pixel driving circuit DC in this case is as follows. If the threshold voltage of the transistor Tr13 is $Vth_0$, and the current amplification factor is β in an initial condition in which the threshold voltage Vth of the transistor Tr13 that is a driving transistor in the pixel driving circuit DC does not vary and the current amplification factor β in the pixel driving circuit DC does not vary, the current value of the drain current Id shown in FIG. 7 can be expressed by a following formula (2).

$$Id=\beta(V_0-V\text{data}-V\text{th}_0)^2 \quad (2)$$

The set values or the standard values of the current amplification factor β and the initial threshold voltage $Vth_0$ of the transistor Tr13 in the pixel driving circuit DC are both constant. Moreover, $V_0$ is the power-source voltage Vsa (=DVSS) of a non light emitting level applied from the power-source driver 130, and a voltage ($V_0$−Vdata) corresponds to an electric potential difference applied to a circuit configuration to which individual current paths of the transistors Tr13, Tr12 are connected in series. A relationship between the value of the voltage ($V_0$−Vdata) applied to the pixel driving circuit DC and the current value of the drain current Id flowing through the pixel driving circuit DC is represented by a characteristic line SP1 in FIG. 8.

If the threshold voltage after the varying (threshold voltage shifting: the variation in the threshold voltage Vth is defined as ΔVth) occurs in the device characteristic of the transistor Tr13 due to a time-dependent change is Vth (=$Vth_0$+ΔVth), the circuit characteristic of the pixel driving circuit DC changes which can be expressed by a following formula (3). Note that Vth is a constant. The voltage/current (V/I) characteristic of the pixel driving circuit DC can be represented by a characteristic line SP3 in FIG. 8.

$$Id=\beta(V_0-V\text{data}-V\text{th})^2 \quad (3)$$

Moreover, in the initial state expressed by the formula (2), if a current amplification factor when the current amplification factor β becomes varied is β', the circuit characteristic of the pixel driving circuit DC can be expressed by a following formula (4)

$$Id=\beta'(V_0-V\text{data}-V\text{th}_0)^2 \quad (4)$$

Note that β' is a constant. The voltage/current (V/I) characteristic of the pixel driving circuit DC at this time can be expressed by a characteristic line SP2 in FIG. 8. The characteristic line SP2 shown in FIG. 8 represents the voltage/current (V/I) characteristic of the pixel driving circuit DC when the current amplification factor β' in the formula (4) is smaller than the current amplification factor β in the formula (2) (β'<β).

In the formula (2) and the formula (4), if the set value or the standard value of the current amplification factor is βtyp, then a parameter (correction data) for correcting the current amplification factor β' to be βtyp is defined as Δβ. At this time, correction data Δβ is given to each pixel driving circuit DC in such a way that a value obtained by multiplication of the current amplification factor β' by the correction data Δβ becomes the current amplification factor of the set value βtyp (i.e., so that β'×Δβ=βtyp is satisfied).

In the present embodiment, the display device 100 obtains characteristic parameters for correcting the threshold voltage Vth of the transistor Tr13 and the current amplification factor β' through a following specific scheme based on the voltage/current characteristics (the formulae (2) to (4) and FIG. 8) of the pixel driving circuit DC. In the present specification, the scheme explained below is referred to as an "auto zero scheme" for convenience sake.

According to the scheme (the auto zero scheme) applied to the characteristic parameter obtaining operation of the present embodiment, with respect to the pixel PIX including the pixel driving circuit DC shown in FIG. 6, in a selected state, the data driver 140 utilizes the data driver function in order to apply a detection voltage Vdac to the data line Ld. Thereafter, the data line Ld is turned to be in a high impedance (HZ) state, so that the electric potential of the data line Ld is naturally eased. Next, the data driver 140 takes a voltage Vd of the data line Ld after a natural elapse is carried out for a certain time (an elapse time t) as a detected voltage Vmeas(t) using the voltage detecting function, and converts such a voltage into detected data $n_{meas}(t)$ in the form of digital data. In the present embodiment, the data driver 140 sets the elapse time t to be different times (timings: $t_0$, $t_1$, $t_2$, and $t_3$) in accordance with a data control signal supplied from the controller 160, and performs taking-in of the detected voltage Vmeas(t) and conversion to the detected data $n_{meas}(t)$ plural times.

Figure 9:
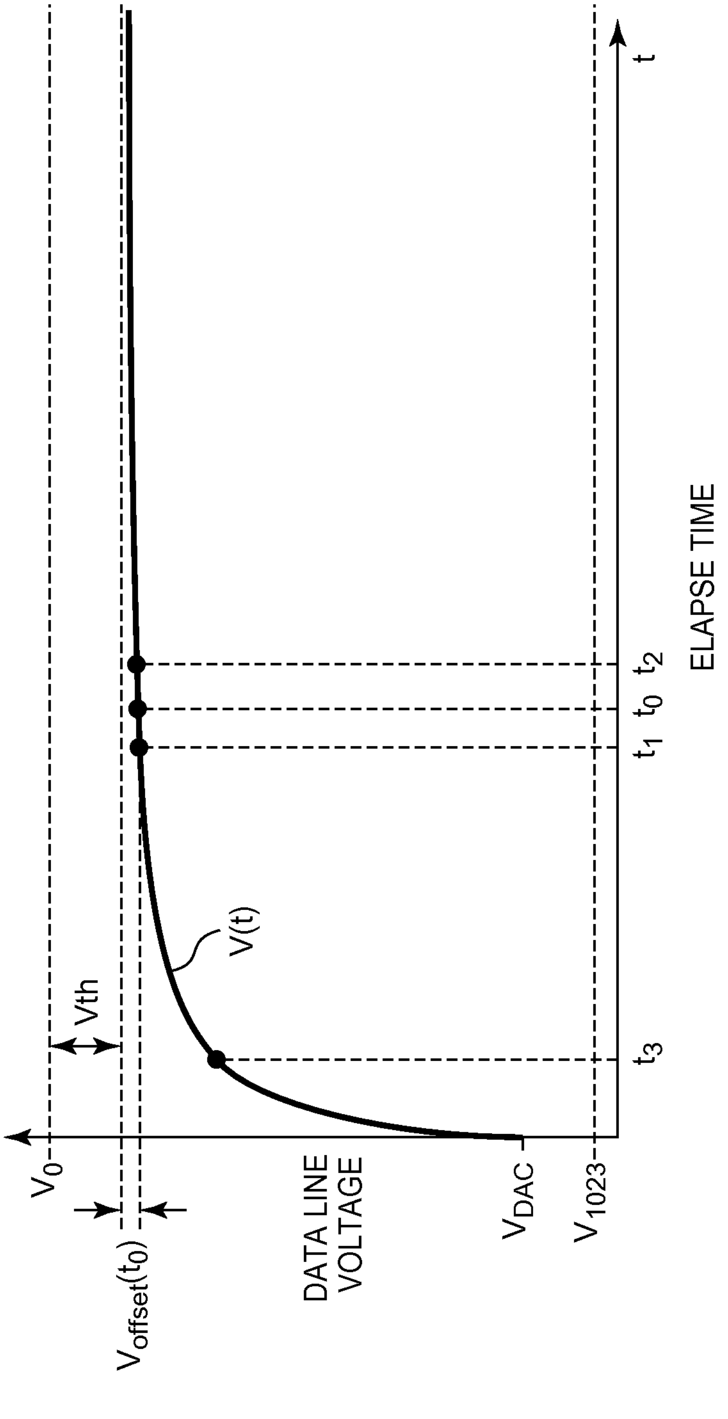
FIG. 9 is a diagram (a transient curve) showing a change in a data line voltage through a scheme (an auto zero scheme) applied to a characteristic parameter obtaining operation according to the first embodiment.

First, an explanation will be given of a basic concept (a basic technique) of the auto zero scheme applied to the characteristic parameter obtaining operation of the present embodiment. FIG. 9 is a diagram (a transient curve) showing a change in the data line voltage through the scheme (the auto zero scheme) applied to the characteristic parameter obtaining operation of the present embodiment.

In the characteristic parameter obtaining operation using the auto zero scheme, first, the data driver 140 applies a detection voltage Vdac to the data line Ld so that a voltage over the threshold voltage of the transistor Tr13 is applied between the gate and the source of the transistor Tr13 (between the contact N11 and the contact N12) of the pixel driving circuit DC with the pixel PIX being set to be in a selected state.

At this time, in the writing operation to the pixel PIX, the power-source driver 130 applies a power-source voltage DVSS ($=V_0$: ground electric potential GND) of a non light emitting level to the power-source line La, and an electric potential difference of ($V_0$−Vdac) is applied between the gate and the source of the transistor Tr13. Accordingly, the detection voltage Vdac is set to be a voltage satisfying a condition $V_0$−Vdac>Vth. Moreover, the detection voltage Vdac is set to be a negative voltage level lower than the power-source voltage DVSS. A voltage ELVSS applied to the common electrode Ec connected to the cathode of the organic EL device OEL is set to be a voltage value which does not cause the organic EL device OEL to emit light because of the electric potential difference caused from the detection voltage Vdac applied to the source of the transistor Tr13. More specifically, the voltage ELVSS is set to be a voltage value (or a voltage range) that is none of a forward-bias voltage which causes the organic EL device OEL to emit light or a reverse-bias voltage causing a current leak affecting on a correcting operation to be discussed later. Setting of the voltage ELVSS will be discussed in more detail later.

As a result, a drain current Id corresponding to the detection voltage Vdac starts flowing from the power-source driver 130 in the data-line-Ld direction through the power-source line La, through between the drain and the source of the transistor Tr13, and through between the drain and the source of the transistor Tr12. At this time, the capacitor Cs connected between the gate and the source of the transistor Tr13 (between the contact N11 and the contact N12) is charged to a voltage corresponding to the detection voltage Vdac.

Next, the data driver 140 sets the data input side (the data-driver-140 side) of the data line Ld to be in a high impedance (HZ) state. The voltage charged in the capacitor Cs is maintained as a voltage corresponding to the detection voltage Vdac right after the data line Ld being set to be in a high impedance state. Hence, a voltage Vgs between the gate of the transistor Tr13 and the source thereof is maintained as a voltage charged in the capacitor Cs.

As a result, right after the data line Ld is set to be in a high impedance state, the transistor Tr13 maintains its on state, so that a drain current Id flows between the drain of the transistor Tr13 and the source thereof. An electric potential at the source (the contact N12) of the transistor Tr13 gradually increases so as to be close to an electric potential at the drain as time advances, and the current value of the drain current Id flowing between the drain of the transistor Tr13 and the source thereof decreases.

Together with this phenomenon, some of charges accumulated in the capacitor Cs is released, so that a voltage across both terminals of the capacitor Cs (the voltage Vgs between the gate of the transistor Tr13 and the source thereof) gradually decreases. As a result, as shown in FIG. 9, the data line voltage Vd gradually increases from the detection voltage Vdac as time advances (naturally eased) so as to converge on a voltage ($V_0$−Vth) obtained by subtracting the threshold voltage Vth of the transistor Tr13 from the voltage at the drain of the transistor Tr13 (the power-source voltage DVSS ($=V_0$) of the power-source line La).

In such a natural elapse, when the drain current Id eventually becomes not to flow through the drain of the transistor Tr13 and the source thereof, releasing of the charges accumulated in the capacitor Cs is terminated. At this time, the gate voltage (the voltage Vgs between the gate and the source) of the transistor Tr13 becomes the threshold voltage Vth of the transistor Tr13.

In a condition in which no drain current Id flows between the drain of the transistor Tr13 and the source thereof in the pixel driving circuit DC, the voltage between the drain of the transistor Tr12 and the source thereof becomes substantially 0 V, so that the data line voltage Vd becomes substantially equal to the threshold voltage Vth of the transistor Tr13 at the end of natural elapse.

In the transient curve shown in FIG. 9, the data line voltage Vd converges on the threshold voltage Vth ($=|V_0-Vth|$: $V_0=0$ V) of the transistor Tr13 as time (the elapse time t) advances. The data line voltage Vd gradually becomes close to the threshold voltage Vth illimitably as the elapse time t advances. However, even if a sufficient elapse time t is set, theoretically, the data line voltage Vd does not completely become equal to the threshold voltage Vth. Such a transient curve (the behavior of the data line voltage Vd by natural elapse) can be expressed by a following formula (5).

$$Vd = Vmeas(t) = V_0 - Vth - \frac{V_0 - Vdac - Vth}{(\beta/C)t(V_0 - Vdac - Vth) + 1} \quad (5)$$

In the formula (5), C is a total capacitive component added to the data line Ld in the circuit configuration of the pixel PIX shown in FIG. 6, and is expressed as C=Cel+Cs+Cp (where Cel is a pixel capacitance, Cs is a capacitor capacitance, and Cp is a line parasitic capacitance). The detection voltage Vdac is defined as a voltage value satisfying the condition of a following formula (6).

$$\left.\begin{aligned} &Vdac := V_1 - \Delta V \times (n_d - 1) \\ &V_0 - Vdac - \mathrm{Vth\_max} > 0 \end{aligned}\right\} \quad (1)$$

In the formula (6), Vth_max is a compensation limit of the threshold voltage Vth of the transistor Tr13. $n_d$ is defined as initial digital data (digital data for defining the detection voltage Vdac) input into the DAC 42 in the DAC/ADC circuit 144 in the data driver 140, and when such digital data $n_d$ is 10 bits, an arbitrary value among 1 to 1023 that satisfies the condition of the formula (6) is selected with respect to d. Moreover, ΔV is a bit width (a voltage width corresponding to 1 bit) of the digital data, and can be expressed as a following formula (7) when the digital data $n_d$ is 10 bits.

$$\Delta V := \frac{V_1 - V_{1023}}{1022} \quad (7)$$

In the formula (5), the data line voltage Vd (the detection voltage Vmeas(t)), a convergence value $V_0$−Vth of the data line voltage Vd and ξ relating to a parameter β/C including the current amplification factor β and the total capacitive component C are defined as following formulae (8) and (9). The digital output (detected data) by the ADC 43 relative to the data line voltage Vd (the detection voltage Vmeas(t)) at the elapse time t is defined as $n_{meas}(t)$ and digital data on the threshold voltage Vth is defined as $n_{th}$.

$$\left.\begin{aligned} V_{meas}(t) &:= V_1 - \Delta V \times (n_{meas} - 1) \\ V_0 - Vth &:= V_1 - \Delta V \times (n_{th} - 1) \end{aligned}\right\} \quad (8)$$

$$\xi := (\beta / C) \cdot \Delta V \quad (9)$$

Based on the definition expressed in the formulae (8) and (9), when the formula (5) is replaced with a relationship between actual digital data (image data) $n_d$ input into the DAC 42 and digital data (detected data) $n_{meas}(t)$ subjected to analog/digital conversion by the ADC 43 and actually output in the DAC/ADC circuit 144 of the data driver 140, the formula (5) can be expressed as a following formula (10).

$$n_{meas}(t) = n_{th} + \frac{n_d - n_{th}}{\xi \cdot t \cdot (n_d - n_{th}) + 1} \quad (10)$$

In the formulae (9) and (10), ξ is a digital expression of the parameter β/C in an analog value, and ξ·t becomes nondimensional. It is presumed that an initial threshold voltage $Vth_0$ when no varying occurs in the threshold voltage Vth of the transistor Tr13 is substantially 1 V. In this case, by setting two different elapse times $t=t_1$ and $t_2$ so that a condition $\xi \cdot \cdot (n_d - n_{th}) >> 1$ is satisfied, a compensation voltage component (an offset voltage) $Voffset(t_0)$ in accordance with the varying in the threshold voltage of the transistor Tr13 can be expressed as a following formula (11).

$$V_{offset}(t_0) = \frac{\Delta V}{\xi \cdot t_0} = \Delta V \cdot (n_1 - n_2) \cdot \frac{t_2 \cdot t_1}{t_2 - t_1} \cdot \frac{1}{t_0} \quad (11)$$

In the formula (11), $n_1$, $n_2$ stand for digital data (detected data) $n_{meas}(t_1)$, $n_{meas}(t_2)$ output by the ADC 43 when the elapse time t is set to be $t_1$ and $t_2$ in the formula (10), respectively. Digital data $n_{th}$ of the threshold voltage Vth of the transistor can be expressed as a following formula (12) by using digital data $n_{meas}(t_0)$ output by the ADC 43 when the elapse time is $t=t_0$ based on the formulae (10) and (11). Moreover, digital data digital Voffset of the offset voltage Voffset can be expressed as a following formula (13). In the formulae (12) and (13), $\langle\xi\rangle$ is a whole-pixel average value of ξ that is a digital value of the parameter β/C. Decimal number is not considered for $\langle\xi\rangle$.

$$n_{th} = n_{meas}(t_0) - \frac{1}{\langle\xi\rangle \cdot t_0} \quad (12)$$

$$\frac{1}{\langle\xi\rangle \cdot t_0} = \text{digital } V_{offset} \quad (13)$$

Accordingly, from the formula (12), pieces of digital data (correction data) $n_{th}$ for compensating the threshold voltage Vth are obtained for all pixels.

The varying in the current amplification factor β can be expressed as a following formula (14) by, when the elapse time t is set to be $t_3$ indicated by a transient curve shown in FIG. 9, solving the formula (10) for ξ based on digital data (detected data) $n_{meas}(t_3)$ output by the ADC 43. Note that $t_3$ is set to be a sufficiently shorter time than $t_0$, $t_1$, and $t_2$ used in the formulae (11) and (12).

$$\xi \cdot t_3 = \frac{n_d - n_{meas}(t_3)}{[n_{meas}(t_3) - n_{th}] \cdot [n_d - n_{th}]} \quad (14)$$

Regarding ξ in the formula (14), the display panel (the light emitting panel) 110 is set so that the total capacitive components C of respective data lines Ld become equal, and as is expressed in the formula (7), the bit width ΔV of digital data is set beforehand, so that ΔV and C in the formula (9) defining become constants, respectively.

Moreover, if desired set values of ξ and β are ξtyp and βtyp, respectively, a multiplication correction value Δξ for correcting the varying in ξ of each pixel driving circuit DC in the display panel 110, i.e., digital data (correction data) Δβ for correcting the varying in the current amplification factor β can be defined by a following formula (15) with the square term of such varying being ignored.

$$\begin{aligned} \Delta\xi &:= 1 - \frac{\xi - \xi_{typ}}{2\xi} \\ &= 1 - \frac{\beta - \beta_{typ}}{2\beta} = \Delta\beta \end{aligned} \quad (15)$$

Therefore, the correction data $n_{th}$ (a first characteristic parameter) for correcting the varying in the threshold voltage Vth of the pixel driving circuit DC and the correction data Δβ (a second characteristic parameter) for correcting the varying in the current amplification factor β can be obtained by detecting the data line voltages Vd (the detected voltages Vmeas(t)) plural times while changing the elapse time t through the successive auto zero scheme based on the formulae (12) and (15).

The correction data $n_{th}$ calculated out from the formula (12) is used when, in the display operation to be discussed later, correction (Δβ multiplying correction) of varying in the current amplification factor β and correction ($n_{th}$ adding correction) of the varying in the threshold voltage Vth are performed on image data $n_d$ input from the exterior of the display device 100 of the present embodiment in order to generate corrected image data $n_{d\_comp}$. By generating the corrected image data, the data driver 140 supplies a gradation voltage Vdata with an analog voltage value in accordance with the corrected image data $n_{d\_comp}$ to each pixel PIX through the data line Ld, so that the organic EL device OEL of each pixel PIX is allowed to emit light at desired brightness and gradation without being affected by the varying in the current amplification factor β and the varying in the threshold voltage Vth of the driving transistor, thereby accomplishing a good and uniform light emitting state.

An explanation will now be given of the voltage ELVSS applied to the cathode (the common electrode Ec) of the organic EL device OEL in the successive auto zero scheme as explained above. More specifically, in the successive auto zero scheme as explained above, a specific effect of the voltage ELVSS to the data line voltage Vd (the detected voltage Vmeas(t)) that is detected in order to calculate the threshold voltage Vth of the transistor Tr13 in each pixel PIX (the pixel driving circuit DC) and the current amplification factor β thereof is as follows.

Figure 10:
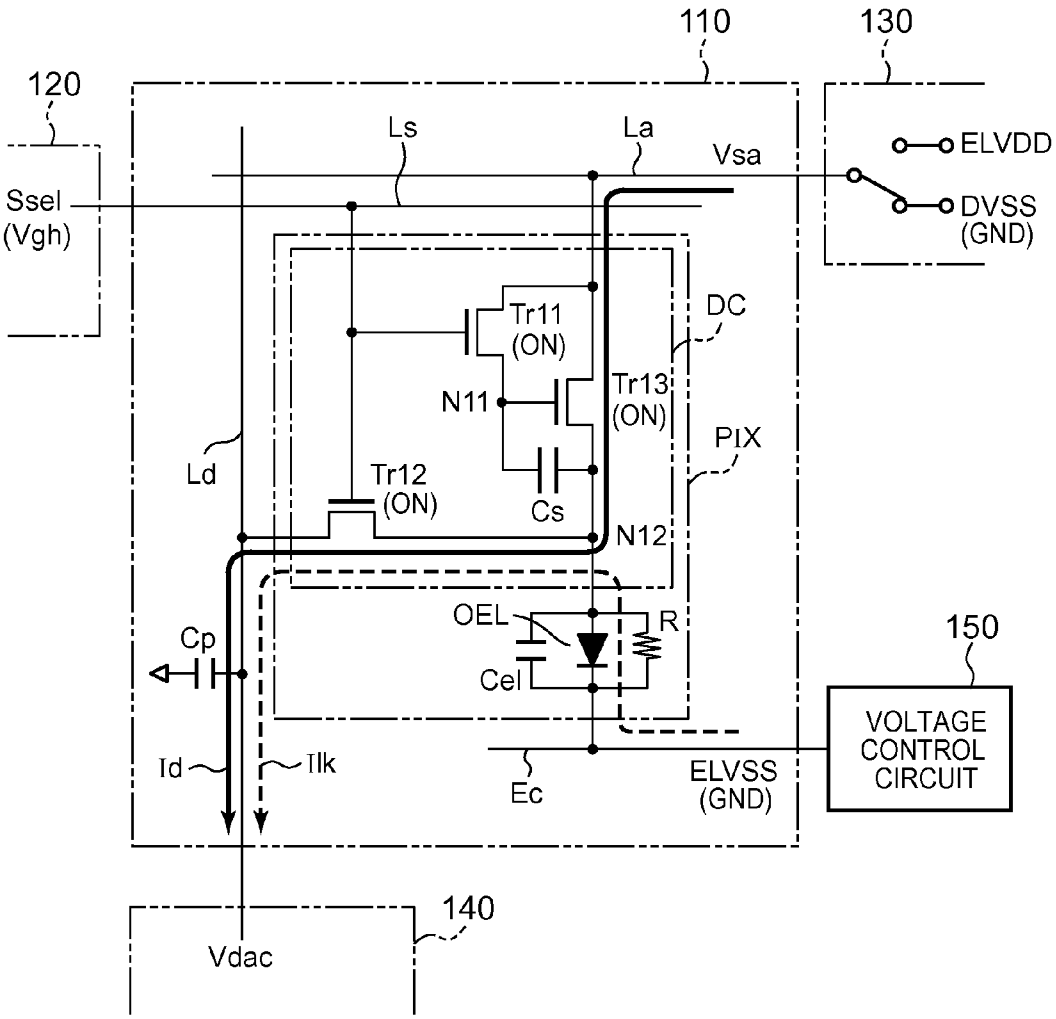
FIG. 10 is a diagram for explaining a leak phenomenon from the cathode of an organic EL device in the characteristic parameter obtaining operation (the auto zero scheme) according to the first embodiment.

FIG. 10 is a diagram for explaining a leak phenomenon from the cathode of the organic EL device OEL in the characteristic parameter obtaining operation (the auto zero scheme) according to the present embodiment. In the characteristic parameter obtaining operation through the above-explained auto zero scheme, it is explained that, when the detection voltage Vdac is applied to the data line Ld, the voltage ELVSS with a voltage value (or a voltage range) that is none of a forward bias voltage which causes the organic EL device OEL to emit light and a reverse bias voltage which generates a current leak affecting the correcting operation to be discussed later is applied to the cathode (the common electrode Ec) of the organic EL device OEL.

In the followings, as shown in FIG. 10, first, an explanation will be given of the behavior of the pixel driving circuit DC when the voltage ELVSS having a voltage value which does not cause the organic EL device OEL to emit light and which is the ground electric potential GND that is the same voltage value as that of the power-source voltage DVSS is applied to the common electrode Ec at the time of image data writing, and a reverse bias voltage is applied to the organic EL device OEL.

In this case, as shown in FIG. 10, depending on the electric potential difference between the power-source voltage DVSS (the ground electric potential GND) applied to the power-source line La and the detection voltage Vdac applied to the data line Ld, a drain current Id flows through the transistor Tr13. Moreover, together with the drain current Id, a leak current Ilk originating from the application of the reverse bias voltage to the organic EL device OEL flows depending on the electric potential difference between the voltage ELVSS (the ground electric potential GND) applied to the cathode (the common electrode Ec) of the organic EL device OEL and the detection voltage Vdac applied to the data line Ld.

At this time, when the effect to the current characteristic (more specifically, the current value of the leak current Ilk originating from the application of the reverse bias voltage) at the time of the application of the reverse bias voltage to each organic EL device OEL is little and is uniform, a detected data line voltage Vd (the detected voltage Vmeas(t)) substantially shows a voltage value closely corresponding (relating) to the threshold voltage Vth of the transistor Tr13 in each pixel PIX and the current amplification factor β thereof.

It is unavoidable for organic EL devices OEL that the device characteristic changes and becomes varied due to the device structure, the manufacturing process, the drive history (light emitting history), etc. Therefore, the current characteristics of individual organic EL devices OEL at the time of application of the reverse bias voltage vary, and if there is an organic EL device OEL having a leak current Ilk with a relatively large current value originating from the application of the reverse bias voltage, the voltage component by the leak current originating from the application of the reverse bias voltage is included in the detected voltage Vmeas(t). While at the same time, if such a voltage component is nonuniform, the relativity between the detected voltage Vmeas(t) and the current amplification factor β of each pixel PIX and the relativity between the detected voltage Vmeas(t) and the threshold voltage Vth of the transistor Tr13 in each pixel PIX is significantly deteriorated. That is, it is difficult to distinguish between the voltage component originating from the leak current Ilk in the organic EL device OEL and the voltage component originating from the drain current Id flowing through the transistor Tr13 from the detected voltage Vmeas (t).

When the correcting operation to be discussed later is performed on image data based on the characteristic parameters of each pixel PIX obtained in such a condition, if there is a leak current Ilk flowing through the organic EL device OEL due to the application of a reverse bias voltage, the detected voltage Vmeas(t) contains the voltage component originating from the leak current, so that it is determined that the current driven performance (i.e., the current amplification factor β) of the transistor Tr13 is high apparently. Accordingly, when a light emitting operation is carried out based on the corrected image data, a light emitting drive current Iem generated by the transistor Tr13 is set to be a smaller current value than an intrinsic current value based on the characteristics of the transistor Tr13. Hence, the pixel PIX with a leak current Ilk or the pixel PIX having a leak current Ilk with a large current value reduces a light emission brightness through the correcting operation, which causes the varying in brightness to be intensified, resulting in the deterioration of the display quality in some cases.

Conversely, according to the present embodiment, when the characteristic parameter of each pixel PIX is obtained, any negative effects by a leak current Ilk originating from the application of the reverse bias voltage to the organic EL device OEL as explained above are eliminated.

<First Technique>

First, a detailed explanation will be given of a first technique with reference to the accompanying drawings for eliminating any negative effects by the leak current originating from the application of a reverse bias voltage to the organic EL device OEL, which is applied to the characteristic parameter obtaining operation of obtaining the correction data Δβ (the second characteristic parameter). In the first technique, first, the display device 100 executes a process (a voltage obtaining operation) of setting the voltage value of the voltage ELVSS applied to the organic EL device OEL through the auto zero scheme prior to the characteristic parameter obtaining operation of obtaining the correction data Δβ. Thus, the display device 100 obtains the voltage value of the voltage ELVSS to be utilized at the time of characteristic parameter obtaining operation executed in order to obtain the correction data Δβ for correcting the varying of the current amplification factor β of each pixel PIX. Thereafter, the display device 100 executes the characteristic parameter obtaining operation through the successive auto zero scheme with the voltage ELVSS being set to be a voltage value obtained through the voltage obtaining operation.

This enables the display device 100 to eliminate any negative effects by the leak current originating from the application of a reverse bias voltage to the organic EL device OEL and to obtain the correction data Δβ for correcting the varying in the original current amplification factor β of each pixel PIX.

The first technique including the successive processing operations that are the combination of the voltage obtaining operation and the characteristic parameter obtaining operation is mainly executed in an initial state in which the device characteristic is not deteriorated with ages, i.e., for example, at the time of factory shipment of the display device 100.

Figure 11:
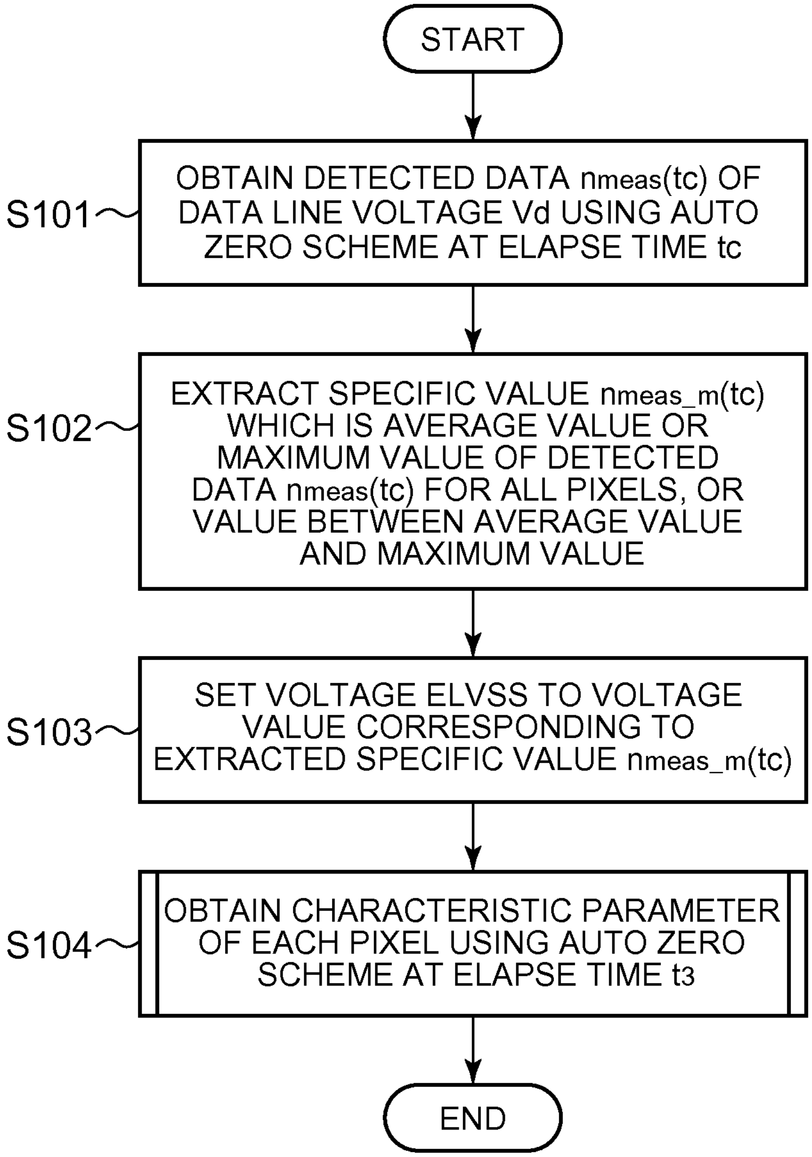
FIG. 11 is a flowchart for explaining a processing operation in a first technique applied to the characteristic parameter obtaining operation (an operation of obtaining correction data $\Delta\beta$) according to the first embodiment.
Figure 12:
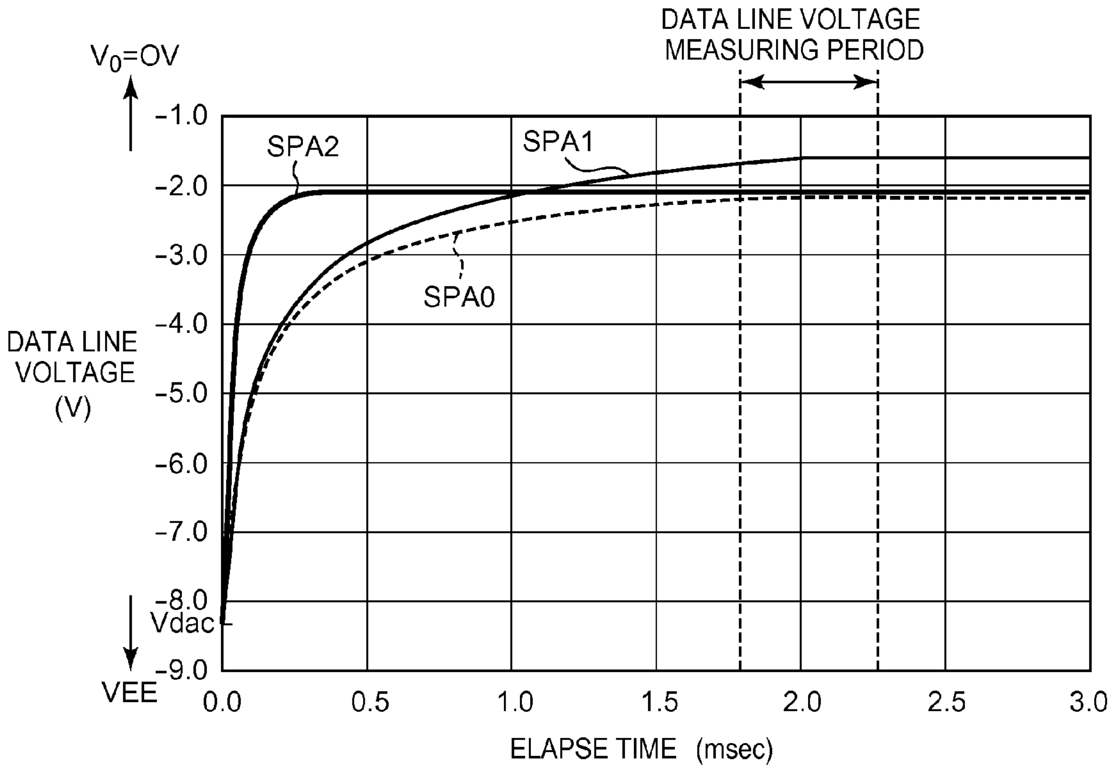
FIG. 12 is a diagram showing an example of a change (a transient curve) in a data line voltage and is for explaining the processing operation through the first technique.

FIG. 11 is a flowchart for explaining a processing operation by the first technique applied to the characteristic parameter obtaining operation (the operation of obtaining the correction data Δβ) according to the present embodiment. FIG. 12 is a diagram for explaining the processing operation by the first technique shown in FIG. 11 and showing an illustrative change (a transient curve) in the data line voltage when the voltage ELVSS is changed.

According to this processing operation by the first technique, first, as shown in FIG. 11, the data driver 140 executes, in a step S101, an operation of detecting the data line voltage Vd by the above-explained auto zero scheme at an elapse time $t_c$ set beforehand for the voltage obtaining operation. That is, the data driver 140 applies a predetermined detection voltage Vdac to the data line Ld connected to the pixel PIX set to be in a selected state. At this time, as the initial value of the voltage ELVSS, for example, the ground electric potential GND that is the same voltage as the power-source voltage DVSS is applied to the cathode of the organic EL device OEL of that pixel PIX. Next, the data driver 140 causes the data line Ld to be in a high impedance (HZ) state to let the electric potential of the data line Ld naturally eased by the elapse time $t_c$, and obtains detected data $n_{meas}(t_c)$ in the form of digital data in accordance with the data line voltage Vd (a detected voltage Vmeas($t_c$). The obtaining operation of such detected data $n_{meas}(t_c)$ is executed for all pixels PIX of the display panel 110. The elapse time $t_c$ applied to this processing operation is set to be a value satisfying a relationship in a following formula (16) based on the formulae (5) and (6).

$$t_c >> (\beta/C)(V_0 - V\text{dac} - V\text{th}) \quad (16)$$

Next, in a step S102, the correction-data obtaining function circuit 166 extracts a specific detected data $n_{meas\_m}(t_c)$ which is any one of an average value (or a peak value) or a maximum value of detected data $n_{meas}(t_c)$ obtained for all pixels PIX from the frequency distribution of pieces of detected data $n_{meas}(t_c)$ or a value between the average value and the maximum value. Regarding the frequency distribution of the pieces of detected data $n_{meas}(t_c)$, only a few pixels PIX among all pixels PIX are significantly affected by the leak current originating from the application of a reverse bias voltage, but such a negative effect is relatively little for most of the other pixels PIX, so that the frequency is concentrated within an extremely narrow range of detected data (i.e., the voltage range). Therefore, the specific detected data $n_{meas\_m}(t_c)$ becomes a value which is hardly affected by the leak current originating from the application of a reverse bias voltage.

Next, in a step S103, the correction-data obtaining function circuit 166 inputs the specific detected data $n_{meas\_m}(t_c)$ extracted in the step S102 into the voltage control circuit 150 shown in FIG. 6. Accordingly, the D/A converter 151 converts the specific detected data $n_{meas\_m}(t_c)$ in the form of digital values into an analog signal voltage, and the follower amplifier 152 amplifies such a signal to a predetermined voltage level, and applies such a signal to the common electrode Ec. Hence, the voltage ELVSS is set to be a voltage with a negative voltage level having a voltage value corresponding to the specific detected data $n_{meas\_m}(t_c)$. That is, the voltage ELVSS has the same polarity as that of the detected voltage Vmeas ($t_c$), and the absolute value of the electric potential difference between the power-source line La and the common electrode Ec is set to be an average value of the absolute value of the electric potential difference between the power-source line La and the one end of the data line Ld at the data-driver-140 side or the maximum value thereof, or, a value between the average value and the maximum value.

Next, in a step S104, the correction-data obtaining function circuit 166 obtains the characteristic parameters (at least the correction data Δβ for correcting the varying in the current amplification factor β) of each pixel PIX through the data driver 140 based on the characteristic parameter obtaining operation to which the above-explained auto zero scheme is applied. That is, first, the data driver 140 applies a predetermined detection voltage Vdac to the data line Ld connected to the pixel PIX set to be in a selected state. At this time, a voltage corresponding to the specific detected data $n_{meas\_m}$ ($t_c$) extracted in the step S102 is applied to the cathode of the organic EL device OEL of that pixel PIX. Accordingly, substantially no reverse bias voltage is to be applied to the organic EL device OEL of each pixel PIX when the data line voltage Vd is detected. Thereafter, the data driver 140 sets that data line Ld to be in a high impedance (HZ) state, and executes an operation of obtaining detected data $n_{meas}(t_3)$ thereafter where the data line voltage Vd (a detected voltage Vmeas($t_3$)) at the predetermined elapse time $t_3$ is detected. The correction-data obtaining function circuit 166 calculates the characteristic parameter (the correction data Δβ) of each pixel PIX based on the formulae (5) to (15) using the detected data $n_{meas}(t_3)$ obtained in this manner.

An explanation will now be given of a change in the data line voltage Vd with reference to FIG. 12 when the voltage ELVSS is changed and when such a processing operation shown in FIG. 11 according to the first technique is executed. FIG. 12 is a transient curve representing a change in the data line voltage Vd when a detection voltage Vdac of, for example, −8.3 V is applied to the data line Ld and the data line Ld is set to be in a high impedance state thereafter at the time of characteristic parameter obtaining operation. A data line voltage measuring period shown in FIG. 12 is a period in which the above-explained elapse time $t_c$ is set within that period.

A curve SPA0 indicated by a dashed line in FIG. 12 represents a change (an ideal value) in the data line voltage Vd when there is no leak current originating from the application of a reverse biasing voltage to the organic EL device OEL of the pixel PIX. That is, the curve SPA0 corresponds to a transient curve shown in FIG. 9. The data line voltage Vd in this case gradually increases from the detection voltage Vdac as time advances as shown in FIG. 12, and when almost 2.0 msec elapses, converges (is naturally eased) on a voltage ($V_0$−Vth: e.g., almost −2.2 V) obtained by subtracting the threshold voltage Vth of the transistor Tr13 from the voltage (the power-source voltage DVSS (=$V_0$=GND) of the power-source line La of the transistor Tr13 at the drain side. Through such a natural elapse, the voltage value on which the data line voltage Vd converges is substantially equal to the threshold voltage Vth of the transistor Tr13.

On the other hand, a curve SPA1 indicated by a thin solid line in FIG. 12 represents a change in the data line voltage Vd when the organic EL device OEL has a leak current originating from the application of a reverse bias voltage and when the voltage ELVSS that is the ground electric potential GND (=0 V) is applied to the cathode of the organic EL device OEL. That is, the curve SPA1 represents a transient curve when a reverse bias voltage of almost −8.3 V is applied to the organic EL device OEL.

As shown in FIG. 12, the data line voltage Vd in this case gradually increases from the detection voltage Vdac as time advances, and is likely to converge on a higher voltage than the converge voltage (i.e., substantially equal to the threshold voltage Vth) in the case of the curve SPA0. More specifically, because a leak current Ilk originating from the application of a reverse bias voltage to the organic EL device OEL flows through the data line Ld in addition to a drain current Id relating to the threshold voltage Vth of the transistor Tr13, the data line voltage Vd converges on a voltage higher than the converge voltage in the case of the curve SPA0 by what corresponds to the voltage component originating from the leak current Ilk. In FIG. 12, the leak current Ilk when the voltage ELVSS is set to be the ground electric potential GND (=0 V) is 10 $A/m^2$. The data line voltage Vd detected in the foregoing step S101 includes the data line voltage Vd when no leak current originating from the application of a reverse bias voltage is present (the curve SPA0) and the data line voltage Vd when there is a leak current originating from the application of a reverse bias voltage (the curve SPA1). The absolute voltage value of the data line voltage Vd when there is a leak current originating from the application of a reverse bias voltage becomes smaller than the absolute voltage value of the data line voltage Vd when there is no leak current.

On the other hand, a curve SPA2 indicated by a thick solid line in FIG. 12 corresponds to the case of the first technique. That is, the curve SPA2 represents a change in the data line voltage Vd when the organic EL device OEL has a leak current originating from the application of a reverse bias voltage and when the voltage ELVSS of −2 V is applied to the cathode of the organic EL device OEL. The set −2 V to the voltage ELVSS is a voltage value corresponding to the specific detected data $n_{meas\_m}(t_c)$ extracted in the step S102. That is, the curve SPA2 represents a transient curve when a reverse bias voltage of almost −6.3 V is applied to the organic EL device OEL.

As shown in FIG. 12, the data line voltage Vd in this case sharply increases from the detection voltage Vdac as time advances, and is likely to converge on a voltage substantially equal to the converge voltage (substantially equal to the threshold voltage Vth) in the case of the curve SPA0. That is, by setting the voltage ELVSS to be −2 V that is a value corresponding to the specific detected data $n_{meas\_m}(t_c)$, when the data line voltage Vd is detected, substantially no reverse bias voltage is applied to the organic EL device OEL of each pixel PIX, so that any negative effects of the leak current Ilk to the data line voltage Vd can be eliminated.

Figure 13:
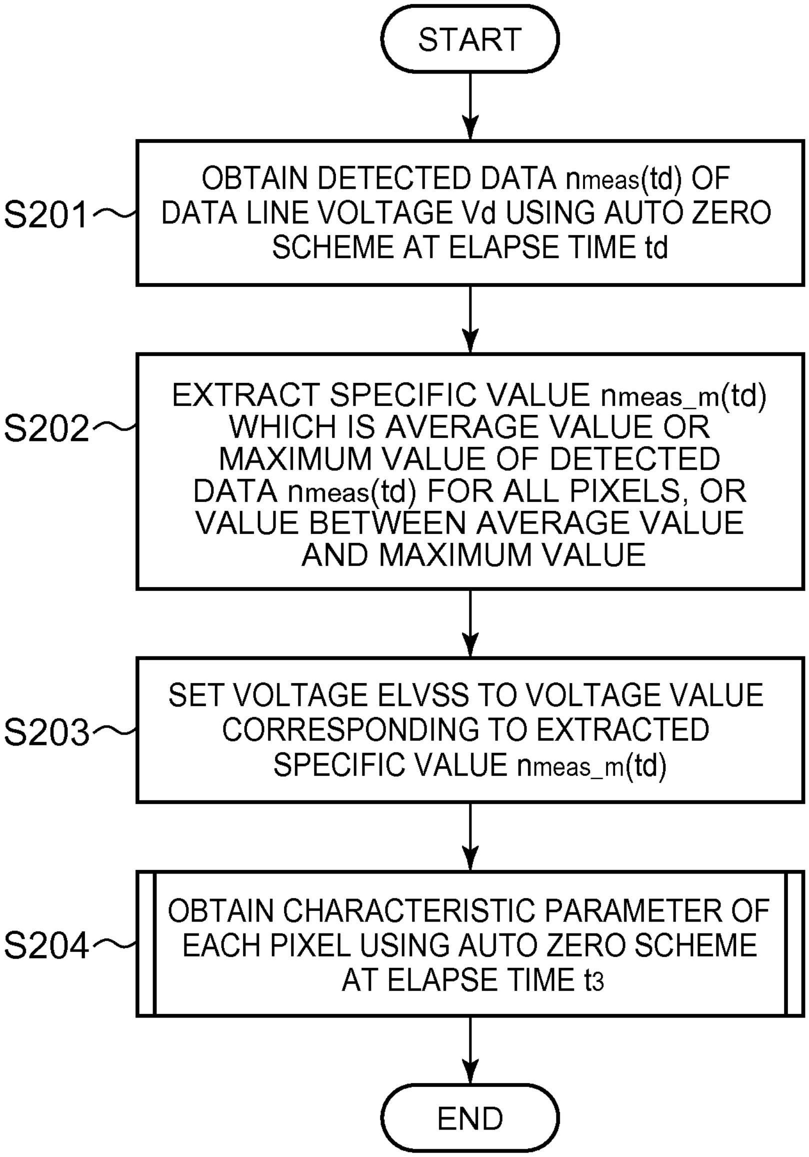
FIG. 13 is a flowchart showing a brief overview of a processing operation through the first technique applied to the characteristic parameter obtaining operation (an operation of obtaining correction data $\Delta\beta$) according to the first embodiment.
Figure 14:
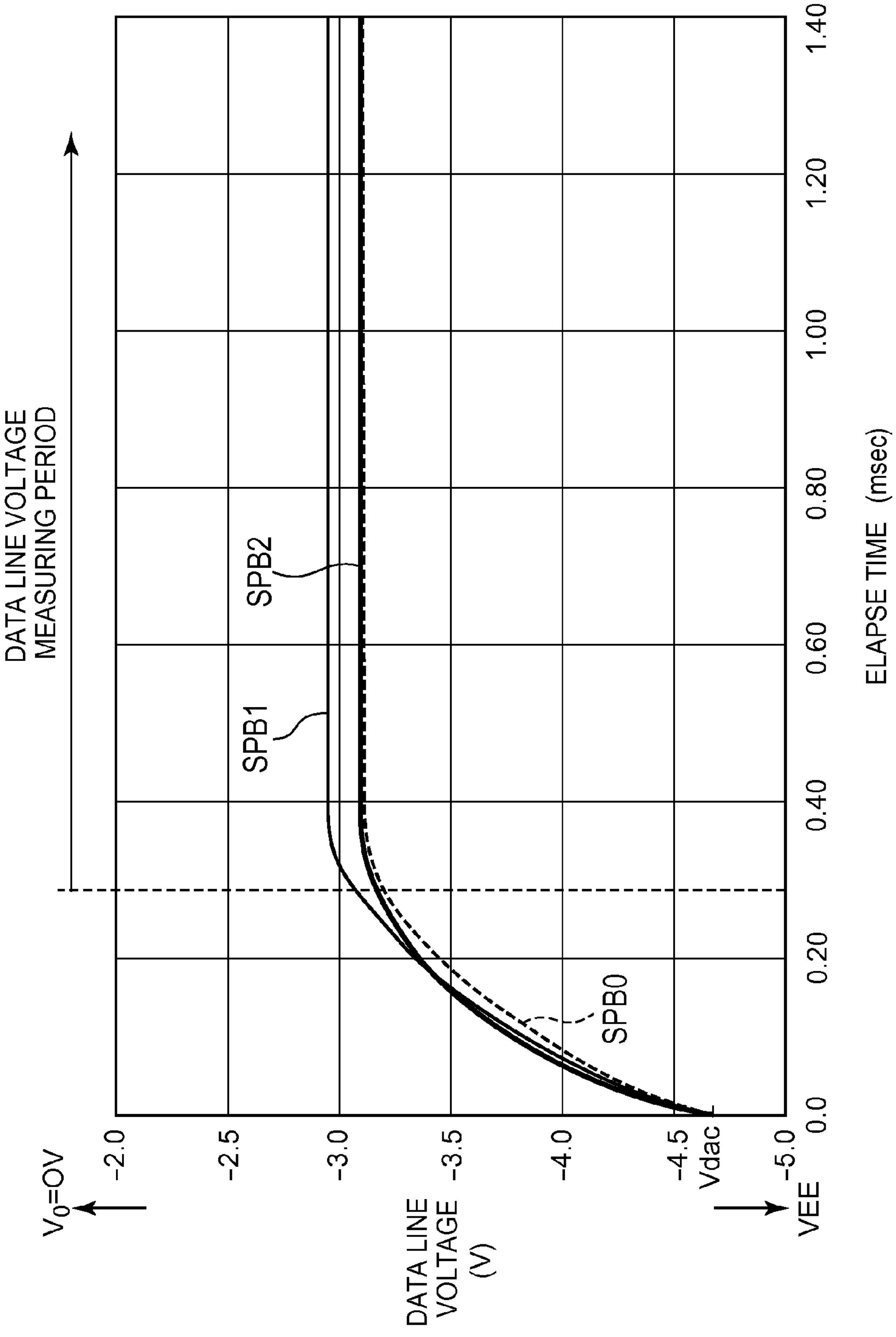
FIG. 14 is a diagram showing an example of a change (a transient curve) in a data line voltage in the processing operation through the first technique.

FIG. 13 is a flowchart showing an outline of a processing operation by the first technique including the characteristic parameter obtaining operation (the operation of obtaining the correction data Δβ) according to the present embodiment. FIG. 14 is a diagram showing an illustrative change (a transient curve) in the data line voltage through the processing operation by the first technique shown in FIG. 13. Regarding the same processing operation and voltage change as those explained above, the explanation thereof will be simplified below.

In the processing operation by the first technique, first, as shown in FIG. 13, in a step S201, the data driver 140 executes a detecting operation of the data line voltage Vd through the auto zero scheme at an elapse time $t_d$ similar to the above-explained elapse time $t_c$ like the normal characteristic parameter obtaining operation in order to obtain the correction data Δβ for correcting the varying of the current amplification factor β. That is, the data driver 140 applies the predetermined detection voltage Vdac to the data line Ld connected to the pixel PIX set to be in a selected state. At this time, the voltage control circuit 150 applies, as an initial value of the voltage ELVSS, e.g., the ground electric potential GND that is the same voltage as the power-source voltage DVSS to the cathode of the organic EL device OEL of that pixel PIX. Note that the initial voltage of the voltage ELVSS is not limited to the same electric potential as that of the power-source voltage DVSS, and the voltage ELVSS may be set to have a lower electric potential than that of the power-source voltage DVSS, and the electric potential difference between the power-source voltage DVSS and the voltage ELVSS may be set to be a voltage value smaller than the light emitting threshold voltage which causes the organic EL device OEL to start emitting light. The data driver 140 sets the data line Ld to be in a high impedance (HZ) state, causes the electric potential of the data line Ld to be naturally eased by the elapse time $t_d$, and thereafter obtains detected data $n_{meas}(t_d)$ in the form of digital data in accordance with the voltage Vd (a detected voltage Vmeas ($t_3$)) of the data line Ld. The operation of obtaining such detected data $n_{meas}(t_d)$ is executed for all pixels PIX of the display panel 110.

Next, in a step S202, the correction-data obtaining function circuit 166 extracts a specific detected data $n_{meas\_m}(t_d)$ which is any one of an average value (a peak value) or a maximum value of detected data $n_{meas}(t_d)$ obtained for all pixels PIX from the frequency distribution of pieces of detected data $n_{meas}(t_d)$ or a value between the average value and the maximum value. Only a few of pixels PIX are largely affected by a leak current originating from the application of a reverse bias voltage because of the varying in the device characteristic, and the frequency distribution of pieces of the detected data $n_{meas}(t_d)$ (the frequency relative to the digital value of the detected voltage Vmeas(t): histogram) has a tendency that the distribution is widespread in a detected voltage range lower than the range of the digital value (the detected voltage) corresponding to the high frequency part, but most pixels PIX are likely to be concentrated in an extremely narrow digital value range (i.e., the voltage range), so that the specific detected data $n_{meas\_m}(t_d)$ becomes a value which is hardly affected by the leak current originating from the application of a reverse bias voltage.

Next, in a step S203, the correction-data obtaining function circuit 166 sets the voltage ELVSS to be a voltage value corresponding to the specific detected data $n_{meas\_m}(t_d)$ extracted in the step S202. Next, in a step S204, the correction-data obtaining function circuit 166 sets an elapse time to be the above-explained elapse time $t_3$ based on the characteristic parameter obtaining operation using the auto zero scheme through the data driver 140, and executes the characteristic parameter obtaining operation of obtaining the correction data Δβ for correcting the varying in the current amplification factor β of each pixel PIX. The data driver 140 applies the predetermined detection voltage Vdac to the data line Ld connected to the pixel PIX set to be in a selected state. At this time, a voltage corresponding to the specific detected data $n_{meas\_m}(t_d)$ extracted in the step S202 is applied to the cathode of the organic EL device OEL of that pixel PIX. Thereafter, the data driver 140 lets the data line Ld to be in a high impedance (HZ) state, and executes an operation of obtaining detected data $n_{meas}(t_3)$ thereafter where the data line voltage Vd (the detected voltage Vmeas($t_3$)) is detected at the predetermined elapse time $t_3$. The correction-data obtaining function circuit 166 calculates the characteristic parameter (the correction data Δβ) based on the formulae (5) to (15) using the detected data $n_{meas}(t_3)$ obtained thus way.

An explanation will now be given of a change in the data line voltage Vd when the processing operation through the first technique shown in FIG. 13 is executed with reference to FIG. 14. FIG. 14 is a transient curve showing a change in the data line voltage Vd when, for example, −4.7 V is applied as the detection voltage Vdac to the data line Ld and the data line Ld is set to be in a high impedance (HZ) state thereafter in the characteristic parameter obtaining operation. A data line voltage measuring period shown in FIG. 14 corresponds to the above-explained elapse time $t_3$.

Like the curve SPA0 shown in FIG. 12, a curve SPB0 indicated by a dashed line in FIG. 14 represents a change (an ideal value) in the data line voltage Vd when there is no leak current originating from the application of a reverse bias voltage to the organic EL device OEL of the pixel PIX. The data line voltage Vd in this case gradually increases from the detection voltage Vdac as time advances as shown in FIG. 14, and when almost 0.33 msec elapses, converges (naturally eased) on the voltage (e.g., almost −3.1 V) substantially equal to the threshold voltage Vth of the transistor Tr13 changed with age.

while, a curve SPB2 indicated by a thick solid line in FIG. 14 corresponds to the first processing operation. That is, the curve SPB2 represents a change in the data line voltage Vd when there is a leak current originating from the application of a reverse bias voltage to the organic EL device OEL and when the voltage ELVSS of −3 V is applied to the cathode of the organic EL device OEL. The −3 V set to the voltage ELVSS is a voltage value corresponding to the specific detected data $n_{meas\_m}(t_d)$ extracted in the foregoing step S202. That is, the curve SPB2 represents a transient curve when a reverse bias voltage of almost −1.7 V is applied to the organic EL device OEL. In FIG. 14, a leak current Ilk of the organic EL device OEL is 10 A/m$^2$ when the voltage ELVSS is set to be the ground electric potential GND (=0 V). The data line voltage Vd in this case sharply increases from the detection voltage Vdac as time advances as shown in FIG. 14, and is likely to converge on the voltage substantially equal to the converge voltage (substantially equal to the threshold voltage Vth) in the case of the curve SPB0. That is, by setting the voltage ELVSS to be −3 V that is a voltage value corresponding to the specific detected data $n_{meas\_m}(t_d)$, even if there is a leak current originating from the application of a reverse bias voltage to the organic EL device OEL, any negative effects thereof can be eliminated.

A curve SPB1 indicated by a thin solid line in FIG. 14 is for a comparison purpose, and like the curve SPA1 shown in FIG. 12, represents a change in the data line voltage Vd when the voltage ELVSS that is the ground electric potential GND (=0 V) is applied to the cathode of the organic EL device OEL. That is, the curve SPB1 represents a transient curve when a reverse bias voltage of almost −4.7 V is applied to the organic EL device OEL. The data line voltage Vd in this case sharply increases from the detection voltage Vdac as time advances as shown in FIG. 14, and is likely to converge on a higher voltage than the converge voltage (substantially equal to the threshold voltage Vth) in the case of the curve SPB0 because of the negative effect by a leak current originating from the application of a reverse bias voltage. In the present embodiment, any effects of the leak current originating from the application of a reverse bias voltage to the organic EL device OEL can be eliminated.

That is, as explained above, FIGS. 12 and 14 show a cathode electric potential dependency relative to an elapse time when the data line voltage Vd is detected through the auto zero scheme. From the cathode electric potential dependency, the larger the leak current Ilk originating from the application of a reverse bias voltage to the organic EL device OEL is, the more the data line voltage Vd is likely to gradually become close to the voltage ELVSS. In this case, the larger the leak current Ilk is, the faster the data line voltage Vd is likely to converge.

Accordingly, at the time of image-data correcting operation (in particular, when the varying in the current amplification factor β is corrected), by setting the voltage ELVSS to be applied to the organic EL device OEL of each pixel PIX to be a negative voltage level with an absolute value that is the average value or the maximum value of the threshold voltage Vth of the transistor Tr13, or, the value between the average value and the maximum value, substantially no reverse bias voltage is applied to the organic EL device OEL of each pixel PIX when the data line voltage Vd is obtained. This makes it possible for the display device 100 to correct image data appropriately while eliminating any effects by the leak current.

More specifically, in the characteristic parameter obtaining operation in the step S204, when the voltage ELVSS is set to be a voltage value corresponding to the specific detected data $n_{meas\_m}(t_d)$ extracted in the step S202, the frequency distribution of pieces of detected data $n_{meas}(t_3)$ obtained for all pixels PIX has a tendency such that substantially all pieces of data are concentrated within an extremely narrow digital value range relating to the threshold voltage Vth of the transistor Tr13. This means that the distribution due to the leak current originating from the application of a reverse bias voltage can is eliminated.

Hence, according to the present embodiment, in the first technique including the characteristic parameter obtaining operation of obtaining the correction data Δβ, the correction-data obtaining function circuit 166 sets the voltage ELVSS to be a voltage value corresponding to the detected data $n_{meas}(t)$ extracted through the voltage obtaining operation executed prior to (beforehand) the characteristic parameter obtaining operation. This enables the display device to eliminate any negative effects by the leak current originating from the application of a reverse bias voltage to the organic EL device OEL of each pixel PIX, and to correct image data appropriately.

The frequency distribution of pieces of detected data $n_{meas\_m}(t)$ obtained thus way for all pixels PIX has no abnormal value affected by the leak current originating from the application of a reverse bias voltage to the organic EL device OEL, but this frequency distribution is substantially the same as one in which abnormal values affected by the leak current originating from the application of a reverse bias voltage to the organic EL device OEL is eliminated from the detected data $n_{meas}(t_d)$ obtained through the voltage obtaining operation. In this case, however, when the characteristic of, for example, the transistor (the driving device) Tr13 is abnormal, detected data $n_{meas}(t)$ including the abnormal value corresponding to such abnormality is left and not eliminated. Therefore, according to the present embodiment, it is possible for the display device to precisely determine whether or not the characteristic of the transistor (the driving device) Tr13 is normal without being affected by the leak current originating from the application of a reverse bias voltage to the organic EL device OEL.

<Second Technique>

Next, a detailed explanation will be given of a second technique which is applied to the characteristic parameter obtaining operation of obtaining the correction data $n_{th}$ (the first characteristic parameter) for correcting the varying in the threshold voltage Vth of the transistor Tr13 and which eliminates any negative effects by the leak current originating from the application of a reverse bias voltage to the organic EL device OEL with reference to the accompanying drawings. The characteristic parameter obtaining operation to which the second technique is applied is executed by the correction-data obtaining function circuit 166 through the data driver 140 in an initial state in which the device characteristic is not deteriorated with age, i.e., at the time of factory shipment of the display device and an aged state in which the operation time of the display device is advanced and the threshold voltage Vth of the driving device becomes varied with age.

In the characteristic parameter obtaining operation to which the second technique is applied to obtain the correction data $n_{th}$, when the data driver 140 executes the operation of detecting the data line voltage Vd through the auto zero scheme, the voltage control circuit 150 applies, to the cathode of the organic EL device OEL of each pixel PIX, a voltage ELVSS having the similar electric potential to the detection voltage Vdac applied to the data line Ld. It is preferable that the voltage ELVSS should be the same electric potential as that of the detection voltage Vdac, but the electric potential setting is not limited to this case, and the voltage ELVSS may be set to have a lower electric potential than that of the detection voltage Vdac, and the electric potential difference between the detection voltage Vdac and the voltage ELVSS may be set to be a voltage value smaller than the light emitting threshold voltage which causes the organic EL device OEL to emit light.

According to the basic auto zero scheme explained with reference to FIG. 9, in order to obtain the correction data $n_{th}$ for correcting the varying in the threshold voltage Vth of the transistor Tr13, the data driver 140 applies the detection voltage Vdac to the data line Ld, and measures a detected voltage Vmeas(t) after the elapse time t (=$t_0$, $t_1$, and $t_2$) until the data line voltage Vd converges by natural elapse. Therefore, according to the above-explained auto zero scheme, a time to some measure is necessary for natural elapse of the data line voltage Vd. In contrast, according to the characteristic parameter obtaining operation to which the second technique is applied, when the correction data $n_{th}$ is obtained, the data driver 140 obtains the data line voltage Vd before the data line voltage Vd converges in a predetermined value by natural elapse, and the correction-data obtaining function circuit 166 obtains the correction data $n_{th}$ based on the obtained data line voltage Vd. As a result, any negative effects by the leak current can be eliminated, and a requisite time for the measurement operation of the detected voltage Vmeas(t) can be reduced.

Figure 15A:
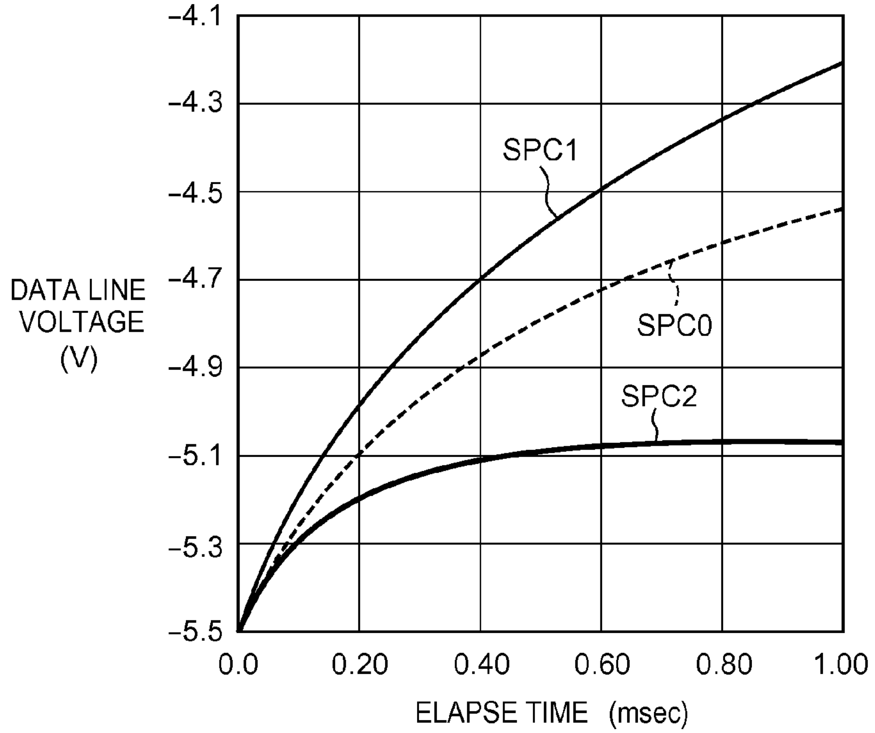
FIG. 15A is a diagram showing an example of a change (a transient curve) in a data line voltage when a cathode voltage is changed and is for explaining a second technique applied to the characteristic parameter obtaining operation (an operation of obtaining correction data $n_{th}$) according to the first embodiment.
Figure 15B:
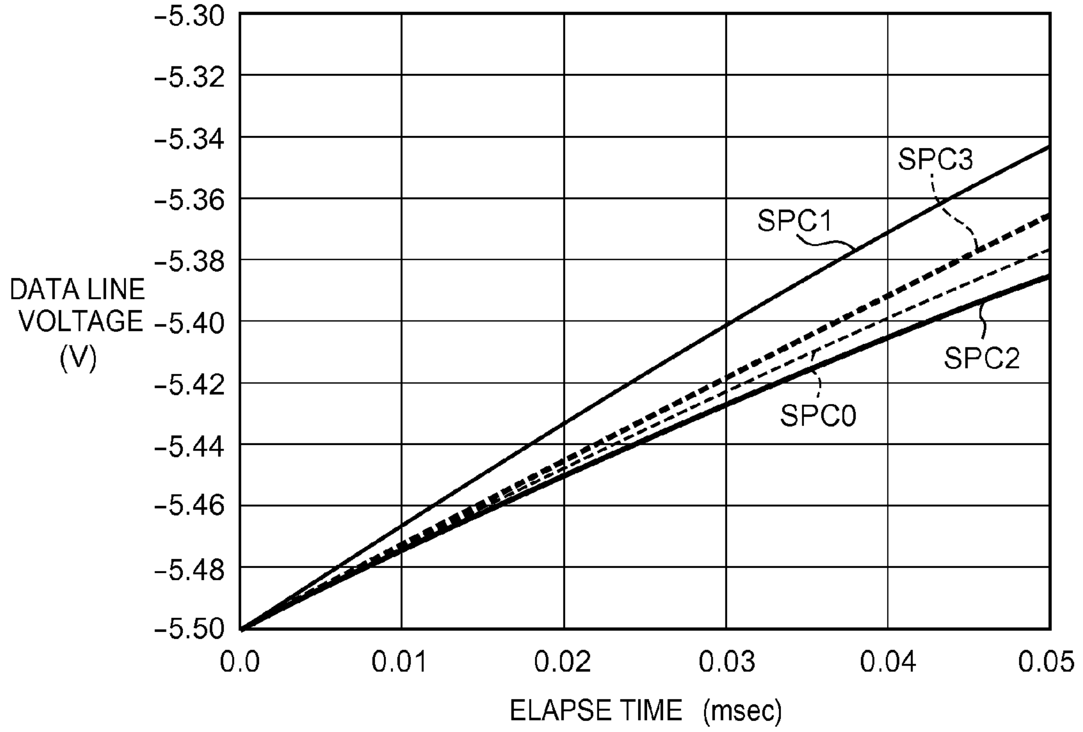
FIG. 15B is a diagram showing an example of a change (a transient curve) in a data line voltage when a cathode voltage is changed and is for explaining a second technique applied to the characteristic parameter obtaining operation (an operation of obtaining correction data $n_{th}$) according to the first embodiment.

FIGS. 15A and 15B are diagrams showing an illustrative change (a transient curve) in the data line voltage when the voltage ELVSS is changed and are for explaining the second technique applied to the characteristic parameter obtaining operation (the operation of obtaining the correction data $n_{th}$). FIG. 15A shows a change in the data line voltage when the elapse time t is within a range from 0.00 to 1.00 msec, and FIG. 15B shows a change in the data line voltage when the elapse time t is within a range from 0.00 to 0.05 msec. FIGS. 15A and 15B both show a change in the data line voltage Vd when the detection voltage Vdac of, for example, −5.5 V is applied to the data line Ld in the characteristic parameter obtaining operation.

A curve SPC0 indicated by a dotted line in FIG. 15A represents a change (an ideal value) in the data line voltage Vd when there is no leak current originating from the application of a reverse bias voltage to the organic EL device OEL of the pixel PIX like the curve SPA0 shown in FIG. 12 and the curve SPB0 shown in FIG. 14.

In contrast, a curve SPC1 indicated by a thin solid line in FIG. 15A represents a change in the data line voltage Vd when there is a leak current originating from the application of a reverse bias voltage to the organic EL device OEL and when a voltage ELVSS that is a ground electric potential GND (=0V) is applied to the cathode of the organic EL device OEL like the curve SPA1 shown in FIG. 12 and the curve SPB1 shown in FIG. 14. That is, the curve SPC1 represents a transient curve when a reverse bias voltage of, almost −5.5 V is applied to the organic EL device OEL. As shown in FIG. 15A, the data line voltage Vd in this case sharply increases from the detection voltage Vdac as time advances, and is likely to always change at a higher voltage than that of the transient curve represented by the curve SPC0.

In contrast, a curve SPC2 indicated by a thick solid line in FIG. 15A corresponds to the second technique. That is, the curve SPC2 represents a change in the data line voltage Vd when there is a leak current originating from the application of a reverse bias voltage to the organic EL device OEL and when a voltage ELVSS that is the same electric potential as the detection voltage Vdac applied to the data line Ld is applied to the cathode of the organic EL device OEL. The curve SPC2 also represents a transient curve when an electric potential difference (a bias) between both terminals of the organic EL device OEL is set to be zero right after the detection voltage Vdac is applied to the data line Ld in order to cause no leak current to flow through the organic EL device OEL. The data line voltage Vd in this case sharply increases from the detection voltage Vdac as time advances as shown in FIG. 15A, always changes at a lower voltage than that of the transient curve represented by the curve SPC0 and is likely to converge on a specific voltage at a shorter elapse time than that of the curve SPC0. At this time, because the voltage ELVSS is set to be the same electric potential as that of the detection voltage Vdac, at a time point right after the detection voltage Vdac is applied to the data line Ld, the electric potential difference between both terminals of the organic EL device OEL is zero as explained above. In this case, the resistance between both terminals of the organic EL device OEL is sufficiently higher than the resistance between the drain of the transistor Tr12 and the source thereof. Hence, the drain current Id in accordance with the detection voltage Vdac flows through the drain of the transistor Tr12 and the source thereof, and through the data line Ld, and hardly flows through the organic EL device OEL.

The electric potential of the data line Ld increases as the elapse time elapses, and the electric potential of the contact N12 also increases. Accordingly, the electric potential of the anode of the organic EL device OEL becomes higher than that of the cathode thereof as the elapse time elapses. However, as will be discussed later, according to the second technique, the elapse time for detecting the voltage of the data line Ld is set to be a short time which is 1 to 50 μsec or so. Hence, the forward bias between both terminals of the organic EL device OEL at a time point when such an elapse time elapses is substantially 0.1 V. In this state, because substantially no forward current flows through the organic EL device OEL, regarding detection of the voltage of the data line Ld, any negative effects by application of the forward bias between both terminals of the organic EL device OEL is ignorable.

Next, with reference to FIG. 15B, a detailed explanation will be given of a change in the data line voltage Vd right after the data line Ld is set to be in a high impedance (HZ) state after the predetermined detection voltage Vdac is applied to the data line Ld in the case of the transient curve shown in FIG. 15A. As shown in FIG. 15B, a change (the curve SPC2) in the data line voltage Vd at the elapse time of, for example, 0.00 to roughly 0.02 msec (20 μsec) has substantially the same behavior as that of the curve SPC0 indicating an ideal value in a case in which there is no leak current. Moreover, regarding the curves SPC2 and SPC0, when the voltage values of the data line voltage Vd after the elapse time of 0.05 msec (50 μsec) has elapsed in both cases are compared, there is a voltage difference that is only 0.01 V (10 mV) or so, and respective behaviors are pretty similar to each other. When the ADC 43(*j*) of the DAC/ADC circuit 144 employs, for example, an 8-bit configuration, 1-bit width at a 10-V amplitude is 10 V/256, which is 39 mV. If the above-explained voltage difference is smaller than the voltage of the 1-bit width, the value of the digital data after digital conversion remains unchanged, so that it is appropriate if the above-explained elapse time is set to be a time at which the above-explained voltage difference becomes smaller than the voltage of the 1-bit width. Therefore, when the elapse time is set to be 0.001 to 0.05 msec (1 to 50 μsec) or so, by setting the voltage ELVSS to be the same voltage value as the detection voltage Vdac applied to the data line Ld, any negative effects by the leak current Ilk to the data line voltage Vd can be eliminated.

More specifically, the behavior (the initial behavior of the curve SPC2) of the data line voltage Vd right after a condition in which the voltage ELVSS with the same voltage value as that of the detection voltage Vdac applied to the data line Ld is applied to the cathode of the organic EL device OEL, the detection voltage Vdac is applied to the data line Ld, and the data line Ld is set to be in a high impedance (HZ) state can be expressed as a following formula (18) using the definition in a following formula (17). The formula (17) is an expression when the leak current Ilk flowing from the cathode of the organic EL device OEL shown in FIG. 10 to the anode thereof and in the data-line-Ld direction is expressed using a resistance R of the organic EL device OEL. Moreover, $t_x$ in the formula (18) is the elapse time t within a range in which respective behaviors of the data line voltage Vd in the case of the curve SPC2 and in the case of the curve SPC0 are substantially the same or similar to each other.

$$\sigma := \frac{1}{2\beta R} \tag{17}$$

$$V(t_x)=V\text{dac}+(V_0-V\text{dac}-V\text{th})^2\cdot(1+\sigma/(V_0-V\text{dac}-V\text{th})\cdot)\beta/Ct_x \tag{18}$$

In the formula (18), a term σ is sufficiently small and ignorable when the elapse time $t_x$ is within a range up to 0.05 msec (50 μsec) or so as explained above even if the leak current is 10 $A/m^2$ or so. Hence, within a range in which the elapse time t is up to 0.05 msec (50 μsec) or so, the formula (18) can be expressed as a straight line represented by a following formula (19). A characteristic line SPC3 indicated by a thick dotted line in FIG. 15B is a straight line representing the behavior of the formula (19), and is pretty similar to the curve SPC0 indicating an ideal value when there is no leak current.

$$V(t_x)=V\text{dac}+(V_0-V\text{dac}-V\text{th})^2\cdot\beta/Ct_x \tag{19}$$

In the formula (19), the voltage $V_0$ and the detection voltage Vdac each have a voltage value set beforehand, and the parameter β/C is a measurable known value in the initial state. Therefore, by obtaining the threshold voltage Vth of the transistor Tr13 using the formula (19), if the threshold voltage Vth becomes varied, the leak current hardly affects the organic EL device OEL, and a precise threshold voltage Vth can be measured at an extremely short elapse time (roughly 50 μsec) in comparison with the basic technique of the above-explained auto zero scheme.

The correction data $n_{th}$ can be expressed by a following formula (21) with a square root function (an sqrt function) based on the formulae (14) and (19) using the definition in a following formula (20). Accordingly, the correction data $n_{th}$ can be calculated using the formula (21) instead of the formula (12) expressed in the basic technique of the above-explained auto zero scheme. The process of obtaining such correction data $n_{th}$ is executed by the correction-data obtaining function circuit 166 and the Vth correction data generating circuit 167 in the controller 160 shown in FIG. 5.

$$\left.\begin{aligned} \frac{V_0-V_1}{\Delta V} &:= n_{offset} \\ \Delta V &:= \frac{V_1-V_{1023}}{1022} \end{aligned}\right\} \tag{20}$$

$$n_{th}=n_{offset}+(n_d-1)-1/\Delta\beta\cdot\text{sqrt}\{(n_d-n_{meas})/(<\xi>t_x)\} \tag{21}$$

Next, an explanation will be given of the characteristic parameter obtaining operation through the first and second techniques in association with the device configuration shown in FIG. 5. The voltage obtaining operation executed through the first technique has substantially the same process procedure as that of the characteristic parameter obtaining operation, so that the explanation below will be mainly given of the characteristic parameter obtaining operation.

Obtained in the characteristic parameter obtaining operation are the correction data $n_{th}$ for correcting the varying in the threshold voltage Vth of the transistor Tr13 that is the driving transistor of each pixel PIX and the correction data Δβ for correcting the varying in the current amplification factor β of each pixel PIX.

Figure 16:
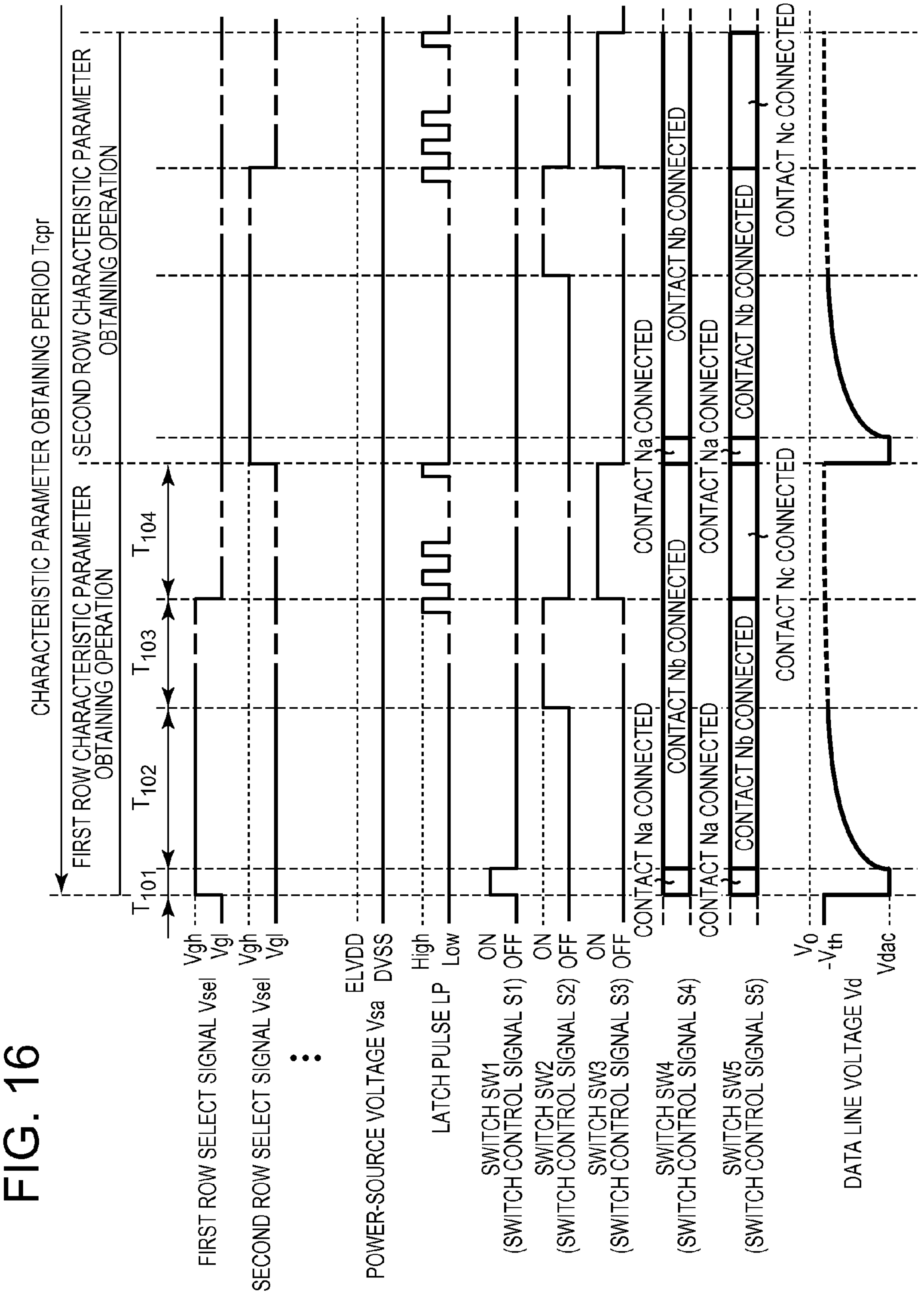
FIG. 16 is a timing chart showing the characteristic parameter obtaining operation by the display device of the first embodiment.
Figure 17:
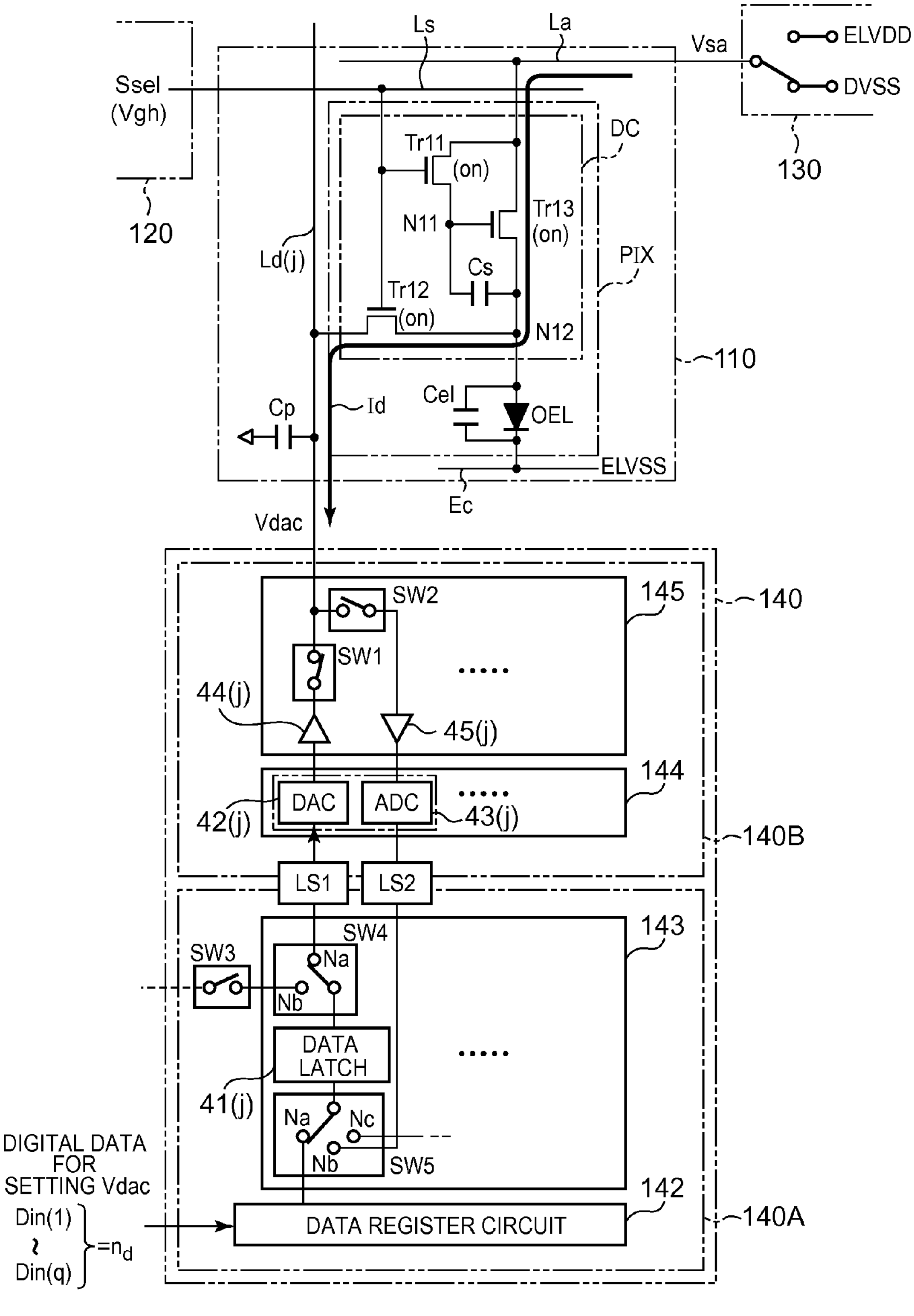
FIG. 17 is an operation conceptual diagram showing a detection voltage applying operation by the display device of the first embodiment.
Figure 18:
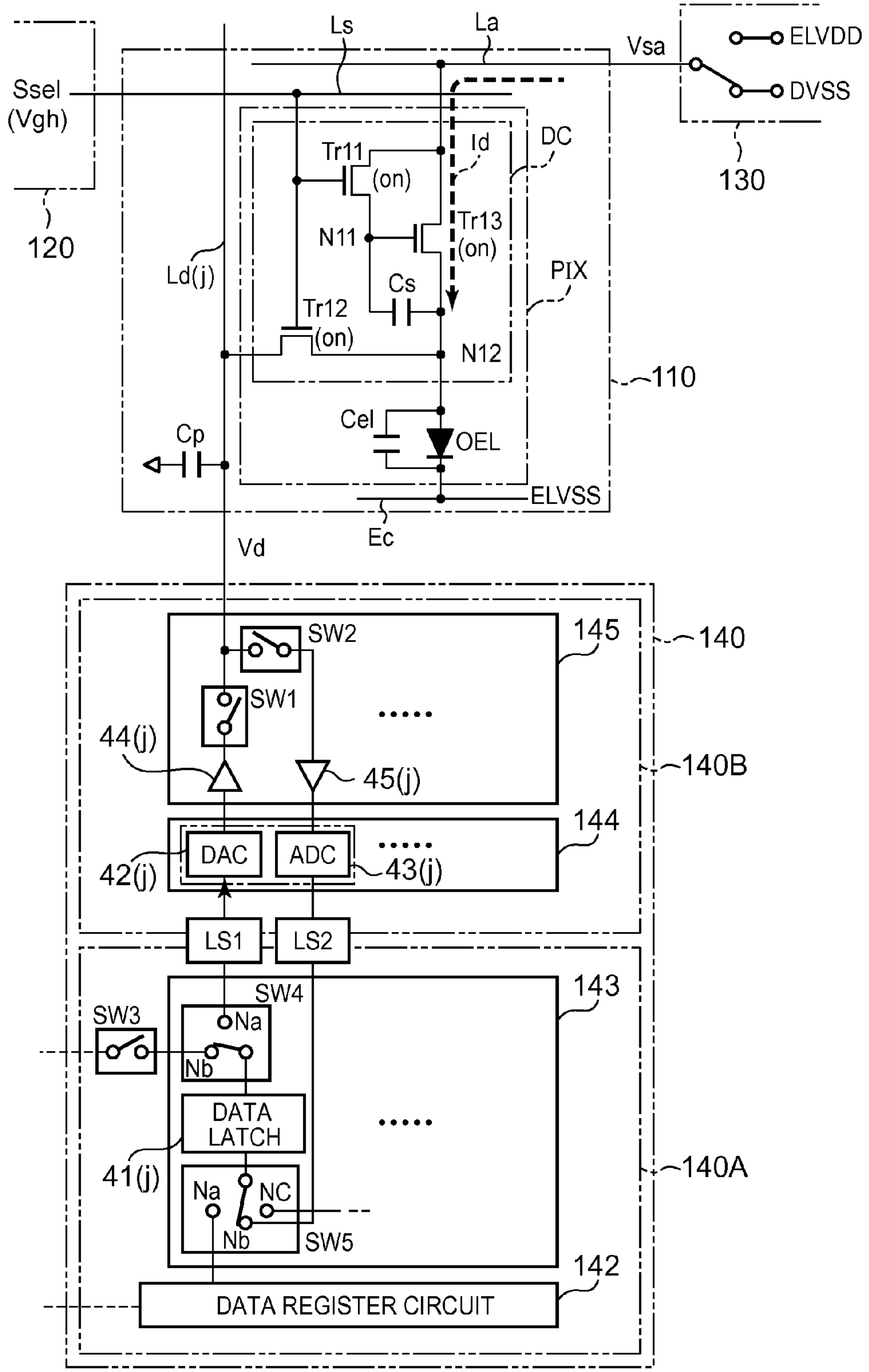
FIG. 18 is an operation conceptual diagram showing a natural elapse operation by the display device of the first embodiment.
Figure 19:
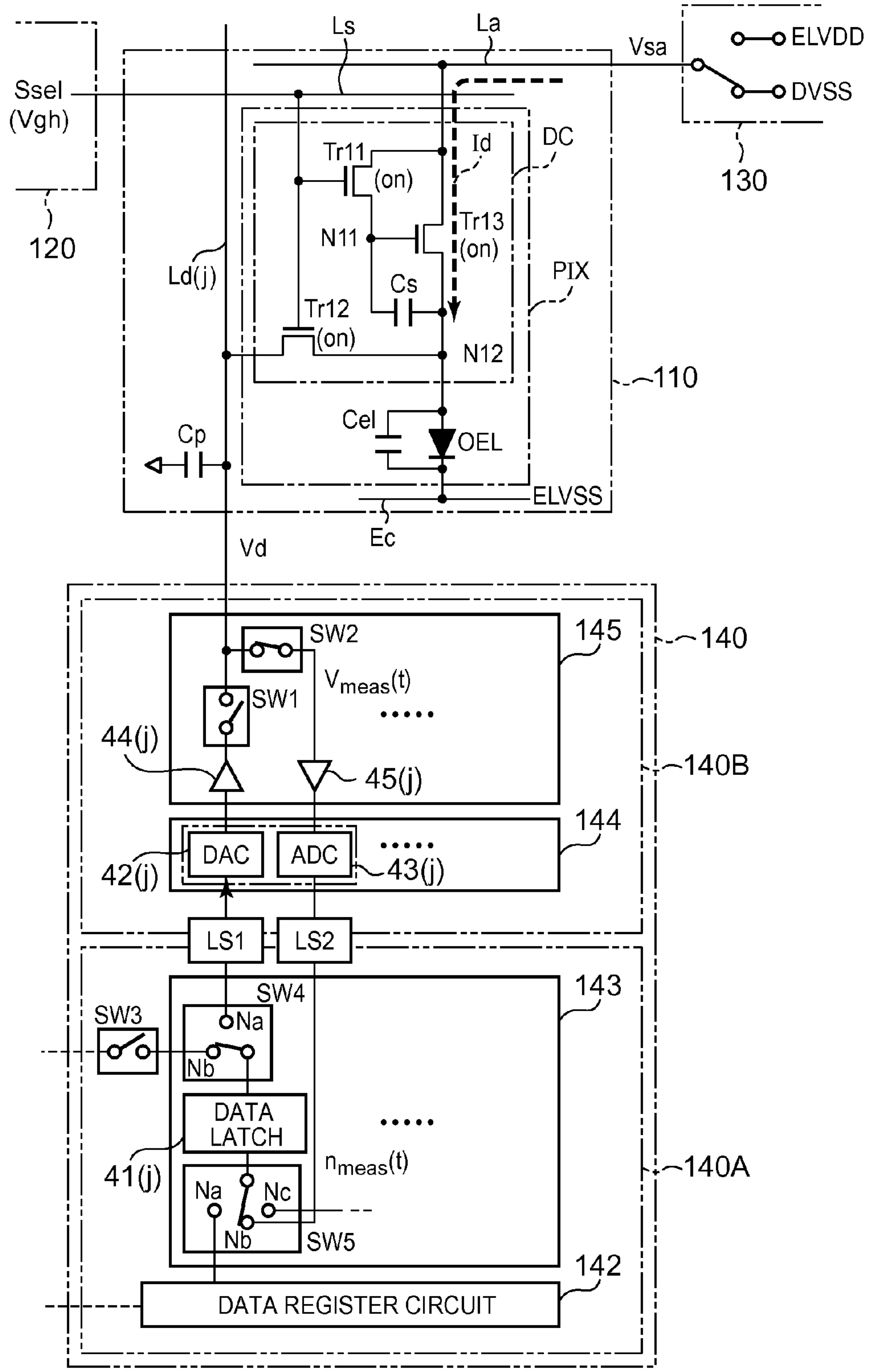
FIG. 19 is an operation conceptual diagram showing a voltage detecting operation by the display device of the first embodiment.
Figure 20:
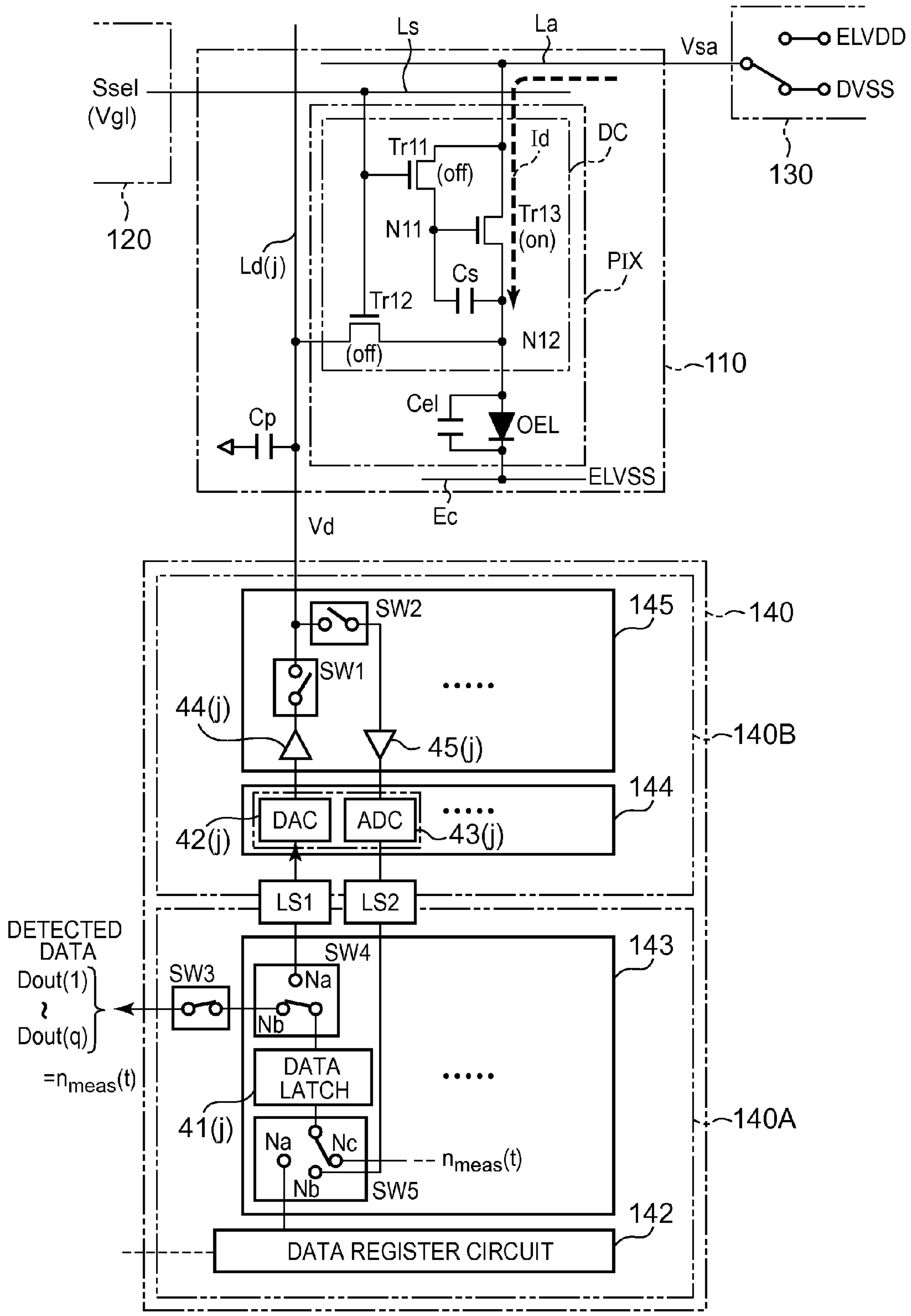
FIG. 20 is an operation conceptual diagram showing a detected data transmitting operation by the display device of the first embodiment.
Figure 21:
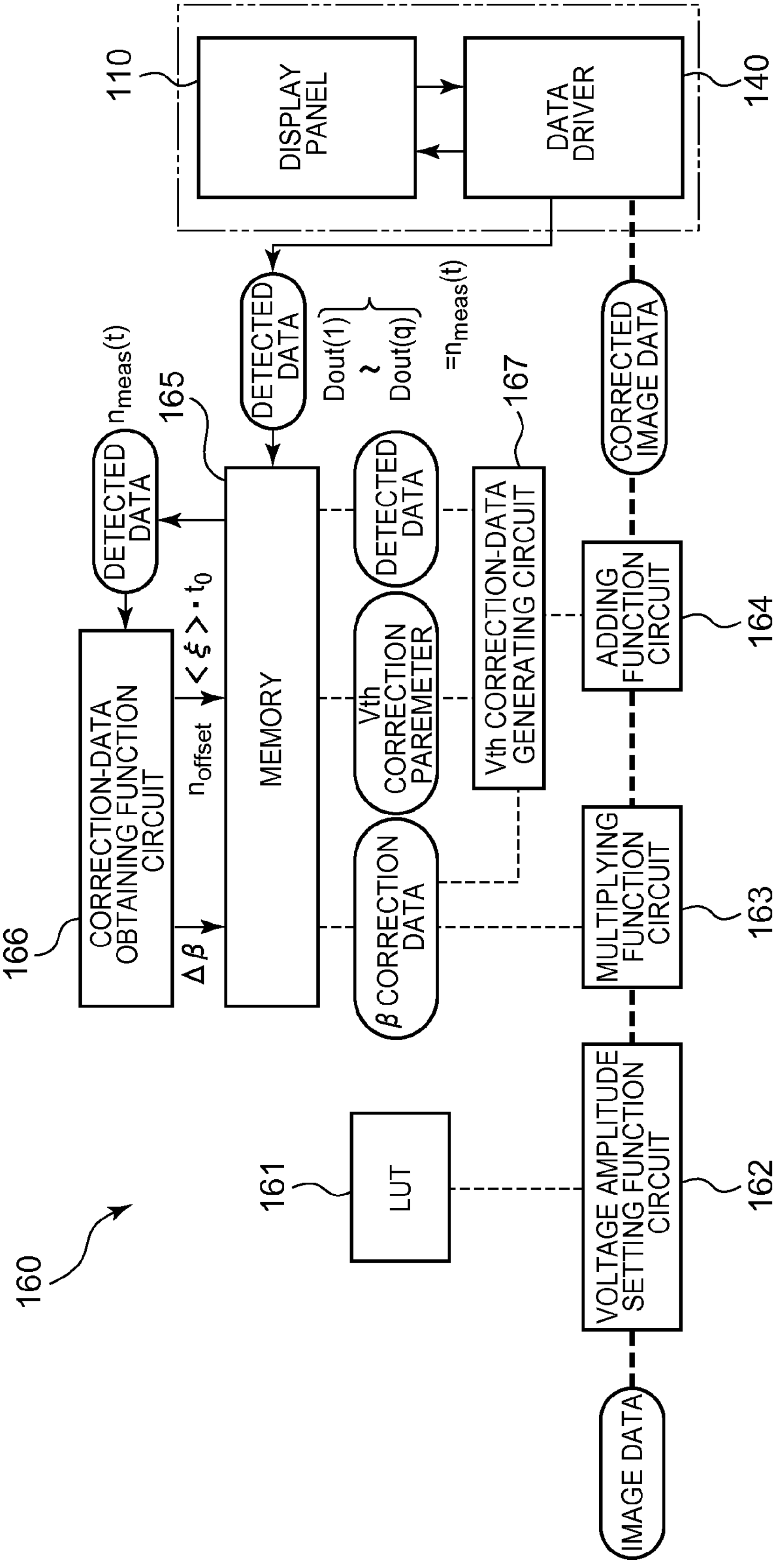
FIG. 21 is a functional block diagram showing a correction data calculation operation by the display device of the first embodiment.

FIG. 16 is a timing chart showing the characteristic parameter obtaining operation by the display device of the present embodiment. FIG. 17 is an operation conceptual diagram showing a detection voltage applying operation by the display device of the present embodiment. FIG. 18 is an operation conceptual diagram showing a natural elapse operation by the display device of the present embodiment. FIG. 19 is an operation conceptual diagram showing a voltage detecting operation by the display device of the present embodiment. FIG. 20 is an operation conceptual diagram showing a detected data transmitting operation by the display device of the present embodiment. In FIGS. 17 to 20, the shift register circuit 141 that is a component of the data driver 140 is omitted for the purpose of simplifying the illustration. Moreover, FIG. 21 is a functional block diagram showing a correction data calculating operation by the display device 100 according to the present embodiment.

In the characteristic parameter (pieces of correction data $n_{th}$, Δβ) obtaining operation according to the present embodiment, as shown in FIG. 16, a predetermined characteristic parameter obtaining period Tcpr is set to include a detection voltage applying period T101, an elapse period T102, a voltage detecting period T103, and a detected data transmitting period T104 for each pixel PIX of each row. The elapse time T102 corresponds to the elapse time t. FIG. 16 is a timing chart when the elapse time t is set to be a time for the purpose of simplifying the illustration. The elapse time t is set to be a time $t_d$ in the voltage obtaining operation executed beforehand in order to obtain the correction data Δβ as explained above, is set to be a time $t_3$ in the characteristic parameter obtaining operation for obtaining the correction data Δβ, and is set to be a time $t_x$ in the characteristic parameter obtaining operation for obtaining the correction data $n_{th}$. Therefore, in practice, for example, with the elapse time T102 being set to be the predetermined elapse time t (=$t_d$, $t_3$, or $t_x$), the successive processing operation including a detection voltage applying operation (the operation in the detection voltage applying period T101), a natural elapse operation (the operation in the elapse period T102), a voltage detecting operation (the operation in the voltage detecting period T103), and a detected data transmitting operation (the operation in the detected data transmitting period T104) is individually executed for each of the operation of obtaining the correction data $n_{th}$, the operation of obtaining the correction data Δβ, and the operation of obtaining the cathode voltage.

First, in the detection voltage applying period T101, as shown in FIGS. 16 and 17, the pixel PIX subjected to the characteristic parameter obtaining operation (in the figure, the pixel PIX of the first row) is set to be in a selected state. That is, the select driver 120 applies a select signal Ssel of a selecting level (a high level: Vgh) to the select line Ls connected to that pixel PIX, and the power-source driver 130 applies a power-source voltage Vsa of a low level (non light emitting level: DVSS=ground electric potential GND) to the power-source line La. When the characteristic parameter obtaining operation of obtaining the correction data Δβ is executed, the voltage control circuit 150 applies the voltage ELVSS with a voltage value corresponding to a specific detected data $n_{meas\_m}(t_d)$ which is an average value or a maximum value of pieces of detected data $n_{meas}(t_d)$ for all pixels PIX obtained through the voltage obtaining operation executed beforehand or a value between the average value and the maximum value to the common electrode Ec to which the cathode of the organic EL device OEL is connected. In the case of the characteristic parameter obtaining operation for obtaining the correction data $n_{th}$, the voltage control circuit 150 applies the voltage ELVSS that is the same electric potential for example as that of the detection voltage Vdac to the common electrode Ec. In the voltage obtaining operation executed in the initial state of the display device 100, the voltage ELVSS that is the ground electric potential GND for example is applied.

In the selected state, the switch SW1 provided in the output circuit 145 of the data driver 140 turns on based on the switch control signal S1 supplied from the controller 160, so that the data line Ld(j) and the DAC 42(*j*) of the DAC/ADC 144 are connected together. Moreover, the switch SW2 provided in the output circuit 145 turns off and the switch SW3 connected to the contact Nb of the switch SW4 turns off based on the switch control signals S2, S3 supplied from the controller 160. Furthermore, the switch SW4 provided in the data latch circuit 143 is set to be connected to the contact Na based on the switch control signal S4 supplied from the controller 160, and the switch SW5 is set to be connected to the contact Na based on the switch control signal S5.

Thereafter, pieces of digital data $n_d$ for generating a detection voltage Vdac with a predetermined voltage value are supplied from the exterior of the data driver 140, and successively taken in by the data register circuit 142. The digital data $n_d$ taken in by the data register circuit 142 is held by the data latch 41(*j*) through the switch SW5 corresponding to each column. Thereafter, the digital data $n_d$ held by the data latch 41(*j*) is input into the DAC 142(*j*) of the DAC/ADC circuit 144 through the switch SW4, is subjected to analog conversion, and is applied to the data line Ld(j) of each column as the detection voltage Vdac.

The detection voltage Vdac is set to be a voltage value satisfying the condition of the formula (6) as explained above. In the present embodiment, because the power-source voltage DVSS applied by the power-source driver 130 is set to be the ground electric potential GND, the detection voltage Vdac is set to be a negative voltage level. The digital data $n_d$ for generating the detection voltage Vdac is stored in, for example, the memory built in the controller 160 or the like beforehand.

As a result, the transistors Tr11 and Tr12 provided in the pixel driving circuit DC configuring the pixel PIX turn on, and a power-source voltage Vsa (=GND) of a low level is applied to the gate of the transistor Tr13 and the one end (the contact N11) of the capacitor Cs through the transistor Tr11. Moreover, the detection voltage Vdac applied to the data line Ld(j) is applied to the source of the transistor Tr13 and the other terminal (the contact N12) of the capacitor Cs through the transistor Tr12.

As an electric potential difference larger than the threshold voltage Vth of the transistor Tr13 is applied between the gate of the transistor Tr13 and the source thereof (i.e., across both terminals of the capacitor Cs), the transistor Tr13 turns on, and a drain current Id in accordance with the electric potential difference (i.e., the voltage Vgs between the gate and the source) starts flowing. At this time, because the electric potential (the detection voltage Vdac) of the source of the transistor Tr13 is set to be lower than the electric potential (the ground electric potential GND) of the drain of the transistor Tr13, the drain current Id flows in the direction toward the data driver 140 from the power-source voltage line La through the transistor Tr13, the contact N12, the transistor Tr12, and the data line Ld(j). This causes the capacitor Cs connected between the gate of the transistor Tr13 and the source thereof to be charged through both terminals with a voltage corresponding to the electric potential difference based on the drain current Id.

At this time, because a lower voltage than the voltage ELVSS applied to the cathode (the common electrode Ec) is applied to the anode (the contact N12) of the organic EL device OEL in the voltage obtaining operation and in the characteristic parameter obtaining operation for obtaining the correction data Δβ, no current flows through the organic EL device OEL, and the organic EL device OEL does not emit light. Moreover, in the characteristic parameter obtaining operation for obtaining the correction data $n_{th}$, because the voltage substantially equal to the voltage ELVSS applied to the cathode (the common electrode Ec) of the organic EL device OEL is applied to the anode thereof, no current flows through the organic EL device OEL and the organic EL device OEL does not emit light.

Next, in the elapse time T102 after the end of the detection voltage applying period T101, as shown in FIGS. 16 and 18, with the pixel PIX being maintained in the selected state, the switch SW1 of the data driver 140 turns off based on the switch control signal S1 supplied from the controller 160, the data line Ld(j) is electrically disconnected from the data driver 140, and the DAC 42(*j*) terminates outputting the detection voltage Vdac. Moreover, like the detection voltage applying period T101, the switches SW2, SW3 turn off, the switch SW4 is set to be connected to the contact Nb, and the switch Sw5 is set to be connected to the contact Nb.

Accordingly, because the transistors Tr11, Tr12 maintain the on state, the electrical connection between the pixel PIX (the pixel driving circuit DC) and the data line Ld(j) is maintained, but the application of voltage to that data line Ld(j) is shut off, the other terminal (the contact N12) of the capacitor Cs is set to be in a high impedance (HZ) state.

In the elapse period T102, the transistor Tr13 maintains the on state in the detection voltage applying period T101 because of the voltage charged in the capacitor Cs (between the gate of the transistor Tr13 and the source thereof), so that the drain current Id keeps flowing. The electric potential at the source (the contact N12: the other end of the capacitor Cs) of the transistor Tr13 gradually increases so as to be close to the threshold voltage Vth of the transistor Tr13. As a result, as shown in FIGS. 9, 12, and 14, when the elapse time t is set sufficiently long, the electric potential of the data line Ld(j) also changes so as to converge on the threshold voltage Vth of the transistor Tr13. In the present embodiment, as explained above, in both of the voltage obtaining operation and the characteristic parameter obtaining operation for obtaining pieces of the correction data Δβ and $n_{th}$, as will be discussed later, the data line voltage Vd is detected at a time point at which a relatively short time has elapsed (timings: $t_c$, $t_3$, and $t_x$) before the data line voltage Vd converges. Accordingly, the elapse time T102 is set to be sufficiently shorter than the elapse time (an elapsed time at which the data line voltage Vd converges) shown in FIGS. 9, 12, and 14.

Also in the elapse time T102, a voltage that is lower than the voltage ELVSS applied to the cathode (the common electrode Ec) or a voltage substantially equal to the voltage ELVSS is applied to the anode (the contact N12) of the organic EL device OEL, so that no current flows through the organic EL device OEL, and the organic EL device OEL does not emit light.

Next, in the voltage detecting period T103, upon advancement of the predetermined elapse time t in the elapse period T102, as shown in FIGS. 16 and 19, with the pixel PIX being maintained in the selected state, the switch SW2 of the data driver 140 turns on by the switch control signal S2 supplied from the controller 160. At this time, the switches SW1, SW3 turn off, the switch SW4 is set to be connected to the contact Nb, and the switch SW5 is set to be connected to the contact Nb.

Accordingly, the data line Ld(j) and the ADC 43(*j*) of the DAC/ADC 144 are connected together, and a data line voltage Vd at a time point when the predetermined elapse time t has elapsed in the elapse period T102 is taken in by the ADC 43(*j*) through the switch SW2 and the buffer 45(*j*). The data line voltage Vd taken by the ADC 43(*j*) at this time corresponds to the detected voltage Vmeas(t) expressed in the formula (5).

The detected voltage Vmeas(t) taken by the ADC 43(*j*) and in the form of analog signal voltage is converted into detected data $n_{meas}$(t) in the form of digital data by the ADC 43(*j*) based on the formula (8), and is held by the data latch 41(*j*) through the switch SW5.

Next, in the detected data transmitting period T104, as shown in FIGS. 16 and 20, the pixel PIX is set to be in a non-selected state. That is, the select driver 120 applies a select signal Ssel of a non-selecting level (a low level: Vgl) to the select line Ls. In the non-selected state, the switch SW5 provided at the input stage of the data latch 41(*j*) of the data driver 140 is set to be connected to the contact Nc and the switch SW4 provided at the output stage of the data latch 41(*j*) is set to be connected to the contact Nb based on the switch control signals S4, S5 supplied from the controller 160. Moreover, the switch SW3 turns on based on the switch control signal S3. At this time, the switches SW1, SW2 turn off based on the switch control signals S1, S2.

Accordingly, the data latches 41(*j*) of adjoining columns are connected in series through the switches SW4, SW5, and are connected to the external memory (the memory 165 built in the controller 160) through the switch SW3. Thereafter, based on the data latch pulse signal LP supplied from the controller 160, pieces of detected data $n_{meas}$(t) held by the data latches 41(*j*+1) of individual columns are successively transferred to the respective adjoining data latches 41(*j*). Hence, the detected data $n_{meas}$(t) by what corresponds to pixels PIX of one row is output to the controller 160 as serial data, and as shown in FIG. 21, stored in the predetermined memory area of the memory 165 built in the controller 160 in association with individual pixels PIX. The threshold voltage Vth of the transistor Tr13 provided in the pixel driving circuit DC of each pixel PIX has a different varying level because of the drive history (the light emitting history) or the like of each pixel PIX, and the current amplification factor β also varies for each pixel PIX, so that the memory 165 stores detected data $n_{meas}$(t) unique to each pixel PIX.

According to the present embodiment, by repeating the above-explained characteristic parameter obtaining operation (including the voltage obtaining operation) for each pixel PIX of each row, plural pieces of detected data $n_{meas}$(t) for all pixels PIX arranged in the display panel 110 are stored in the memory 165 of the controller 160.

In the above-explained voltage obtaining operation, after the arithmetic processing circuit in the controller 160 calculates an average value of pieces of detected data $n_{meas}$(t) for all pixels PIX stored in the memory 165, and/or after the maximum value thereof is extracted, specific detected data $n_{meas\_m}$(t) corresponding to the average value, the maximum value, or the value between the average value and the maximum value is transmitted to the voltage control circuit 150. This causes the voltage control circuit 150 to generate the voltage ELVSS with a voltage value corresponding to the specific detected data $n_{meas\_m}$(t), and to apply such a voltage to each pixel PIX through the common electrode Ec.

Next, in the characteristic parameter obtaining operation, based on the detected data $n_{meas}$(t) for each pixel PIX stored in the memory 165, operations of calculating the correction data $n_{th}$ for correcting the threshold voltage Vth of the transistor (the driving transistor) Tr13 of each pixel PIX and the correction data Δβ for correcting the current amplification factor β are executed.

More specifically, as shown in FIG. 21, first, the correction-data obtaining function circuit 166 built in the controller 160 reads the detected data $n_{meas}$(t) for each pixel PIX stored in the memory 165. Next, the correction-data obtaining function circuit 166 calculates, based on the formulae (14), (15) and (17) to (21), the correction data $n_{th}$ (more specifically, the Vth parameters $n_{offset}$ and $<\xi>\cdot t_0$ defining the correction data $n_{th}$) and the correction data Δβ. The calculated correction data Δβ and Vth parameters $n_{offset}$ and $<\xi>\cdot t_0$ are stored in the predetermined memory area in the memory 165 in association with each pixel PIX.

<Display Operation>

Next, in the display operation (the light emitting operation) by the display device 100 of the present embodiment, the display device 100 corrects image data using the pieces of correction data $n_{th}$ and Δβ and causes each pixel PIX to emit light at desired brightness and gradation.

Figure 22:
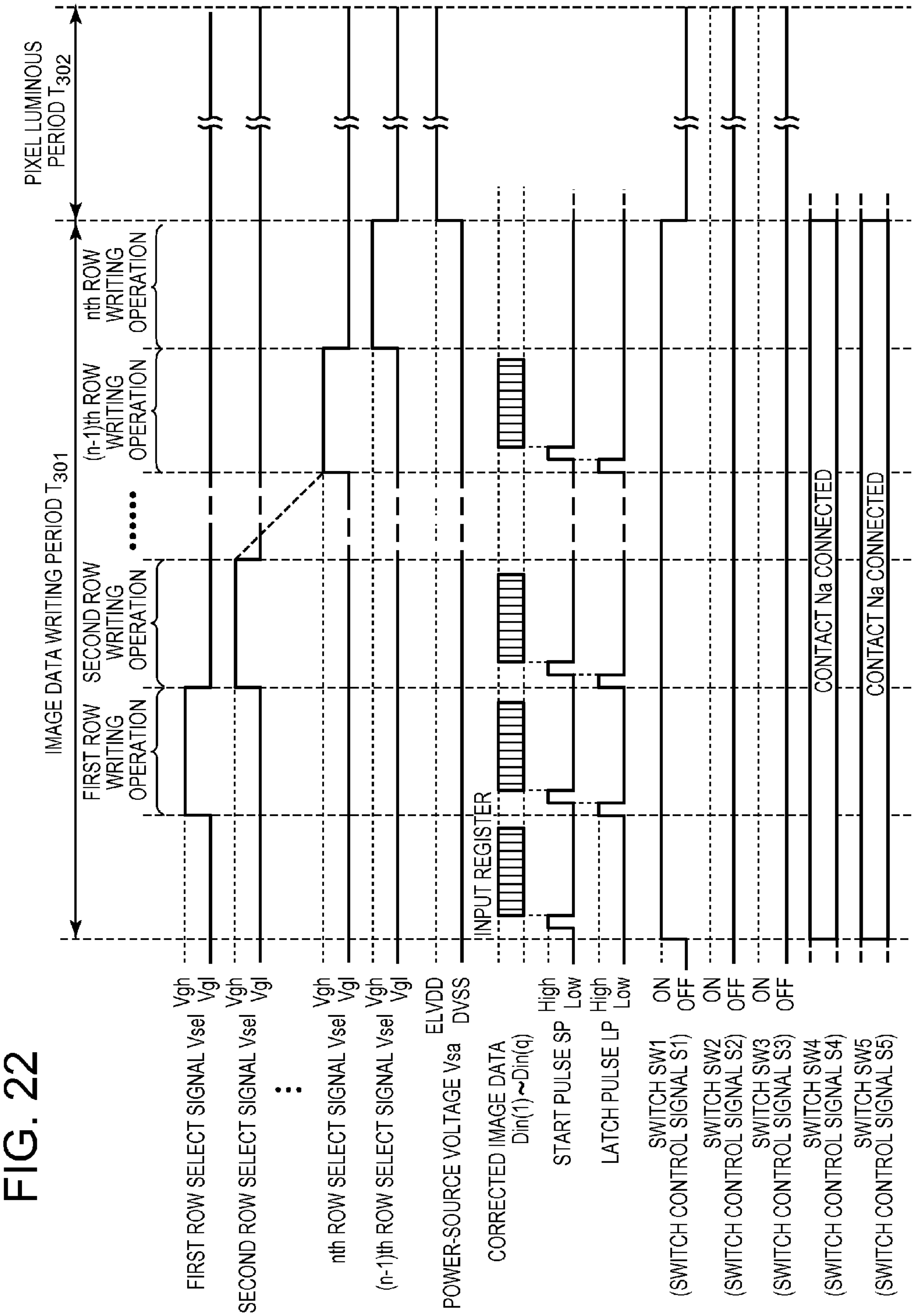
FIG. 22 is a timing chart showing a light emitting operation by the display device of the first embodiment.
Figure 23:
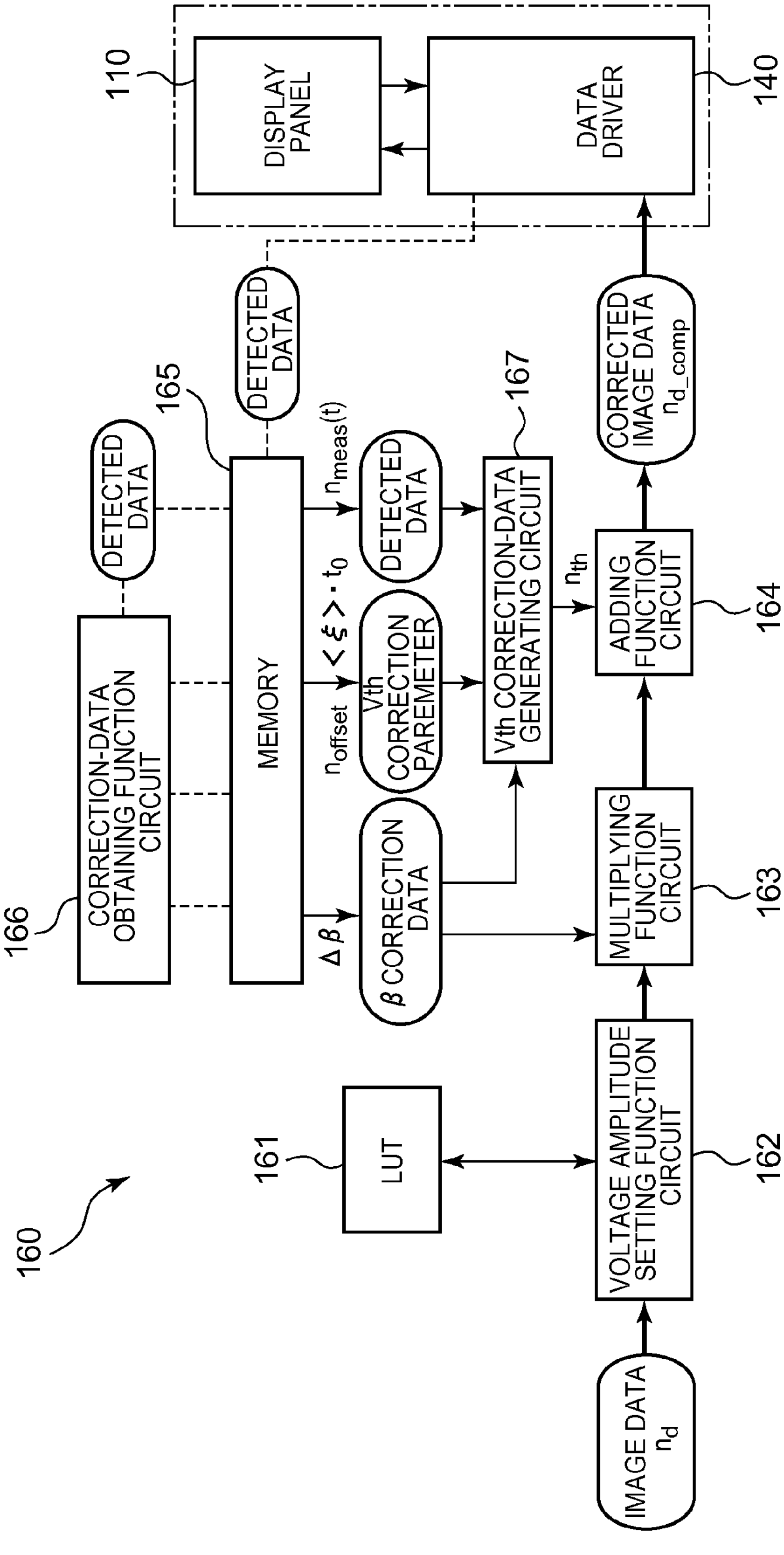
FIG. 23 is a functional block diagram showing a correcting operation of image data by the display device of the first embodiment.
Figure 24:
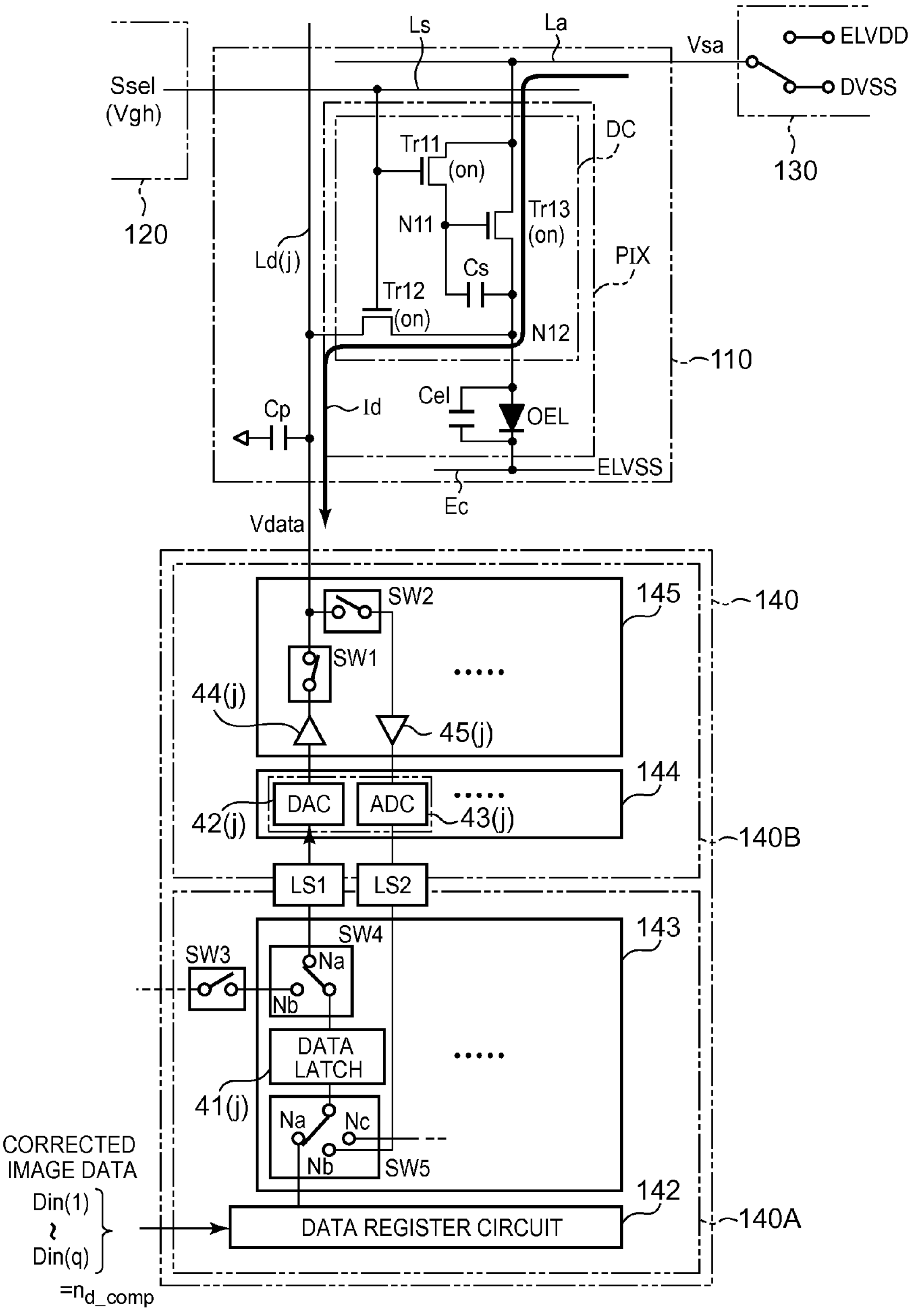
FIG. 24 is an operation conceptual diagram showing a writing operation of corrected image data by the display device of the first embodiment.
Figure 25:
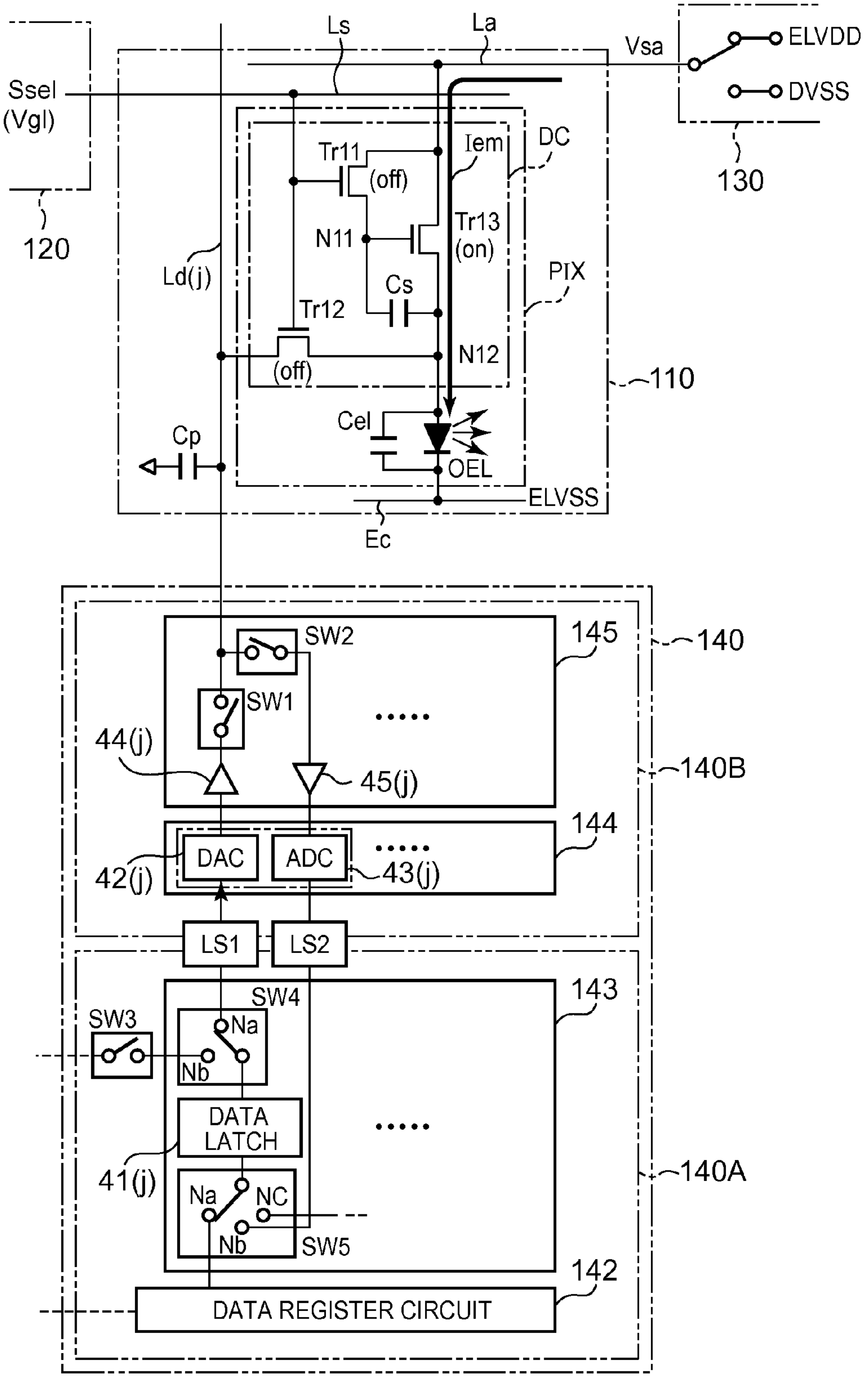
FIG. 25 is an operation conceptual diagram showing a light emitting operation by the display device of the first embodiment.

FIG. 22 is a timing chart showing a light emitting operation by the display device of the present embodiment. FIG. 23 is a functional block diagram showing an operation of correcting image data by the display device of the present embodiment. FIG. 24 is an operation conceptual diagram showing a writing operation of corrected image data by the display device of the present embodiment. FIG. 25 is an operation conceptual diagram showing a light emitting operation by the display device of the present embodiment. The shift register circuit 141 among the structural elements of the data driver 140 is omitted in FIGS. 24 and 25 in order to simplify the illustration.

As shown in FIG. 22, the period of the display operation of the present embodiment is set to include an image data writing period T301 for generating desired image data corresponding to each pixel PIX of each row and for writing such image data, and a pixel luminous period T302 for causing each pixel PIX to emit light at brightness and gradation in accordance with the image data.

In the image data writing period T301, an operation of generating corrected image data and an operation of writing corrected image data to each pixel PIX are executed. In the operation of generating corrected image data, the controller 160 corrects predetermined image data $n_d$ in the form of digital data using the pieces of correction data Δβ and nth obtained through the above-explained characteristic parameter obtaining operation, and supplies image data (corrected image data) $n_{d\_comp}$ having undergone a correcting process to the data driver 140.

More specifically, as shown in FIG. 23, the voltage amplitude setting function circuit 162 refers to the look-up table 161 and sets a voltage amplitude corresponding to each color of R, G, and B to image data (second image data) $n_d$ including a brightness value and a gradation value for each color of R, G, and B supplied from the exterior to the controller 160. Next, the multiplying function circuit 163 reads the correction data Δβ for each pixel PIX stored in the memory 165, and executes a process of multiplying the image data $n_d$ having undergone voltage setting by the read correction data Δβ

($n_d \times \Delta\beta$). Next, the Vth correction data generating circuit 167 reads the Vth correction parameters $n_{offset}$ and $<\xi>\cdot t_0$ and detected data $n_{meas}(t)$ defining the correction data $n_{th}$ and stored in the memory 165, and based on the formula (21), generates the correction data $n_{th}$ for correcting the threshold voltage Vth of the transistor Tr13 using the correction data $\Delta\beta$, the Vth correction parameters $n_{offset}$ and $<\xi>\cdot t_0$ and the detected data $n_{meas}(t_0)$. Thereafter, the adding function circuit 164 adds the correction data $n_{th}$ generated by the Vth correction data generating circuit 167 to the digital data ($n_d \times \Delta\beta$) having undergone the multiplying process (($n_d \times \Delta\beta$)+$n_{th}$). Through the successive correcting process, the controller 160 generates the corrected image data $n_{d\_comp}$ and supplies such data to the data driver 140.

In the operation of writing the corrected image data into each pixel PIX, the data driver 140 writes a gradation voltage Vdata corresponding to the supplied corrected image data $n_{d\_comp}$ into each pixel PIX through the data line Ld(j) with the pixel PIX subjected to writing being set to be in a selected state. More specifically, as shown in FIGS. 22 and 24, first, a select signal Ssel of a selecting level (a high level: Vgh) is applied to the select line Ls to which the pixel PIX is connected, and a power-source voltage Vsa of a low level (a non light emitting level: DVSS=the ground electric potential GND) is applied to the power-source line La. Moreover, applied to the common electrode Ec to which the cathode of the organic EL device OEL is connected is, for example, the ground electric potential GND that is equal to the power-source voltage Vsa (=DVSS) as the voltage ELVSS.

In this selected state, the switch SW1 is turned on, and the switches SW4, SW5 are set to be connected to the contact Nb, pieces of corrected image data $n_{d\_comp}$ supplied from the controller 160 are successively taken in by the data register circuit 142, and are held by individual data latches 41(*j*) of individual columns. The held image data $n_{d\_comp}$ is subjected to analog conversion by the DAC 42(*j*), and is applied as a gradation voltage (a third voltage) Vdata to the data line Ld(j) of each column. The gradation voltage Vdata can be defined by a following formula (22) in association with the definition by the formula (8).

$$Vdata=V1-\Delta V(n_{d\_comp}-1) \quad (22)$$

Accordingly, in the pixel driving circuit DC configuring the pixel PIX, a power-source voltage Vsa of a low level (=GND) is applied between the gate of the transistor Tr13 and the one end (the contact N11) of the capacitor Cs, and the gradation voltage Vdata corresponding to the corrected image data $n_{d\_comp}$ is applied between the source of the transistor Tr13 and the other end (the contact N12) of the capacitor Cs.

Therefore, a drain current Id in accordance with the electric potential difference (a voltage Vgs between the gate and the source) between the gate of the transistor Tr13 and the source thereof starts flowing, and the capacitor Cs is charged by a voltage (substantially equal to Vdata) across both terminals corresponding to the drain current Id. At this time, because a voltage (the gradation voltage Vdata) lower than that of the cathode (the common electrode Ec; the ground electric potential GND) of the organic EL device OEL is applied to the anode thereof, no current flows through the organic EL device OEL and the organic EL device OEL does not emit light.

Next, in the pixel luminous period T302, as shown in FIG. 22, with the pixel PIX of each row being set to be in a non-selected state, all pixels PIX are simultaneously set to be in a light emitting mode. More specifically, as shown in FIG. 25, select signals Ssel of a non-selected level (a low level: Vgl) are applied to respective select lines Ls of all pixels PIX arranged in the display panel 110, and a power-source voltage Vsa of a high level (a light emitting level: ELVDD>GND) is applied to the power-source line La.

Accordingly, the transistors Tr11, Tr12 provided in the pixel driving circuit DC of each pixel PIX turn off, and the voltage (substantially equal to Vdata: the voltage Vgs between the gate and the source) charged in the capacitor Cs connected between the gate of the transistor Tr13 and the source thereof is held. Therefore, the drain current Id is allowed to flow through the transistor Tr13, and as the electric potential of the source (the contact N12) of the transistor Tr13 increases higher than the voltage ELVSS (=GND) applied to the cathode (the common electrode Ec) of the organic EL device OEL, a light emitting drive current Iem flows through the organic EL device OEL from the pixel driving circuit DC. The light emitting drive current Iem is set based on the voltage value of the voltage (substantially equal to Vdata) held between the gate of the transistor Tr13 and the source thereof in the operation of writing the corrected image data, so that the organic EL device OEL emits light at brightness and gradation in accordance with the corrected image data $n_{d\_comp}$.

According to the above-explained embodiment, as shown in FIG. 22, in the display operation, after a writing operation of the corrected image data into the pixel PIX of a predetermined row (e.g., a first row) completes, until a writing operation of image data into the pixel PIX of another row (e.g., a second row) completes, the pixel PIX of such a row is set to be in a held state. In the held state, as a select signal Ssel of a non-selecting level is applied to the select line Ls of that row, the pixel PIX becomes in a non-selected state, and as a power-source voltage Vsa of a non light emitting level is applied to the power-source line La, that pixel PIX becomes a non light emitting state. As shown in FIG. 22, the held state has a different set time for each row. Moreover, when driving/controlling of causing the pixel PIX to emit light is performed immediately after a writing operation of the corrected image data into the pixel PIX of each row completes, such a pixel PIX may not be set to be in the held state.

As explained above, adopted according to the display device (a light emitting device including a pixel driving device) 100 and the driving/controlling method thereof according to the present embodiment is a technique of executing the successive characteristic parameter obtaining operation of using the auto zero scheme unique to the present invention, of taking a data line voltage, and of converting such a voltage into detected data in the form of digital data is executed at timings (the elapse times) set beforehand. In particular, at the time of the characteristic parameter obtaining operation, a technique of setting (i.e., changing) the cathode voltage applied to the cathode (the common electrode) of the organic EL device OEL of each pixel PIX to be a specific voltage value in accordance with the parameters is adopted. As a result, according to the present embodiment, the parameters for correcting the varying in the threshold voltage of the driving transistor of each pixel and the varying in the current amplification factor of each pixel are appropriately obtained and stored at a short time regardless of the current characteristic (in particular, the leak current originating from the application of a reverse bias voltage) of the organic EL device OEL of each pixel PIX.

Therefore, according to the present embodiment, the display device (the light emitting device) 100 and the driving/controlling method thereof can appropriately perform a correcting process of correcting the varying in the threshold voltage of each pixel and the varying of the current amplification factor on image data to be written in each pixel, so that it is possible for the light emitting element (the organic EL device) to emit light at intrinsic brightness and gradation in accordance with the image data regardless of how much the characteristic of each pixel changes and varies, thereby realizing an active organic EL driving system with a good light emitting characteristic and a uniform image quality.

Moreover, the display device (the light emitting device) 100 and the driving/controlling method thereof can execute the process of calculating the correction data for correcting the varying in the current amplification factor and the process of calculating the correction data for compensating the varying in the threshold voltage of the driving transistor as successive sequences by the controller 160 having a single correction-data obtaining function circuit 166, so that it is not necessary to provide individual structural elements (function circuits) depending on the content of the calculating process of the correction data, thereby simplifying the device configuration of the display device (the light emitting device) 100.

Second Embodiment

Next, an explanation will be given of a second embodiment of the present invention in which the display device (the light emitting device) 100 of the first embodiment is applied to an electronic device with reference to the accompanying drawings. The display device 100 with the display panel 110 having the organic EL device OEL as the light emitting element provided in each pixel PIX according to the first embodiment can be applied to various electronic devices, such as a digital camera, a mobile personal computer, and a cellular phone.

Figure 26A:
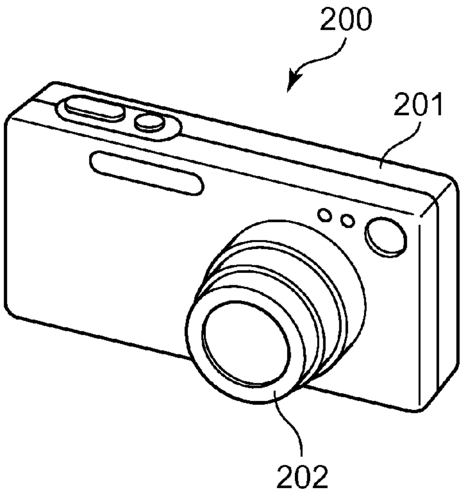
FIG. 26A is a perspective view showing an illustrative configuration of a digital camera according to a second embodiment.
Figure 26B:
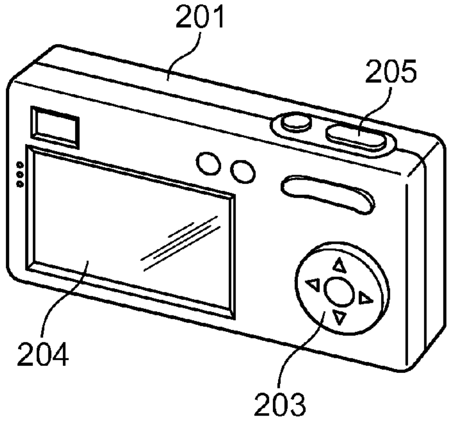
FIG. 26B is a perspective view showing an illustrative configuration of the digital camera according to the second embodiment.
Figure 27:
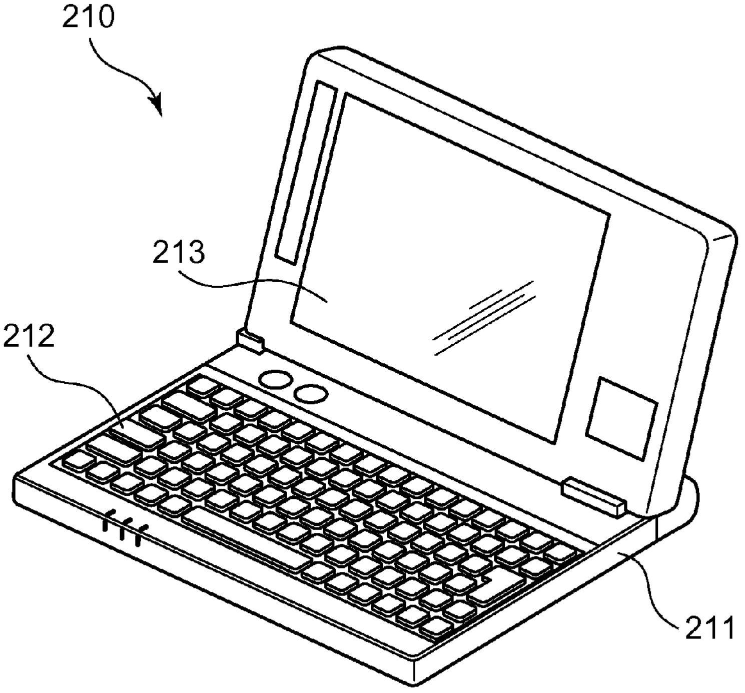
FIG. 27 is a perspective view showing an illustrative configuration of a mobile personal computer according to the second embodiment.
Figure 28:
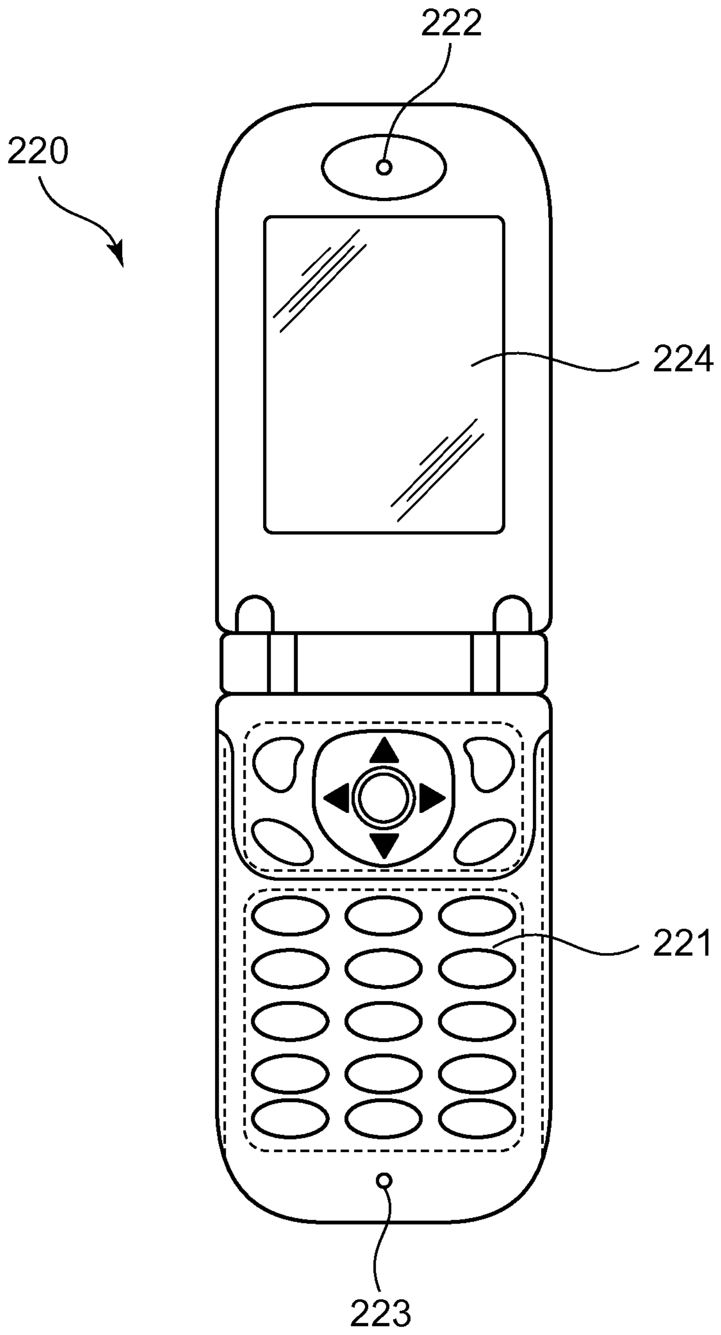
FIG. 28 is a diagram showing an illustrative configuration of a cellular phone according to the second embodiment.

FIGS. 26A, 26B are perspective views showing an illustrative configuration of a digital camera according to the second embodiment. FIG. 27 is a perspective view showing an illustrative configuration of a mobile personal computer according to the second embodiment. FIG. 28 is a diagram showing an illustrative configuration of a cellular phone according to the second embodiment. All devices include the display device (the light emitting device) 100 of the first embodiment.

In FIGS. 26A and 26B, a digital camera 200 includes a main body unit 201, a lens unit 202, an operating unit 203, a display unit 204 that is the display device 100 of the first embodiment with the display panel 110, and a shutter button 205. In this case, the display unit 204 allows the light emitting element of each pixel in the display panel 110 to emit light at appropriate brightness and gradation in accordance with image data, so that the display unit 204 can accomplish a good and uniform image quality.

Moreover, in FIG. 27, a personal computer 210 includes a main body unit 211, a keyboard 212, and a display unit 213 that is the display device 100 of the first embodiment with the display panel 110. In this case, also, the display unit 213 allows the light emitting element of each pixel in the display panel 110 to emit light at appropriate brightness and gradation in accordance with image data, so that the display unit 213 can accomplish a good and uniform image quality.

Furthermore, in FIG. 28, a cellular phone 220 includes an operating unit 221, an ear piece 222, a telephone microphone 223, and a display unit 224 that is the display device 100 of the first embodiment with the display panel 110. In this case, also, the display unit 224 allows the light emitting element of each pixel in the display panel 110 to emit light at appropriate brightness and gradation in accordance with image data, so that the display unit 224 can accomplish a good and uniform image quality.

In the foregoing embodiments, the explanation was given of a case in which the present invention is applied to the display device (the light emitting device) 100 with the display panel 110 having a light emitting element that is an organic EL device OEL in each pixel. However, the present invention is not limited to such a case. For example, the present invention can be applied to an exposure device which has light-emitting-element arrays where a plurality of pixels each including a light emitting element that is an organic EL device OEL are arranged in a direction, and which irradiates a photoreceptor drum with light emitted from the light-emitting-element arrays in accordance with image data to expose an object. In this case, the light emitting element of each pixel in the light-emitting-element arrays can emit light at appropriate brightness and gradation in accordance with image data, thereby accomplishing a good exposure state.

The foregoing embodiments can be changed and modified in various forms without departing from the scope and the spirit of the present invention. The foregoing embodiments are merely for explanation, and are not for limiting the scope and spirit of the present invention. The scope and spirit of the present invention are indicated by the appended claims rather than by the foregoing embodiments. It should be understood that various changes and modifications equivalent to each claim are included within the scope and spirit of the present invention.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A pixel driving device that drives a plurality of pixels, wherein each of the plurality of pixels includes: (i) a light emitting element; and (ii) a pixel driving circuit comprising a driving device having a first end of a current path connected to a first end of the light emitting element and having a second end of the current path to which a power-source voltage is applied, the pixel driving device comprising:

a plurality of voltage obtaining circuits respectively provided for a plurality of data lines, wherein each voltage obtaining circuit is configured to obtain a voltage value of each data line, and each data line is connected to each pixel;

a voltage control circuit that sets a voltage of a second end of the light emitting element of each pixel; and a correction-data obtaining function circuit which obtains a characteristic parameter including a threshold voltage of the driving device of each pixel based on the voltage value of each data line obtained by each voltage obtaining circuit, wherein the voltage obtaining circuits obtain, as a plurality of first measurement voltages, voltage values of individual data lines at a first timing at which a first elapse time has elapsed after a first detection voltage is applied to each data line, with the voltage of the second end of the light emitting element of each pixel being set to be a first setting voltage by the voltage control circuit, wherein the first elapse time is set to be 1 to 50 μsec, wherein the correction-data obtaining function circuit obtains, as the characteristic parameter, a first characteristic parameter relating to the threshold voltage of the driving device of each pixel based on the voltage values of the first measurement voltages, wherein the voltage obtaining circuits obtain, as a plurality of second measurement voltages, voltage values of the individual data lines at a second timing at which a second elapse time longer than the first elapse time has elapsed after a second detection voltage is applied to each data line and a current is caused to flow through the current path of the driving device through each data line, with the voltage of the second end of the light emitting element of each pixel being set to be a second setting voltage by the voltage control circuit, wherein the correction-data obtaining function circuit obtains, as the characteristic parameter, a second characteristic parameter relating to a current amplification factor of the pixel driving circuit of each pixel, based on the obtained voltage values of the second measurement voltages, wherein the first setting voltage is set to be a voltage having an electric potential difference from the first detection voltage smaller than a light emitting threshold voltage of the light emitting element, wherein the second setting voltage is set based on a voltage value of each data line at a third timing at which a third elapse time longer than the first elapse time has elapsed, wherein the third timing is a timing after the second end of the light emitting element of each pixel is set to be an initial voltage, a third detection voltage is applied to each data line, and a current is caused to flow through the current path of the driving device through each data line, and wherein the initial voltage is set to be a voltage having an electric potential difference from the power-source voltage smaller than the light emitting threshold voltage of the light emitting element.

2. The pixel driving device according to claim 1, wherein the second setting voltage has a same polarity as that of the voltage of each data line at the third timing, and has an absolute value set to be any one of an average value or a maximum value of absolute values of the voltage values of the individual data lines obtained by the plurality of voltage obtaining circuits at the third timing, or a value between the average value and the maximum value.

3. The pixel driving device according to claim 1, further comprising a plurality of voltage applying circuits respectively provided for the plurality of data lines, wherein each voltage applying circuit is configured to output a predetermined voltage including the first, second, and third detection voltages, wherein each voltage applying circuit is connected to each data line, and applies the first, second, and third detection voltages to each data line, and wherein the voltage obtaining circuits obtain, as the plurality of first and second measurement voltages, the voltage values of the individual data lines at the first timing and at the second timing, respectively, after a connection between the data line and the voltage applying circuit is electrically disconnected.

4. The pixel driving device according to claim 3, further comprising an image data correcting circuit that generates corrected image data obtained by correcting image data for image display supplied from an exterior based on the first and second characteristic parameters, wherein the voltage applying circuits apply a gradation voltage to each data line in accordance with the corrected image data generated by the image data correcting circuit when the plurality of pixels display an image in accordance with the image data.

5. The pixel driving device according to claim 3, further comprising a connection switching circuit which connects/disconnects each data line and each voltage applying circuit, and which disconnects one end of the data line from the voltage applying circuit and sets the data line to be in a high impedance state, wherein the voltage obtaining circuits obtain, as the plurality of first measurement voltages and the plurality of second measurement voltages, the voltage values of the data lines at respective time points when a time corresponding to the first timing and a time corresponding to the second timing has elapsed after the connection switching circuit sets the data lines to be in the high impedance state.

6. A light emitting device comprising:

a light emitting panel including a plurality of pixels and a plurality of data lines, wherein each data line is connected to each pixel, and wherein each pixel comprises: (i) a light emitting element having a first end connected to a contact; and (ii) a pixel driving circuit comprising a driving device having a first end of a current path connected to the contact and having a second end of the current path to which a power-source voltage is applied;

a plurality of voltage obtaining circuits respectively provided for the plurality of data lines, wherein each voltage obtaining circuit is configured to obtain a voltage value of each data line;

a voltage control circuit that sets a voltage of a second end of the light emitting element of each pixel; and a correction-data obtaining function circuit, wherein the voltage obtaining circuits obtain, as a plurality of first measurement voltages, voltage values of individual data lines at a first timing at which a first elapse time has elapsed after a first detection voltage is applied to each data line, with the voltage of the second end of the light emitting element of each pixel being set to be a first setting voltage by the voltage control circuit, wherein the first elapse time is set to be 1 to 50 μsec, wherein the correction-data obtaining function circuit obtains a first characteristic parameter relating to a threshold voltage of the driving device of each pixel based on the voltage values of the first measurement voltages, wherein the voltage obtaining circuits obtain, as a plurality of second measurement voltages, voltage values of the individual data lines at a second timing at which a second elapse time longer than the first elapse time has elapsed after a second detection voltage is applied to each data line and a current is caused to flow through the current path of the driving device through each data line, with the voltage of the second end of the light emitting element of each pixel being set to be a second setting voltage by the voltage control circuit, wherein the correction-data obtaining function circuit obtains a second characteristic parameter relating to a current amplification factor of the pixel driving circuit of each pixel, based on the obtained voltage values of the second measurement voltages, wherein the first setting voltage is set to be a same voltage as the first detection voltage or a voltage having a lower electric potential than an electric potential of the first detection voltage and having an electric potential difference from the first detection voltage smaller than a light emitting threshold voltage of the light emitting element, wherein the second setting voltage is set based on a voltage value of each data line at a third timing at which a third elapse time longer than the first elapse time has elapsed, wherein the third timing is a timing after the second end of the light emitting element is set to be an initial voltage, a third detection voltage is applied to each data line, and a current is caused to flow through the current path of the driving device through each data line, and wherein the initial voltage is set to be a same voltage as the power-source voltage or a voltage having a lower electric potential than an electric potential of the power-source voltage and having an electric potential difference from the power-source voltage smaller than the light emitting threshold voltage of the light emitting element.

7. The light emitting device according to claim 6, wherein the second setting voltage has a same polarity as a polarity of the voltage of each data line at the third timing, and has an absolute value set to be any one of an average value or a maximum value of absolute values of the voltage values of the individual data lines obtained by the plurality of voltage obtaining circuits at the third timing, or a value between the average value and the maximum value.

8. The light emitting device according to claim 6, further comprising a plurality of voltage applying circuits respectively provided for the plurality of data lines, wherein each voltage applying circuit is configured to output a predetermined voltage including the first, second, and third detection voltages, wherein each voltage applying circuit is connected to each data line, and applies the first, second, and third detection voltages to each data line, and wherein the voltage obtaining circuits obtain, as the plurality of first and second measurement voltages, the voltage values of the individual data lines at the first timing and at the second timing, respectively, after a connection between the data line and the voltage applying circuit is electrically disconnected.

9. The light emitting device according to claim 8, further comprising an image data correcting circuit that generates corrected image data obtained by correcting image data for image display supplied from an exterior based on the first and second characteristic parameters, wherein the voltage applying circuits apply a gradation voltage to each data line in accordance with the corrected image data generated by the image data correcting circuit when the plurality of pixels display an image in accordance with the image data.

10. The light emitting device according to claim 8, further comprising a select driver, wherein:

the light emitting panel includes a plurality of scanning lines arranged in a row direction, the plurality of data lines are arranged in a column-wise direction, each of the plurality of pixels is arranged in a vicinity of an intersection between each of the plurality of scanning lines and each of the plurality of data lines, the select driver successively applies a select signal of a selecting level to each scanning line in order to set each pixel of each row to be in a selected state, and each voltage obtaining circuit obtains a voltage value corresponding to a voltage of the contact of each pixel of each row set to be in the selected state through each data line.

11. The light emitting device according to claim 10, wherein the pixel driving circuit of each pixel comprises: (i) a first transistor with a first current path having a first end connected to the contact and a second end to which the power-source voltage is applied; and (ii) a second transistor with a second current path having a control terminal connected to the scanning line, a first end connected to a control terminal of the first transistor, and a second end connected to the second end of the first current path of the first transistor, wherein the driving device is the first transistor, and wherein each pixel has the second current path of the second transistor electrically conducted, and has the second end of the first current path of the first transistor connected to the control terminal of the first transistor in the selected state, and the predetermined voltage based on the first, second, and third detection voltages applied by each voltage applying circuit is applied to the contact.

12. The light emitting device according to claim 9, further comprising a connection switching circuit which connects/disconnects each data line and each voltage applying circuit, and which disconnects one end of the data line from the voltage applying circuit and sets the data line to be in a high impedance state, wherein the voltage obtaining circuits obtain, as the plurality of first measurement voltages and the plurality of second measurement voltages, the voltage values of the data lines at respective time points when a time corresponding to the first timing and a time corresponding to the second timing has elapsed after the connection switching circuit sets the data lines to be in the high impedance state.

13. An electronic device comprising:

an electronic-device main body unit; and the light emitting device according to claim 6 to which image data is supplied from the electronic-device main body unit and which is driven based on the image data.

14. A driving/controlling method of a light emitting device, wherein the light emitting device comprises: a light emitting panel including a plurality of pixels and a plurality of data lines, wherein each data line is connected to each pixel, and wherein each pixel comprises: (i) a light emitting element; and (ii) a pixel driving circuit comprising a driving device having a first end of a current path connected to a first end of the light emitting element and having a second end of the current path to which a power-source voltage is applied, the light emitting device driving/controlling method comprising:

a first voltage setting step of setting a voltage of a second end of the light emitting element of each pixel to be a first setting voltage;

a first characteristic parameter obtaining step of obtaining, as a plurality of first measurement voltages, voltage values of individual data lines at a first timing at which a first elapse time has elapsed after a first detection voltage is applied to each data line and a current is caused to flow through the current path of the driving device through each data line, with the voltage of the second end of the light emitting element of each pixel being set to be the first setting voltage through the first voltage setting step, so as to obtain a first characteristic parameter relating to a threshold voltage of the driving device of each pixel based on the obtained voltage values of the first measurement voltages, wherein the first elapse time is set to be 1 to 50 μsec;

a second voltage setting step of setting the voltage of the second end of the light emitting element of each pixel to be a second setting voltage;

a measurement voltage obtaining step of obtaining, as a plurality of second measurement voltages, voltage values of the individual data lines at a second timing at which a second elapse time longer than the first elapse time has elapsed after a second detection voltage is applied to each data line and a current is caused to flow through the current path of the driving device through each data line, with the voltage of the second end of the light emitting element of each pixel being set to be the second setting voltage through the second voltage setting step; and a second characteristic parameter obtaining step of obtaining a second characteristic parameter relating to a current amplification factor of the pixel driving circuit of each pixel, based on the voltage values of the second measurement voltages obtained through the second measurement voltage obtaining step, wherein the first setting voltage is set to be a voltage having an electric potential difference from the first detection voltage smaller than a light emitting threshold voltage of the light emitting element, wherein in the second voltage setting step, a voltage value of the second setting voltage is obtained based on a voltage value of each data line obtained at a third timing at which a third elapse time longer than the first elapse time has elapsed after the voltage of the second end of the light emitting element is set to be an initial voltage, a third detection voltage is applied to each data line, and a current is caused to flow through the current path of the driving device through each data line, and wherein the initial voltage is set to be a same voltage as the power-source voltage or a voltage having a lower electric potential than an electric potential of the power-source voltage and having an electric potential difference from the power-source voltage smaller than the light emitting threshold voltage of the light emitting element.

15. The driving/controlling method according to claim 14, wherein in the second voltage setting step, the second setting voltage is set to have a same polarity as a polarity of the voltage of each data line obtained at the third timing, and is set to be any one of an average value or a maximum value of absolute values of the voltage values of the individual data lines obtained at the third timing or a value between the average value and the maximum value.

* * * * *